US012250233B2

(12) United States Patent
Juliato et al.

(10) Patent No.: US 12,250,233 B2
(45) Date of Patent: Mar. 11, 2025

(54) TECHNIQUES TO DETECT ATTACKS FOR TIME SYNCHRONIZATION NETWORKING

(71) Applicant: INTEL CORPORATION

(72) Inventors: Marcio Juliato, Portland, OR (US); Javier Perez-Ramirez, North Plains, OR (US); Manoj Sastry, Portland, OR (US); Dave Cavalcanti, Portland, OR (US); Christopher Gutierrez, Hillsboro, OR (US); Vuk Lesi, Cornelius, OR (US); Shabbir Ahmed, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 230 days.

(21) Appl. No.: 18/105,580

(22) Filed: Feb. 3, 2023

(65) Prior Publication Data

US 2024/0267390 A1  Aug. 8, 2024

(51) Int. Cl.
*H04L 9/40* (2022.01)

(52) U.S. Cl.
CPC ...... *H04L 63/1416* (2013.01); *H04L 63/0876* (2013.01)

(58) Field of Classification Search
CPC .................. H04L 63/1416; H04L 63/0876
USPC ............................................................ 726/6
See application file for complete search history.

(56) References Cited

U.S. PATENT DOCUMENTS

| 9,264,333 | B1* | 2/2016 | Mizrahi | H04J 3/067 |
| 10,985,922 | B2* | 4/2021 | Zhou | H04L 9/0869 |
| 2019/0349392 | A1* | 11/2019 | Wetterwald | H04L 43/0852 |
| 2020/0252424 | A1* | 8/2020 | Regev | H04J 3/0667 |
| 2022/0014532 | A1* | 1/2022 | Perez-Ramirez | H04L 63/1425 |
| 2022/0094475 | A1* | 3/2022 | Ohara | H04W 40/023 |
| 2022/0160309 | A1* | 5/2022 | Poltorak | H04W 4/38 |
| 2022/0376808 | A1* | 11/2022 | Zinner | H04L 67/12 |
| 2023/0006751 | A1* | 1/2023 | Zinner | H04L 47/283 |
| 2023/0019699 | A1* | 1/2023 | Zinner | H04L 12/40 |
| 2023/0021214 | A1* | 1/2023 | Lehmer | H02S 50/10 |
| 2024/0292348 | A1* | 8/2024 | Luetzenkirchen | H04L 65/80 |

OTHER PUBLICATIONS

Michael Manzo ; Time Synchronization Attacks in Sensor Networks ; ACM:2005; pp. 107-116.*

* cited by examiner

*Primary Examiner* — Monjur Rahim
(74) *Attorney, Agent, or Firm* — KDW Firm PLLC

(57) ABSTRACT

Techniques include a method, apparatus, system and computer-readable medium to detect, quantify and localize attacks to enhance security for time-synchronized networking. Embodiments include a diagnostic stream producer to produce diagnostic information providing evidence of a timing attack on a node of a time-synchronized network. Embodiments include a diagnostic stream consumer to consume diagnostic information, analyze the diagnostic information, and determine whether a node is under a timing attack. Other embodiments are described and claimed.

20 Claims, 35 Drawing Sheets

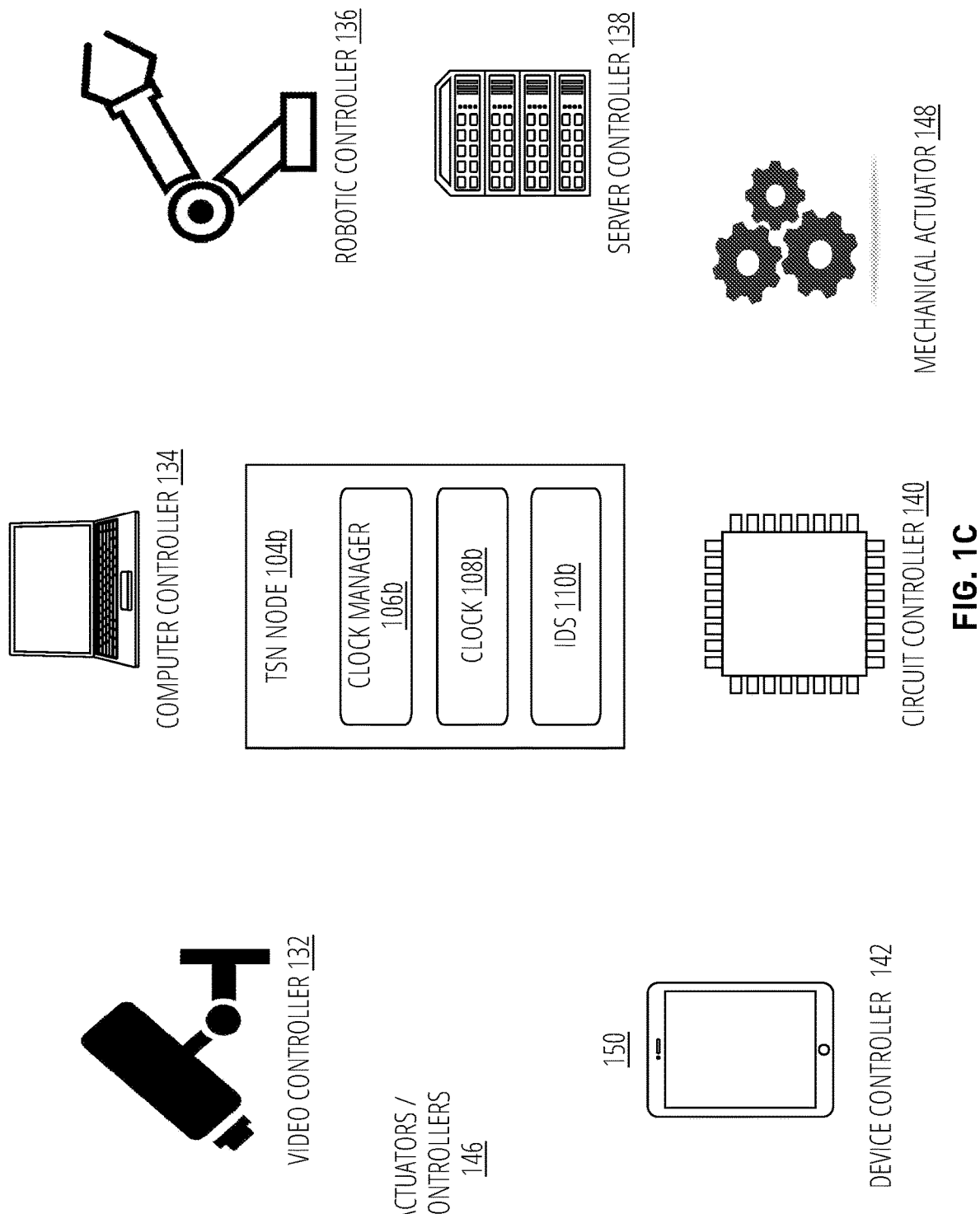

802.3 ETHERNET PACKET AND FRAME STRUCTURE

| LAYER | PREAMBLE 2202 | SF DELIMITER 2204 | MAC DEST 2206 | MAC SOURCE 2208 | 802.1Q TAG (OPT) 2210 | TYPE OR LENGTH 2212 | PAYLOAD 2214 | FCS (32-BIT CRC) 2216 | IPG 2218 |
|---|---|---|---|---|---|---|---|---|---|
| | 7 OCTETS | 1 OCTET | 6 OCTETS | 6 OCTETS | 4 OCTETS | 2 OCTETS | 45-1500 OCTETS | 4 OCTETS | 12 OCTETS |
| L2 ETHERNET FRAME | | | 64-1522 OCTETS | | | | | | |
| L1 ETHERNET FRAME + IPG | | | 72-1530 OCTETS | | | | | | 12 OCTETS |

FIG. 22

TECHNIQUES TO DETECT ATTACKS FOR TIME SYNCHRONIZATION NETWORKING

BACKGROUND

Many computing systems require real-time safety critical features. For example, many autonomous systems, industrial systems, etc., require such systems to have real-time safety-critical features. This often necessitates that timekeeping performance within the system has higher levels of security relative to other aspects of the system. For example, factories employ synchronized robots to accomplish coordinated tasks, often in the presence of human beings. In another example, robots utilize coordination to perform surgeries on humans. As yet another example, self-driving vehicles require synchronization of networked sensing elements to build a precise perception of the environment around the vehicle, including other vehicles, objects, hazards, and persons. Tools relied on to achieve the necessary time performance, synchronization, and bounded latency communication for such time sensitive systems to perform as needed is often referred to as time-synchronized networking.

In general, time-synchronized networking or time-sensitive networking defines a set of standards (and amendments) with the aim to enable time synchronization and deterministic data delivery in converged networks where time-critical (TC) traffic coexists with other types of traffic. Thus, there is a need to provide security for time-synchronized network devices to mitigate the risks associated with disruption in time-synchronized network operation from attacks on the timing of the network.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 1C illustrates an aspect of a TSN 102 for actuators in accordance with one embodiment.

FIG. 22 illustrates an aspect of a packet and frame structure 2200 in accordance with one embodiment.

DETAILED DESCRIPTION

Figure 1A:
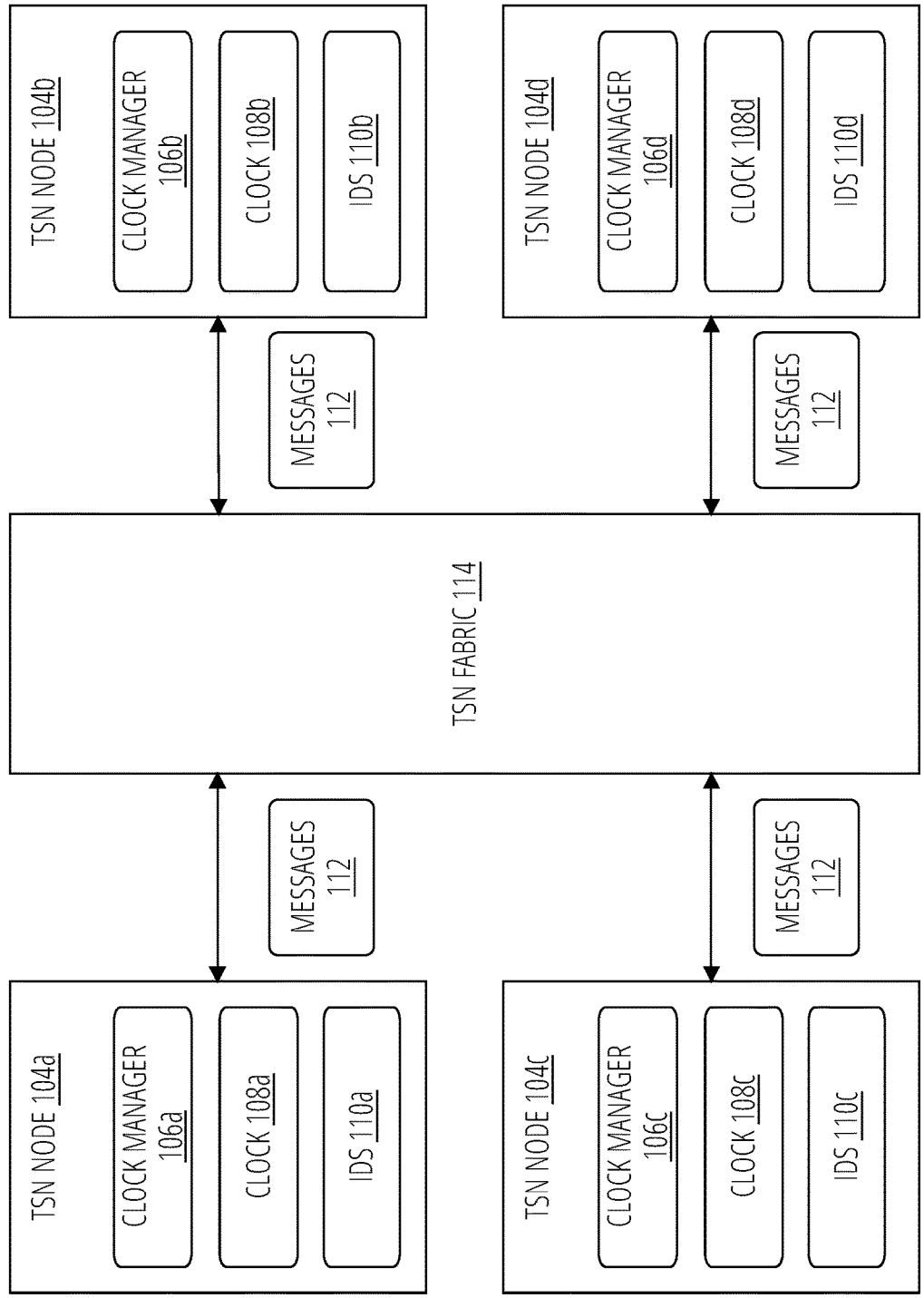
FIG. 1A illustrates an aspect of a time-synchronized network (TSN) 102 in accordance with one embodiment.

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware (such as logic circuitry or more generally circuitry or circuit), software, firmware, or some combination thereof.

The present disclosure is generally directed to low-latency techniques to detect, quantify, and localize security attacks on time synchronization and traffic scheduling for systems operating on strict time requirements, such as systems based on time sensitive networks or time-synchronized networks (TSNs). As noted, TSN defines a set of standards (and amendments) with the aim to enable time synchronization and deterministic data delivery in converged networks where time sensitive traffic coexists with other types of traffic. Various standards have been developed to address time-synchronized or time-sensitive communications.

By way of example and not limitation, some standards for enabling time-synchronized communications include those promulgated by the Institute of Electrical and Electronics Engineers (IEEE) and/or the International Electrotechnical Commission (IEC). For example, IEEE 1588, IEEE 802.1AS, IEEE 802.1Qbv and IEC/IEEE 60802 provide systems and methods for synchronizing device clocks. In one example, IEEE 1588 defines a precision time protocol (PTP) for time synchronization across a network. In another example, IEEE 802.1AS defines a time-sensitive networking protocol referred to as a generic PTP (gPTP) for time synchronization across a network, where time sensitive devices (e.g., clock followers) synchronize to a leader clock (e.g., clock leader). In yet another example, IEEE 802.1Qbv defines time-sensitive networking for deterministic latency through traffic scheduling. In still another example, IEC/IEEE 60802 defines time-sensitive networking profiles for industrial automation. Other examples include a network time protocol (NTP) which is a networking protocol for clock synchronization between computer systems over packet-switched, variable-latency data networks, network time security (NTS) which is a secure version of NTP, and other time-synchronized network protocols. Embodiments are not limited to these examples.

Time synchronization in a TSN requires tight software-hardware interplay. A device (or node) in a TSN may implement a clock manager as a software component and a hardware clock as a hardware component. The clock manager adjusts timing for the hardware clock to ensure synchronization with a common network time for the TSN. In one embodiment, for example, a precision time protocol (PTP) hardware clock (PHC) is periodically adjusted by a PTP for Linux (PTP4L) software module to account for time offset between a clock leader and a clock follower in PTP-synchronized nodes. When a software component receives incorrect time information, such as a time offset bias within messages carrying time synchronization information, the software can misconfigure or mis-control hardware for the PHC, thereby leading to incorrect timekeeping. For instance, attackers located external to a TSN-capable platform along a network path can tamper with messages carrying time information to synchronize the hardware clock. Examples include malicious switches and/or relays tampering with time-related messages, or external attackers injecting messages into the network, which ends up impacting a time of the nodes downstream. Consequently, system and applications depending on TSN capabilities will consume incorrect time. Accordingly, early detection of a corrupted messages and/or software components for a TSN node is critical within a TSN.

One conventional solution to address this problem is to implement one or more intrusion detection systems (IDSs) to monitor devices within a TSN to identify any abnormal behavior. An IDS implements software, firmware or hardware to support one or more specialized security functions, such as detecting malicious behavior caused by an attacker. The IDS may be implemented on a TSN node or separate from a TSN node. The IDS receives as input messages containing time information for synchronizing a clock of a TSN node with a network time for the TSN. The IDS analyzes the messages to detect anomalies, such as slight modifications to the time information to cause a TSN node to update an internal clock with a wrong network time. Incorrect time synchronization can cause disruptions in time sensitive applications executing on the TSN node, such as causing collisions between cooperative robotic arms or delaying braking in an autonomous vehicle. When the IDS detects abnormalities in messages carrying time information, the IDS generates an alert and takes action to isolate any affected TSN applications and/or TSN nodes from a compromised TSN node.

While deploying multiple IDSs throughout a TSN improves security for the TSN, each IDS tends to operate only on information analyzed by a given IDS. This presents a challenge of developing a comprehensive view of the TSN to recognize patterns, leverage information received from multiple IDSs, and localizing a source of a security attack (e.g., a specific node within the TSN). Further, building a comprehensive picture of the network by a central security server through querying individual IDSs causes an increase in network traffic and latency. Current solutions lack an efficient method to detect, quantify, and localize attacks in time synchronization and traffic scheduling in modern TSNs.

To solve these and other challenges in systems implementing time-synchronized networking operations, embodiments implement low-latency techniques to detect, quantify, and localize security attacks on time synchronization and traffic scheduling for systems operating on strict time requirements, such as TSNs. In general, as TSN nodes desynchronize, they will stop obeying the timing of their transmission windows. Receiving nodes drop packets arriving outside of the transmitter's transmit (TX) window. A monitor checks diagnostic packets received in a diagnostic stream and determines which/how many packets are missing. This enables the monitor to detect desynchronization and its amplitude as well as identify where it happened.

More particularly, a TSN typically implements some fundamental procedures (e.g., as defined by a standard) for all nodes operating within the TSN, such as time synchronization, traffic scheduling, packet format, reporting procedures, and so forth. For time synchronization, a clock leader has a clock that maintains a network time for a TSN. The clock leader periodically sends time information to clock followers. The clock followers use the time information to adjust local clocks and synchronize the local clocks to match the clock for the clock leader. This process is also followed by any intermediate nodes in the TSN, such as switches or relays. For traffic scheduling, a central network controller (CNC) node distributes a traffic schedule to some or all of the TSN nodes in the TSN. Time-aware traffic shaping grants transmission windows to time-synchronized nodes. Each node has a specific transmission window with a pre-determined cycle and duration. The nodes communicate streams of data (e.g., in the form of messages, packets or frames) using the transmission windows. The data streams flow from "talker nodes" to "listener nodes."

Attackers may utilize various attack vectors to implement a timing attack on a TSN to desynchronize the TSN. For instance, an attacker may inject malicious software (malware) into a TSN node or fake data into a data stream communicated between TSN nodes. An attack may attempt to tamper with time synchronization procedures for the TSN, thereby causing network nodes such as clock followers and switches, to be desynchronized in relation to a clock leader. The desynchronization causes the network nodes to shift timing windows, due to clock drift, which impacts traffic scheduling. This deteriorates timing guarantees between talker nodes and listener nodes.

Various embodiments may utilize diagnostic information communicated between TSN nodes to detect misalignment of timing windows for the TSN nodes. A TSN node sends a specially crafted set of packets in one or more diagnostic messages that collectively form a "diagnostic stream" towards a monitor. The specially crafted diagnostic packet may be referred to herein individually as an alignment-check packet (ACP) or collectively as a set of ACPs. The TSN node may communicate the diagnostic stream with the diagnostic messages using an in-band channel (e.g., interleaved within normal data streams using a priority scheme) of the TSN or an out-of-band channel (e.g., a dedicated diagnostic channel reserved only for diagnostic traffic) of the TSN. The monitor may be implemented in a distributed schemed among multiple TSN nodes within the TSN or a centralized scheme by a CNC node for the entire TSN. When a TSN node sends diagnostic information, it may be generally referred to herein as a "diagnostic stream producer." When a TSN node receives diagnostic information, it may be generally referred to herein as a "diagnostic stream consumer." In operation, one or more diagnostic stream producers may send a diagnostic stream of one or more diagnostic messages towards a diagnostic stream consumer. The diagnostic stream consumer may include a monitor that parses the diagnostic stream for diagnostic messages, analyzes any ACPs carried by the diagnostic messages, and determine whether a desynchronization event has occurred for a given TSN node based on results of the analysis.

In one embodiment, for example, a diagnostic stream consumer may be implemented, at least in part, by a computing apparatus that includes processor circuitry. The computing apparatus also includes a memory communicatively coupled to the processor circuitry, the memory to store instructions that when executed by the processor circuitry, causes the processor circuitry to receive a diagnostic message in a time-synchronized network (TSN) by a diagnostic stream consumer of the TSN, the diagnostic message to comprise a set of alignment-check packets (ACPs), the set of ACPs to include a first node ACP from a first set of ACPs associated with a first TSN node in the TSN, the first node ACP to carry diagnostic information associated with the first TSN node, the diagnostic information to comprise a node identifier for the first TSN node, an ACP sequence number for the first TSN node, and an authentication code for the first TSN node, where the first node ACP has a defined size; authenticate the first node ACP based on the authentication code; determine a number of dropped ACPs from the first set of ACPs associated with the first TSN node that were not received within a time window associated with the first TSN node based on the ACP sequence number of the first node ACP; and determine a desynchronization time for the first TSN node based on the number of dropped ACPs from the first set of ACPs associated with the first TSN node and the defined size for the first node ACP. Other embodiments are described and claimed.

In one embodiment, for example, a diagnostic stream producer may be implemented, at least in part, by a computing apparatus that includes processor circuitry. The computing apparatus also includes a memory communicatively coupled to the processor circuitry, the memory to store instructions that when executed by the processor circuitry, causes the processor circuitry to prepare a data stream for transmission from a diagnostic stream producer to a diagnostic stream consumer within a time window assigned to the diagnostic stream producer in a time-synchronized network (TSN); determine an amount of transmit time needed to send the data stream from the diagnostic stream producer to the diagnostic stream consumer during the time window assigned to the diagnostic stream producer; determine an amount of residual time for the time window based on the transmit time; determine a set of alignment-check packets (ACPs) associated with the diagnostic stream producer that can be sent within the residual time for the time window, each ACP of the set of ACPs having a defined size, generating one or more ACPs for the set of ACPs, each ACP to include diagnostic information associated with the diagnostic stream producer, the diagnostic information to comprise a node identifier for the diagnostic stream producer, an ACP sequence number, and an authentication code for the diagnostic stream producer; and send a diagnostic message with the set of ACPs from the diagnostic stream producer to the diagnostic stream consumer within the residual time for the time window assigned to the diagnostic stream producer. Other embodiments are described and claimed.

The use of ACPs (both in-band and out-of-band) significantly reduces an amount of latency, overhead, and device and network resources (e.g., memory, compute, bandwidth, etc.) associated with security schemes to protect a TSN. As a result, embodiments may provide faster and more accurate detection, quantification, and localization of security events occurring in real-time within an apparatus, device or network associated with a TSN. It may be appreciated that other technical advantages exist as well, as will become apparent in the figures, description and claims discussed herein.

FIG. 1A depicts an exemplary time-synchronized network (TSN) 102 implemented according to a TSN standard (e.g., IEEE 1588, IEEE 802.1AS, IEEE 802.1Qbv, or the like). As depicted, TSN 102 includes various TSN nodes 104, such as TSN nodes 104*a-d*. The TSN nodes 104 may be implemented as different types of nodes for a TSN, such as an origination node, relay node, switch node, end node, talker node, listener node, diagnostic stream producer, diagnostic stream consumer, and so forth. The TSN nodes 104*a-d* are communicatively coupled via a TSN fabric 114. The TSN fabric 114 can connect the TSN nodes 104*a-d* using various types of network topology (e.g., mesh, star, etc.) and various types of communications channels (e.g., wired, wireless, fiber optic, buses, etc.). It is noted that the number of nodes in the TSN 102 is selected for purposes of clarity and not limitation. In practice, the TSN 102 can include any number and combination of nodes (e.g., origination nodes, switches, relay nodes, end devices, etc.).

The TSN nodes 104 can communicate with each other via the TSN fabric 114. For instance, the TSN nodes 104 can send messages 112 to each other over one or more communication channels provided by the TSN fabric 114. The messages 112 can include control information and payload information. One type of control information may include time information. The time information may comprise synchronization messages, time update messages or time follow-up messages (among other time protocol messages) for a time protocol used by the TSN 102.

Each TSN node 104 in the TSN 102 includes various hardware and/or software components. As depicted in FIG. 1A, a TSN 104 includes a clock manager 106, a clock 108 and an intrusion detection system (IDS) 110 (referred to herein as an "IDS" or "detector"). For instance, the TSN node 104*a* includes a clock manager 106*a*, a clock 108*a* and an IDS 110*a*. The TSN node 104*b* includes a clock manager 106b, a clock 108b and an IDS 110b. The TSN nodes 104c, 104d are similarly configured. It may be appreciated that these are just a few components for a TSN 104, and the TSN 104 can include other standard components for an electronic device, such as network interfaces, radio transceivers, input/output (I/O) components, memory units, processing circuits, controllers, sensors, actuators, mechanical parts, application software, operating system software, TSN-enabled platforms, and so forth.

In various embodiments, the clock manager 106 is implemented as a software component, and the clock 108 is implemented as a hardware component (e.g., "hardware clock" or "clock circuitry"). The IDS 110 can be implemented as a software component, a hardware component, or a combination of both software and hardware components. Embodiments are not limited in this context.

The clock manager 106 generally manages a time (e.g., clock signals) generated by the clock 108. A key component in clock synchronization mechanisms is the clock manager software. In a time-synchronized network such as the TSN 102, this component tightly interacts with network hardware (e.g., Ethernet/Wi-Fi) to obtain Precision Time Protocol (PTP) message timestamps, as well as with PTP clock hardware to implement suitable phase/frequency corrections in order to synchronize with a clock leader. The clock manager 106 typically implements a "clock servo." A clock servo is a control algorithm that periodically takes as input some measurement (or estimate) of clock offset to a reference clock, and computes as output either time (e.g., phase) or frequency adjustment to compensate for the given offset.

The clock 108 is generally a hardware clock that implements clock circuitry to generate signals for digital electronics implemented by the TSN node 104. In electronics and especially synchronous digital circuits, a clock signal oscillates between a high and a low state and is used to coordinate actions of the digital circuits. A clock signal is produced by a clock generator. Although more complex arrangements are used, the most common clock signal is in the form of a square wave with a 50% duty cycle, usually with a fixed, constant frequency. Circuits using the clock signal for synchronization may become active at either the rising edge, falling edge, or, in the case of double data rate, both in the rising and in the falling edges of the clock cycle. The clock 108 generates clock signals under control of the clock manager 106. The clock 108 can be implemented using any suitable hardware having a timing accuracy required by a given device or network. In the TSN 102, the clock 108 can be implemented as a PHC, although other hardware clocks can be implemented as well. Embodiments are not limited in this context.

In normal operation, a network interface (not shown) for a TSN node 104 can receive messages 112 that include time information representative of a network time for the TSN 102. The clock manager 106 can receive the time information from the network interface, analyze the time information, and determine whether time adjustments are needed for the clock 108. When time adjustments are needed, the clock manager 106 generates control information and sends the control information to the clock 108. The clock 108 receives the clock manager control information, and adjusts a parameter for the clock 108, such as a phase or frequency for the clock signals generated by the clock 108.

The IDS 110 generally monitors the clock manager 106 to detect abnormal or malicious behavior of the TSN 102. In general, the IDS 110 is a device or software application that monitors a device, network or systems for malicious activity or policy violations. The IDS 110 may be specifically tuned to detect a timing attack, such as a desynchronization attack, or other TSN specific attack vector. Any intrusion activity or violation is typically reported either to other devices in the same network, an administrator, and/or collected centrally using a security information and event management (SIEM) system. A SIEM system combines outputs from multiple sources and uses alarm filtering techniques to distinguish malicious activity from false alarms. In addition to the TSN node 104, the IDS 110 may be implemented for other devices in the TSN, such as relay nodes 104a-104c, to provide a more comprehensive security solution against attacks.

The IDS 110 can operate in an on-line or off-line mode. When operating in an on-line mode, the IDS 110 examines network traffic in real time. It performs an analysis of passing traffic on the entire subnet, and matches the traffic that is passed on the subnets to the library of known attacks. For instance, it analyses the message 310 (e.g., a TSN timing message) and applies some rules, to decide if it is an attack or not. Off-line mode typically deals with stored data and passes it through some processes to decide if it is an attack or not. For the offline case, a message may be replicated for offline analysis. It may be replicated in hardware without incurring a memory copy. However, a software solution may copy the message from the queue for later analysis. In either mode, once an attack is identified, or abnormal behavior is sensed, an alert can be sent to a SIEM, a network administrator, or a software application to automatically implement security protocols, such as dropping the message 112, isolating an infected device guarded by the IDS 110, and/or re-configuring one or more network paths for impacted devices in the TSN network.

The IDS 110 can utilize any number of different methods to detect an attack. For instance, the IDS 110 may implement a signature-based method, a statistical anomaly-based method, a stateful protocol analysis method, machine-learning based, or some combination of all four methods. A signature-based IDS monitors packets in the network and compares with pre-configured and pre-determined attack patterns known as signatures. A statistical anomaly-based or machine-learning based IDS monitors network traffic and compares it against an established baseline. The baseline will identify what is "normal" for that network, such as what sort of bandwidth is generally used and what protocols are used. A stateful protocol analysis IDS identifies deviations of protocol states by comparing observed events with defined profiles of generally accepted definitions of benign activity. It will be appreciated that these detection methods are by way of example and not limitation. Other embodiments may use different detection methods as well. The embodiments are not limited in this respect.

Figure 1B:
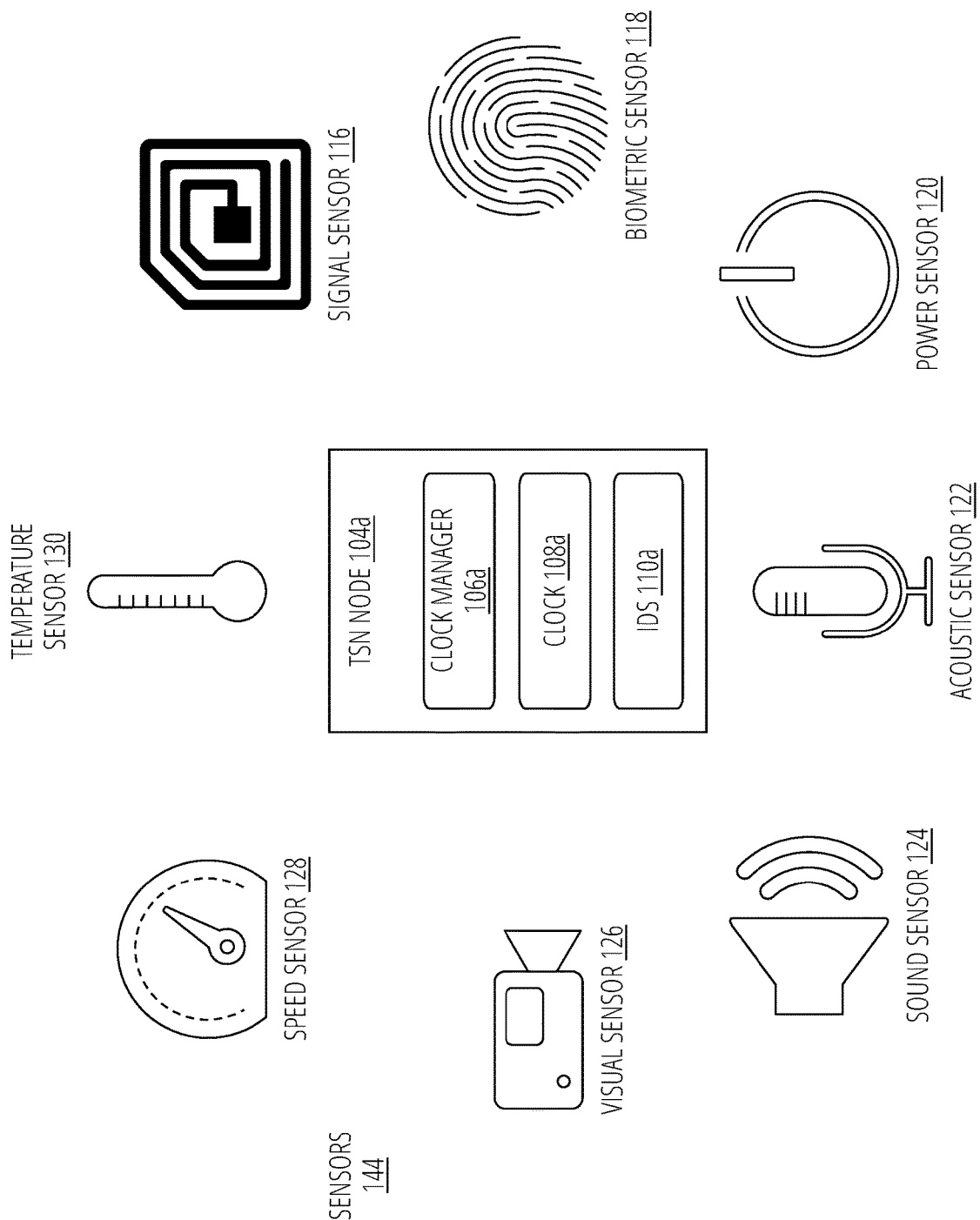
FIG. 1B illustrates an aspect of a TSN 102 for sensors in accordance with one embodiment.

FIG. 1B illustrates an example of a TSN node 104a of the TSN 102 designed to control one or more sensors 144. As depicted in FIG. 1B, the TSN node 104 manages various types of sensors 144, such as a signal sensor 116, a biometric sensor 118, a power sensor 120, an acoustic sensor 122, a sound sensor 124, a visual sensor 126, a speed sensor 128, a temperature sensor 130, and so forth. The TSN node 104a may be suitable for implementing a physics-based model for the IDS 110. A physics-based approach as proposed herein utilizes state prediction based on physical models of system dynamics. Unlike conventional information-based security measures, the physics-based model may utilize physical properties of a system, along with controller state estimation, to enable computationally inexpensive analytical redundancy. For example, a mathematical model-based replica of the system is simultaneously executed to detect attacks.

FIG. 1C illustrates an example of a TSN node 104b of the TSN 102 designed to control one or more actuators and/or host controllers 146. As depicted in FIG. 1C, the TSN node 104b manages various types of actuators/controllers 146, such as a robotic controller 136, a server controller 138, a mechanical actuator 148, a circuit controller 140, a device controller 142, a video controller 132, a computer controller 134, and so forth. As with FIG. 1B, the TSN node 104b shown in FIG. 1C may be suitable for implementing a physics-based model for the IDS 110, as discussed in more detail herein.

In time-synchronized networks, such as the TSN 102 depicted in FIGS. 1A-1C, it becomes important for all the TSN nodes 104 to synchronize to a common or shared network time for the TSN 102. For instance, the TSN nodes 104 may operate in accordance with IEEE 802.1AS which implements a hierarchical network to synchronize one or more clock follower (CF) nodes to a clock leader (CL) node (e.g., a grand CL) through relay nodes or switch nodes. Synchronization is performed through communication of time messages, such as the messages 112. The time messages may comprise, for example, time synchronization messages, time update messages and/or time follow-up messages for a PTP.

In some cases, an attacker may simply attempt to disrupt timing of a single TSN node 104 handling critical functions, such as disrupting one or both of the TSN node 104a managing the sensors 144 and/or the TSN node 104b managing the actuators/controllers 146. Rather than attempting to disrupt timing for the entire TSN 102, the attacker may attempt to attack timing of a single TSN node 104 to disrupt key operations for the TSN node 104, such as an electronic control unit (ECU) to control speed sensing for a vehicle or a controller for a robotic arm in a factory.

In other cases, an attacker may attempt to disrupt timing across the entire TSN 102. To attack or disrupt the TSN 102, an attacker may attempt a timing attack or desynchronization attack to compromise timing for one or more of the TSN nodes 104 in the TSN 102. Assume the TSN node 104c operates as a clock leader (CL) in the TSN 102, and the TSN node 104d operates as a clock follower (CF) in the TSN 102. If an attacker located on a network device (e.g., switch or relay) modifies a critical attribute on a specific port, then all downstream nodes from that network device may suffer a desynchronization event. In this example, if the attacker successfully compromises the TSN node 104c, then the TSN node 104d is vulnerable to a timing attack in the form of receiving messages 112 from the TSN node 104c with erroneous time information. Therefore, it becomes important to detect and localize an attack as quickly as possible. Furthermore, upon detection, it becomes important for the TSN 102 to quickly isolate the compromised network device and thereby prevent the desynchronization attack from spreading to other downstream nodes.

In all cases, a time-synchronized network such as the TSN 102 is vulnerable to a timing attack or a desynchronization attack. If a single network node is compromised, it may cause a cascade failure across the entire TSN 102. An example of such an attack is further described with reference to FIGS. 2A, 2B, 3A and 3B.

Figure 2A:
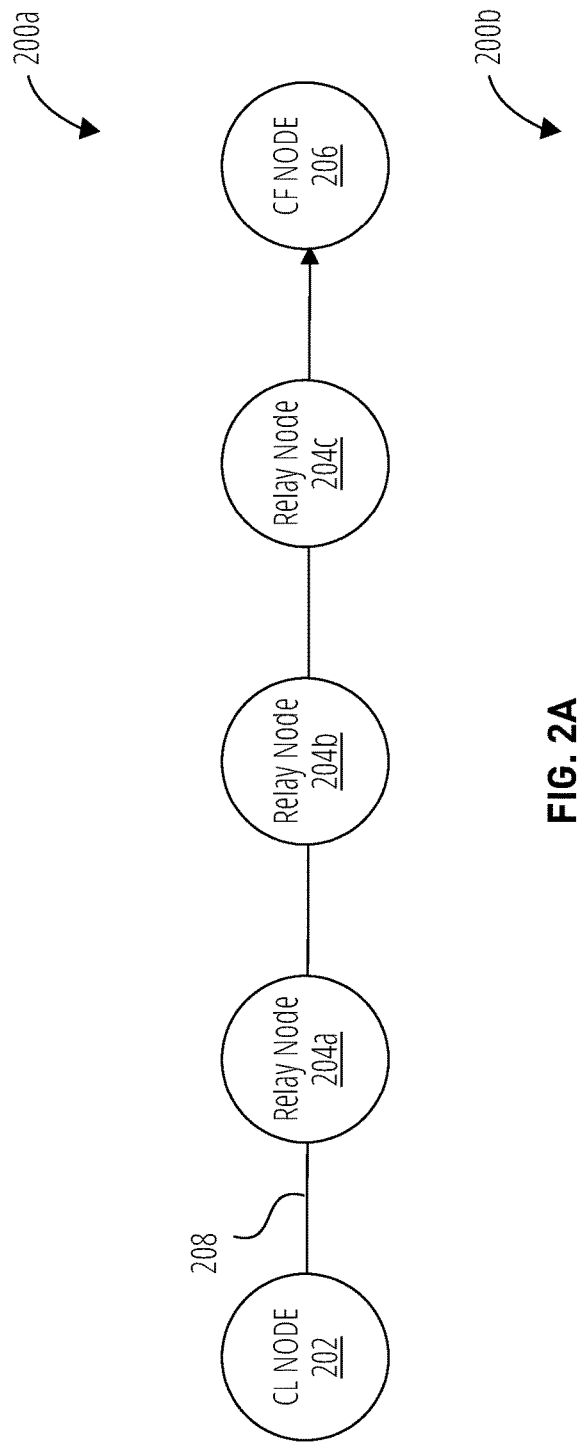
FIG. 2A illustrates an aspect of a TSN 200a in accordance with one embodiment.

FIG. 2A depicts a TSN 200a implemented according to a TSN standard (e.g., IEEE 1588, IEEE 802.1AS, IEEE 802.1Qbv, or the like). As depicted, the TSN 200a includes clock leader node 202, relay nodes 204a, 204b, and 204c, and clock follower node 206, all communicatively coupled via communication channel 208. The clock leader node 202 and the clock follower node 206 have a "master/slave" relationship, where the clock leader node 202 is treated as a "master" device and the clock follower node 206 is treated as a "slave" device. The clock leader node 202 includes a clock that maintains a network time for the TSN 102. The clock follower node 206 includes a clock that synchronizes a clock to the network time via one or more of the messages 112. Alternatively, nodes of the network may be implemented as a "talker node" and a "listener node", respectively. This configuration refers to data transmission, where the talker node transmits data and the listener node listens or receives data. This configuration is used, for example, in scheduled traffic.

Relay nodes 204a, 204b, and 204c are time-aware switching nodes and can be any number of devices in a network arranged to communicate information. A clock leader node 202 sends or originates information and a clock follower node 206 receives or consumes information. Examples of a clock leader node 202 or a clock follower node 206 include devices such as electronic control units in an autonomous vehicle, an industrial system, a medical system, or the like. Additionally, communication channel 208 can be any of a variety of communication channels, including wired or wireless communication channels. In some implementations, all devices in the TSN 200a will receive gate control list (GCL) tables. However, in some implementations, only clock leader nodes 202 and switching nodes (e.g., relay node 204a, etc.) receive GCL tables while destination devices (e.g., clock follower node 206) do not receive a GCL table.

Figure 2B:
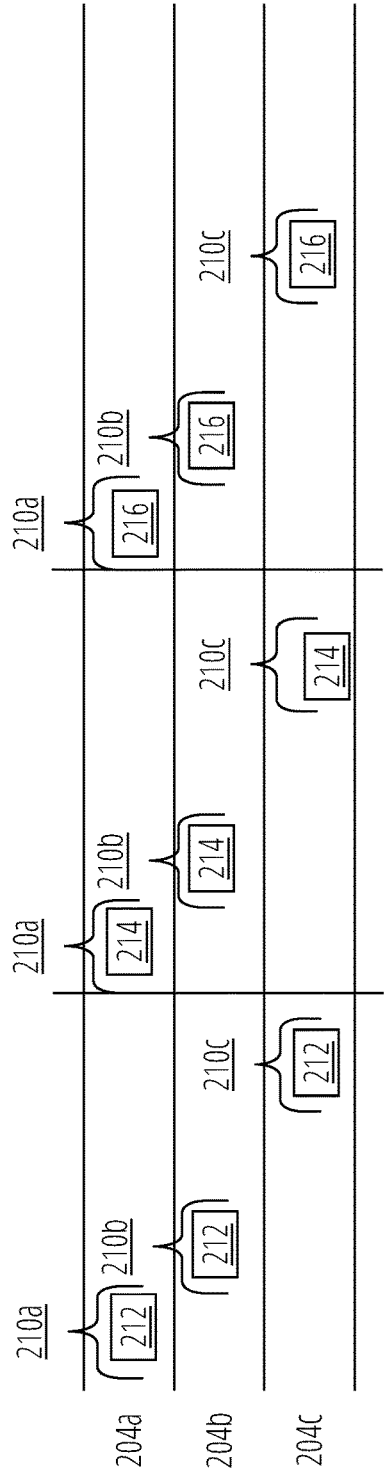
FIG. 2B illustrates an aspect of a timing diagram 200b in accordance with one embodiment.

FIG. 2B depicts a timing diagram 200b depicting communication windows (e.g., Qbv windows, or the like) for switches of TSN 200a based on GCL tables. Typically, GCL tables are generated in a network controller (not shown) and are designed to prioritize time critical (TC) traffic and prevent lower priority traffic from accessing communication channel 208, thus guaranteeing the timely delivery of TC packets within pre-configured time windows. In particular, timing diagram 200b depicts Qbv windows 210a, 210b, and 210c in which packets 212, 214, and 216 are transmitted. It is noted that the communication windows referred to herein are referred to as Qbv windows or protected windows for clarity. However, other standard or techniques for forming protected communication windows to facilitate time synchronization can be used besides Qbv windows. Examples are not limited in this context.

To facilitate transmission of packets (e.g., packet 212, etc.) during protected windows (e.g., Qbv window 210a, etc.), nodes in the TSN 200a are time synchronized and scheduled to transmit TC packets (e.g., packet 212, etc.) using non overlapping protected windows (e.g., Qbv window 210a, etc.). It is to be appreciated that providing latency bounded communication (e.g., as depicted in timing diagram 200b) requires tight synchronization of time between nodes in TSN 200a. With such dependency on time synchronization, reliable TSN operation can be disrupted by attacking the timing of the network, sometimes referred to as a desynchronization attack or event.

Figure 3A:
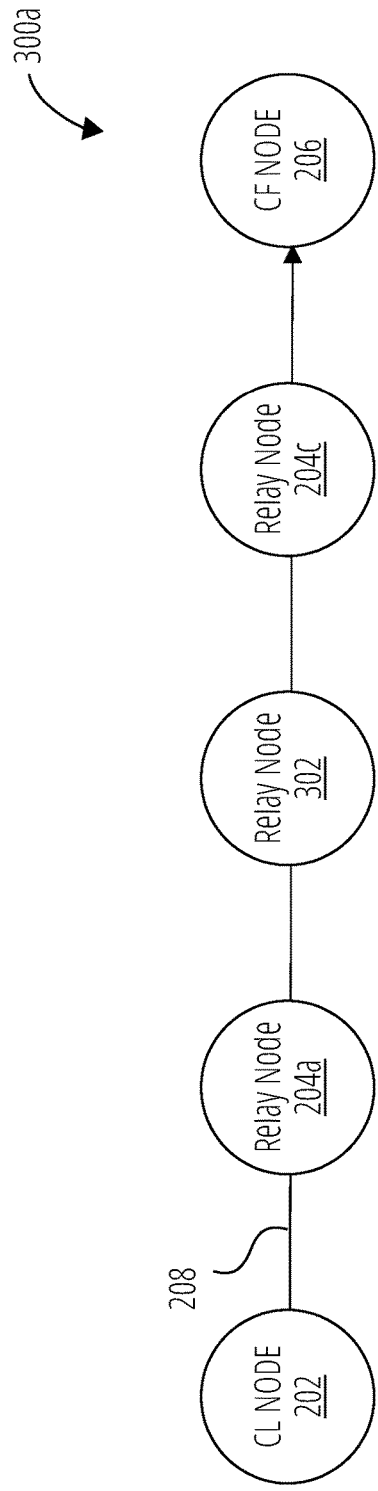
FIG. 3A illustrates an aspect of a TSN 300a in accordance with one embodiment.

FIG. 3A depicts a TSN 300a, which is like TSN 200a except that the relay node 302 is depicted as compromised. In particular, the clock (not shown) of relay node 302 can be attacked and compromised, thereby causing the Qbv window 210b associated with relay node 302 to be misaligned with respect to, and even overlap with, the protected windows of the other switch nodes in the data stream path (e.g., along communication channel 208).

Figure 3B:
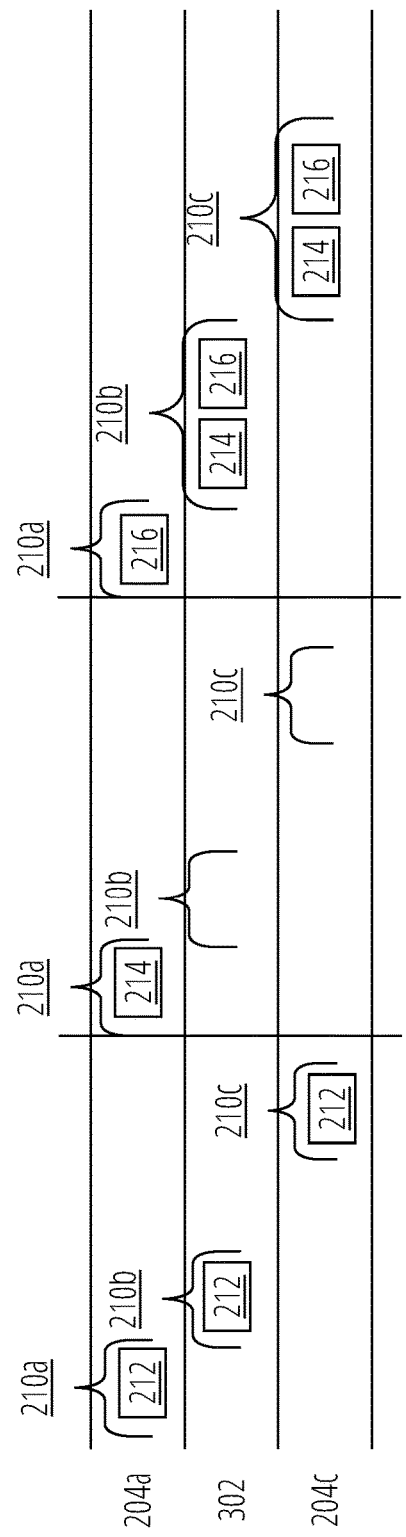
FIG. 3B illustrates an aspect of a timing diagram 300b in accordance with one embodiment.
Figure 4:
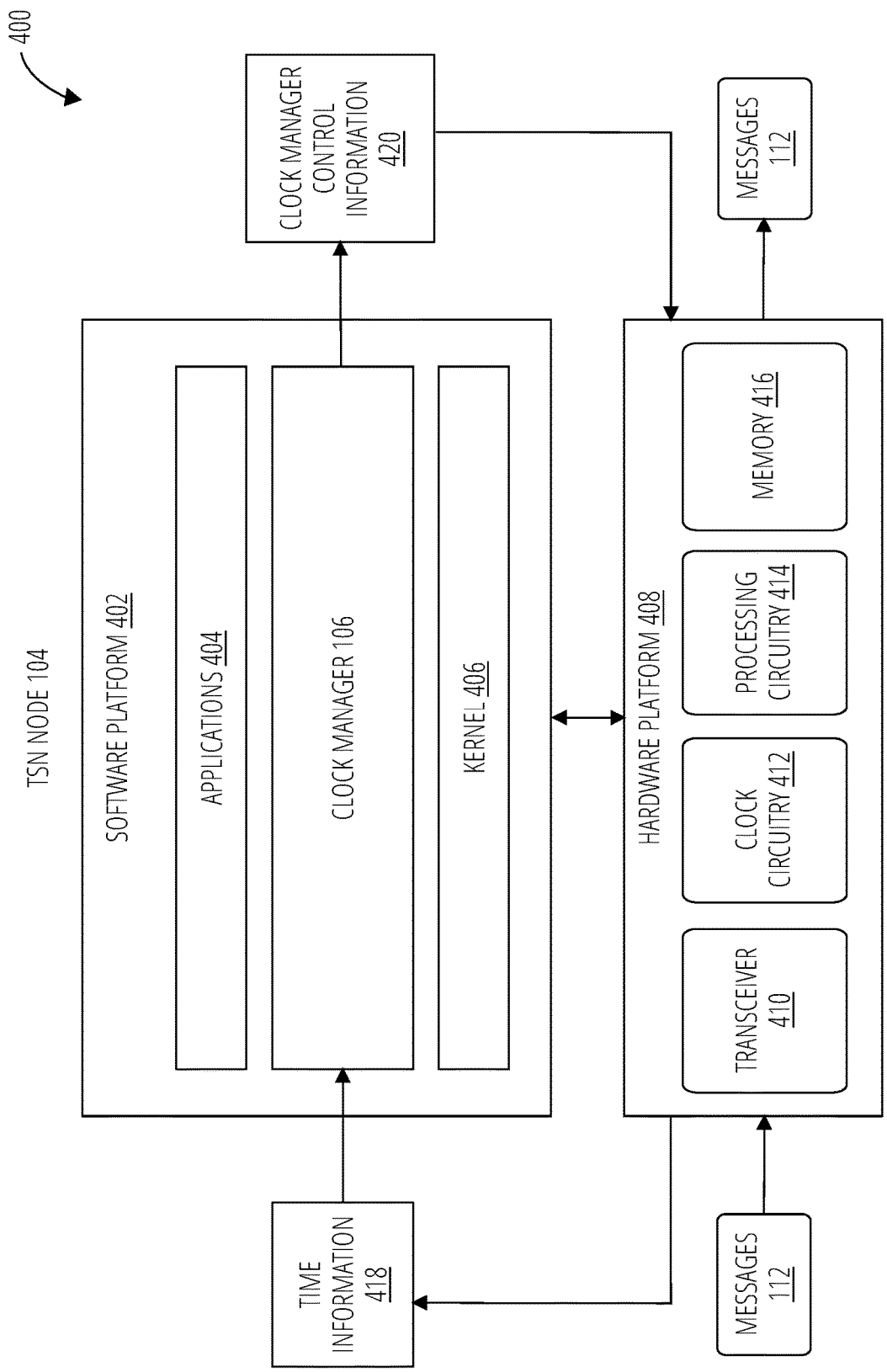
FIG. 4 illustrates an aspect of an apparatus 400 in accordance with one embodiment.

FIG. 3B depicts timing diagram 300b illustrating Qbv window 210b misaligned with Qbv window 210a and Qbv window 210c and overlapping with Qbv window 210a. As such, packets (e.g., packet 214 in the figure) arrive too late with respect to the attacked switch protected window (e.g., Qbv window 210b) causing them to be buffered and sent in the next protected window, or alternatively, dropped completely. As a result of the delay in transmitting packet 214, relay node 302 breaks the latency bound of the stream that it is serving and can result in errors or comprise the safety of the system in which the nodes are operating FIG. 4 illustrates a more detailed view of a TSN node 104 that implements one or more TSN protocols or standards. The TSN node 104 may be implemented as any network devices suitable for operation within a TSN, such as TSN 102, 200a, 300a, and so forth. The TSN node 104 may be implemented as part of a vehicle, robot, industrial machine or any other devices suitable for a TSN. The TSN node 104 may be implemented as an origination node 202, relay nodes 204a-204c, relay node 302 and/or end node 206. The TSN node 104 may be implemented as either a clock leader (CL) or a clock follower (CF) in a TSN. The TSN node 104 may include interfaces to communicate information with other TSN nodes 104 in the TSN 102, such as messages 112, for example.

The TSN node 104 may operate in accordance with a timing protocol, such as a precision time protocol (PTP) for IEEE 1588, IEEE 802.1AS, and so forth. For instance, the TSN node 104 may operate in accordance with IEEE 802.1AS which implements a hierarchical network to synchronize clock followers (CFs) to a clock leader (CL) through relays or switch nodes. Synchronization is performed through communication of time messages, such as the messages 112. The time messages may comprise, for example, time synchronization messages, time update messages or time follow-up messages (among others) for a PTP. The time messages may include, among other fields and attributes, a correction field, which accumulates a network residence, and an origin timestamp for a CL. The time message may also comprise, for example, a packet delay message type with additional fields and attributes.

As depicted in FIG. 4, the TSN device 104 may include a software platform 402 and a hardware platform 408. The software platform 402 may include, among other software components, one or more applications 404, a clock manager 106, and a kernel 406. The hardware platform 408 may include, among other hardware components, a network interface such as a transceiver 410, clock circuitry 412, processing circuitry 414 and memory 416.

The processing circuitry 414 may include circuitry or processor logic, such as, for example, any of a variety of commercial processors. In some examples, the processing circuitry 414 may include multiple processors, a multi-threaded processor, a multi-core processor (whether the multiple cores coexist on the same or separate dies), and/or a multi-processor architecture of some other variety by which multiple physically separate processors are in some way linked. Additionally, in some examples, the processing circuitry 414 may include graphics processing portions and may include dedicated memory, multiple-threaded processing and/or some other parallel processing capability. In some examples, the processing circuitry 414 may be an application specific integrated circuit (ASIC) or a field programmable integrated circuit (FPGA). In some examples, the processing circuitry 414 may be circuitry arranged to perform computations related to TSN, such as switching, clock leader, clock follower, routing, security, and so forth.

The memory 416 may include logic, a portion of which includes arrays of integrated circuits, forming non-volatile memory to persistently store data or a combination of non-volatile memory and volatile memory. It is to be appreciated, that the memory 416 may be based on any of a variety of technologies. In particular, the arrays of integrated circuits included in memory 406 may be arranged to form one or more types of memory, such as, for example, dynamic random access memory (DRAM), NAND memory, NOR memory, or the like.

The transceiver 410 may include logic and/or features to support a communication interface. For example, the transceiver 410 may include one or more interfaces that operate according to various communication protocols or standards to communicate over direct or network communication links. Direct communications may occur via use of communication protocols or standards described in one or more industry standards (including progenies and variants). For example, the transceiver 410 may facilitate communication over a bus, such as, for example, peripheral component interconnect express (PCIe), non-volatile memory express (NVMe), universal serial bus (USB), system management bus (SMBus), SAS (e.g., serial attached small computer system interface (SCSI)) interfaces, serial AT attachment (SATA) interfaces, or the like. In some examples, transceiver 410 may be arranged to support wireless communication protocols or standards, such as, for example, Wi-Fi, Bluetooth, ZigBee, LTE, 5G, or the like.

The TSN node 104 may also include where the network is a controller area network (CAN) or a vehicle area network (VAN). The TSN node 104 may be implemented as a device that manages a sensor, actuator or a controller. The sensors may comprise a speed sensor, a direction sensor, a global positioning system (GPS) sensor, a gas pedal sensor, a brake pedal sensor, a positioning sensor, an object detection sensor, a lane detection sensor, a radar sensor, a light detection and ranging (LIDAR) sensor, an ultrasound sensor, an inertial measurement unit (IMU) sensor, a temperature sensor, a pressure sensor, an altitude sensor, an acoustic sensor, and so forth.

In one aspect, the TSN node 104 may be implemented as a CL or CF for the TSN 102. As previously discussed, the clock manager 106 may ensure that the clock circuitry 412 maintains a network time for the TSN 102. When operating in a CL role, the clock manager 106 may send a message 112 with time information 418 representing a current network time to one or more nodes operating in a CF role for the TSN 102. When operating in a CF role, the clock manager 106 may receive a message 112 from a CL node. The clock manager 106 may use the time information 418 from the message 112 to synchronize a local device time with the current network time maintained by the clock circuitry 412. The clock manager 106 analyzes the time information 418, and determines whether to adjust a parameter (e.g., phase or frequency) of the clock circuitry 412 to synchronize the clock circuitry 412 to the current network time.

Figure 5:
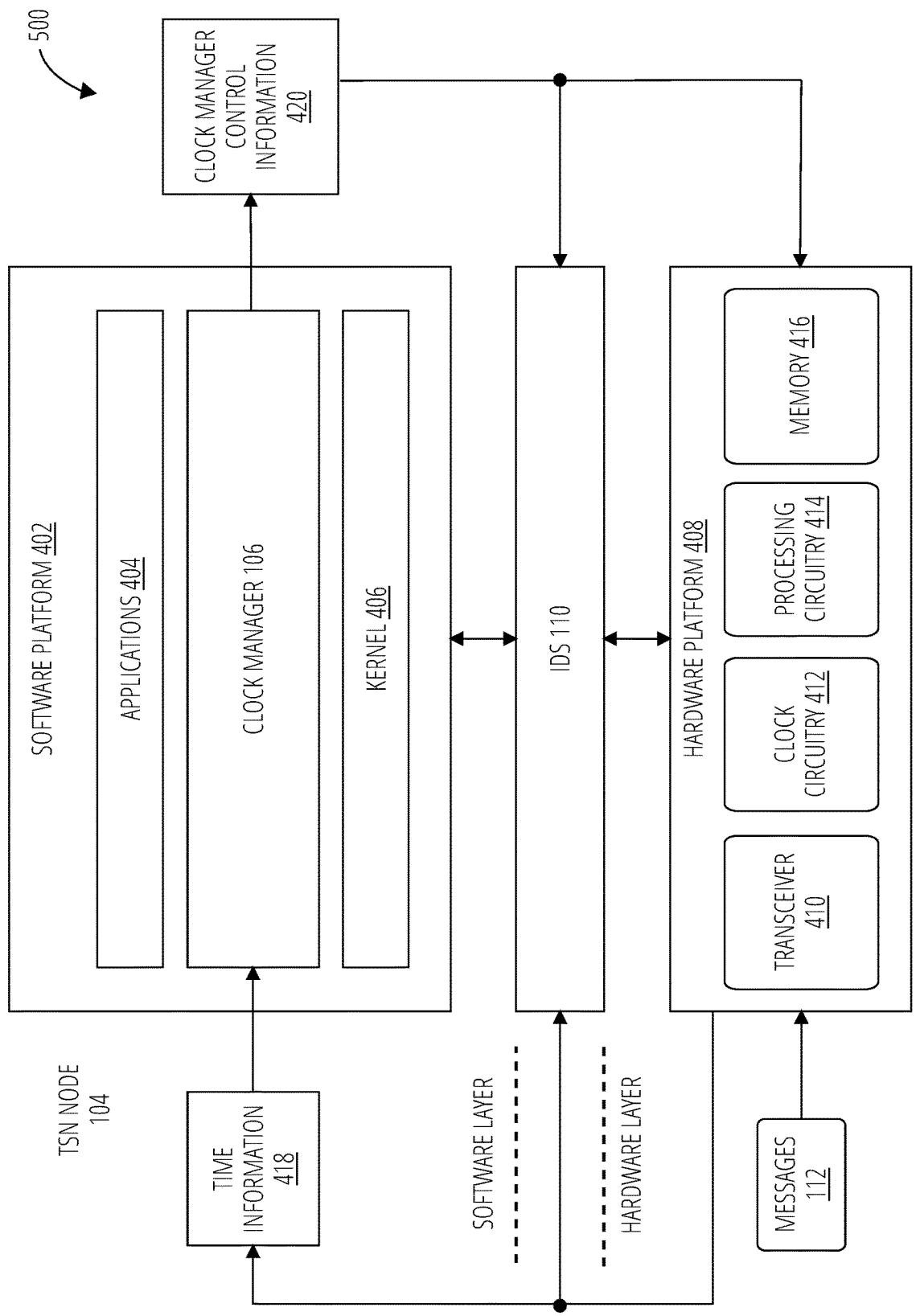
FIG. 5 illustrates an aspect of an apparatus 500 in accordance with one embodiment.

FIG. 5 illustrates an apparatus 500. Similar to the apparatus 400, the apparatus 500 includes a software platform 402 and a hardware platform 408. In addition, the apparatus 500 includes an IDS 110 to monitor a clock manager 106 of the software platform 402. As previously discussed, the IDS 110 generally monitors the clock manager 106 to detect abnormal or malicious behavior of the clock manager 106. More particularly, the IDS 110 monitors the inputs and/or outputs of the clock manager 106, such as consuming the time information 418 sent from the transceiver 410 to the clock manager 106 as input, and the clock manager control information 420 sent from the clock manager 106 to the clock circuitry 412 as output.

As depicted in FIG. 5, the apparatus 500 includes a clock circuitry 412 to implement a hardware clock (e.g., a PHC) for a device, such as a TSN node 104. The apparatus 500 includes a processing circuitry 414 coupled to the clock circuitry 412, the processing circuitry 414 to execute instructions to perform operations for a clock manager 106. The clock manager 106 is operative to receive messages 112 with time information 418 for a network, such as TSN 102. The clock manager 106 generates clock manager control information 420 to adjust the clock circuitry 412 to a network time for the TSN 102. The clock manager control information 420 may comprise one or more parameters to adjust the clock circuitry 412 for the apparatus 500. The one or more parameters may represent, for example, adjustments to a phase or frequency of the clock circuitry 412. For example, the clock manager control information 420 may comprise a phase or frequency adjustment based on a time offset between a reference time and a time maintained by the clock circuitry 412. The reference time is based on the time information 418 in at least one message 112.

The apparatus 500 further includes an IDS 110 coupled to the processing circuitry 414 and the clock circuitry 412. In one embodiment, the IDS 110 may be implemented as part of a software layer for the apparatus 500, such as the software platform 402. In another embodiment, the IDS 110 may be implemented as part of a hardware layer for the apparatus 500, such as the hardware platform 408. In yet another embodiment, certain elements of the IDS 110 may be implemented in the software platform 402, while other elements of the IDS 110 may be implemented in the hardware platform 408. Embodiments are not limited in this context.

Although FIG. 5 depicts the IDS 110 implemented as part of the apparatus 500, it may be appreciated that the IDS 110 may be implemented by another apparatus, device or system communicatively coupled to the apparatus 500. For instance, the IDS 110 may be implemented as part of an IDS for the apparatus 500 that is separate from the apparatus 500 or a device other than a device that implements the apparatus 500. For instance, if the apparatus 500 is implemented by a TSN node 104a, the IDS 110 of the apparatus 500 could optionally be implemented in a TSN node 104b. The IDS 110 could also be implemented by an IDS communicatively coupled to the TSN node 104, either directly via a wired or wireless connection, or indirectly via the TSN fabric 114. Embodiments are not limited in this context.

The IDS 110 is operative to consume multiple types of information to detect a security attack. For instance, the IDS 110 can receive and analyze messages 112 for a TSN node implementing the software platform 402 and/or the hardware platform 408. The messages 112 may carry time information for a TSN node, such as an origin time, resident time, link delays, among other types of clock information. The messages 112 may comprise, for example, synchronization messages or "FollowUp" messages. The TSN node retrieves or decodes the time information from the messages 112, and utilize the time information to synchronize an internal local clock with a network time issued by a clock leader or grand clock leader. The IDS 110 can also receive and analyze other types of information, such as clock manager control information 420 in transit from the clock manager 106 of the software platform 402 and the hardware platform 408. For instance, the IDS 110 can consume software control messages, or it can have one or more taps on a hardware bus or signal lines used to communicate electrical signals to the hardware platform 408. The IDS 110 analyzes the messages 112 and/or other types of information, and determines whether to generate an alert or take corrective action for the apparatus 500 based on results of the analysis.

The messages 112 are communicated between TSN nodes at a certain frequency or rate which can be measured in a number of messages sent or received per unit of time, such as a number of messages sent per second. This is referred to herein as a "message frequency." The message frequency for transmission of the messages 112, which carry origin time (Sync/FollowUp) and link delay computation (LDC), is typically dependent on the latency requirements of a time-sensitive application. The message frequency is usually calculated during a design phase for a TSN, considering a variety of factors, and instantiated during initialization of a TSN or individual TSN nodes.

Cybersecurity is increasingly becoming a critical or core function within a TSN. Numerous security devices, such as the IDS 110, are deployed throughout a TSN 102. Each deployed IDS 110 monitors a TSN node 104 or group of TSN nodes 104, receiving the messages 112 and analyzing the messages 112 for anomalies or abnormalities indicative of a security attack. Despite increasing security of a TSN, however, the multitude of IDS 110 typically cannot communicate with each other, or a centralized security system such as a SIEM, without introducing a significant amount of network traffic communicated by the TSN. As a result, each IDS 110 is limited to security analysis and inferencing operations based on only the network traffic available to the IDS 110. Consequently, an individual IDS 110 does not have a comprehensive view of the entire TSN 102.

To solve these and other challenges in systems implementing time-synchronized networking operations, embodiments implement low-latency techniques to detect, quantify, and localize security attacks on time synchronization and traffic scheduling for systems operating on strict time requirements, such as TSNs. Various embodiments may utilize diagnostic information communicated between TSN nodes to detect misalignment of timing windows for the TSN nodes. A TSN node sends a specially crafted set of packets in one or more diagnostic messages that collectively form a "diagnostic stream" towards a monitor. The specially crafted set of packets may be referred to herein individually as an alignment-check packet (ACP) or collectively as a set of ACPs. The TSN node may communicate the diagnostic stream with the diagnostic messages using an in-band channel (e.g., interleaved within normal data streams using a priority scheme) of the TSN or an out-of-band channel (e.g., a dedicated diagnostic channel reserved only for diagnostic traffic) of the TSN. The monitor may be implemented in a distributed schemed among multiple TSN nodes within the TSN or a centralized scheme by a CNC node for the entire TSN. When a TSN node sends diagnostic information, it may be generally referred to herein as a "diagnostic stream producer." When a TSN node receives diagnostic information, it may be generally referred to herein as a "diagnostic stream consumer." In operation, one or more diagnostic stream producers may send a diagnostic stream of one or more diagnostic messages towards a diagnostic stream consumer. The diagnostic stream consumer may include a monitor that parses the diagnostic stream for diagnostic messages, analyzes any ACPs carried by the diagnostic messages, and determine whether a desynchronization event has occurred for a given TSN node based on results of the analysis. A more detailed description for an exemplary diagnostic stream producer and a diagnostic stream consumer is discussed below.

Figure 6A:
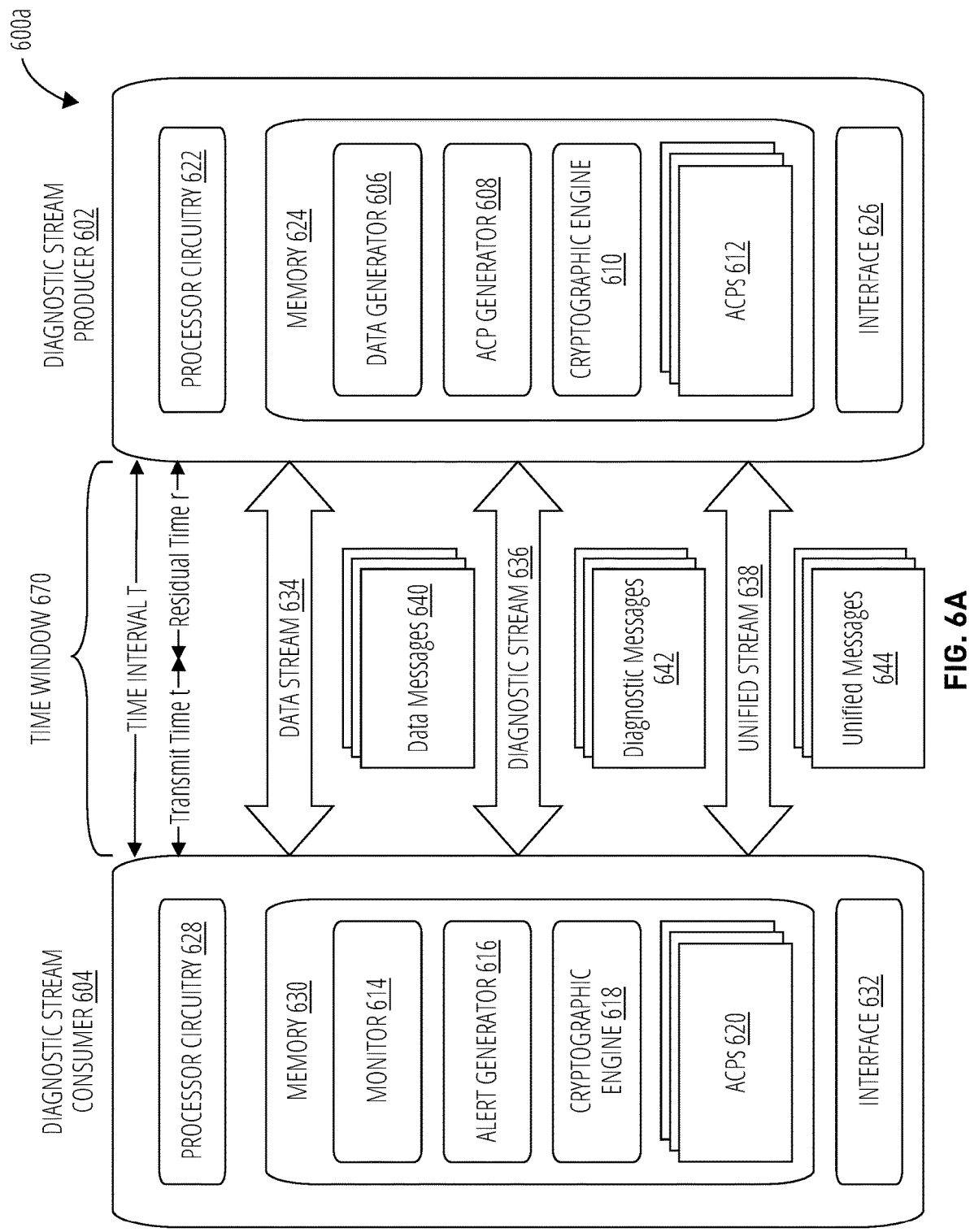
FIG. 6A illustrates an aspect of a system 600a in accordance with one embodiment.

FIG. 6A illustrates a system 600a suitable for a TSN, such as the TSN 102, for example. As depicted in FIG. 6A, the system 600a may include a diagnostic stream producer 602 and a diagnostic stream consumer 604. In one embodiment, for example, the diagnostic stream producer 602 and the diagnostic stream consumer 604 are both TSN nodes 104 within the TSN 102. In one embodiment, for example, the diagnostic stream producer 602 may be a talker node within the TSN 102, and the diagnostic stream consumer 604 may be a listener node within the TSN 102. In one embodiment, for example, the diagnostic stream producer 602 may be a TSN node 104 within the TSN 102, and the diagnostic stream consumer 604 may be a central network controller within the TSN 102.

While system 600a depicts a single diagnostic stream producer 602 and a single diagnostic stream consumer 604 for purposes of clarity, it may be appreciated that the system 600a can implement multiple diagnostic stream producers 602 and diagnostic stream consumers 604. Embodiments are not limited in this context.

In general operation, the diagnostic stream producer 602 may produce various types of information that may be communicated to the diagnostic stream consumer 604 over various communications channels implemented by the TSN 102. In one embodiment, for example, the diagnostic stream producer 602 may send a diagnostic message over a dedicated diagnostic stream channel for the TSN 102. In one embodiment, for example, the diagnostic stream producer 602 may send a diagnostic message as part of a message stream channel transporting non-diagnostic messages (e.g., regular data traffic) for the TSN 102. In one embodiment, for example, the diagnostic stream producer 602 may send a diagnostic message in accordance with a priority scheme. For instance, diagnostic messages may be sent with a priority identifier to identify a priority level for the diagnostic message, the priority level to indicate a highest priority level for transport through the TSN 102.

More particularly, as depicted in FIG. 6, the diagnostic stream producer 602 may produce various types of information that may be communicated to the diagnostic stream consumer 604 via a data stream 634 (e.g., data traffic), a diagnostic stream 636 (e.g., diagnostic traffic), or a unified stream 638 (e.g., a combination of data traffic and diagnostic traffic). A data stream 634 may communicate data information for a TSN node via one or more data messages 640. For example, the data information may comprise normal TSN and regular data traffic, such as control information, application information, management information, timing information, protocol information, and so forth. A diagnostic stream 636 may communicate diagnostic information for a TSN node via one or more diagnostic messages 642. For example, the diagnostic information may comprise ACP information, IDS information, and other security information. A unified stream 638 may communicate a combination of data messages 640 and diagnostic messages 642 in a single unified information stream via one or more unified messages 644, such as interleaving data messages 640 and diagnostic messages 642 according to a defined protocol format.

Although some embodiments may be described as a diagnostic stream producer 602 sending diagnostic information via diagnostic messages 642 in a diagnostic stream 636 to a diagnostic stream consumer 604, it may be appreciated that the diagnostic stream producer 602 may send diagnostic information via unified messages 644 in a unified stream 638 to the diagnostic stream consumer 604, and vice-versa. Embodiments are not limited in this context.

In one embodiment, for example, a diagnostic stream producer 602 such as a TSN node 104 may be implemented, at least in part, by a computing apparatus that includes processor circuitry 622, memory 624 and an interface 626. The memory 624 may be communicatively coupled to the processor circuitry 622 and the interface 626. The memory 624 may store instructions that when executed by the processor circuitry 622, causes the processor circuitry 622 to perform one or more operations for the diagnostic stream producer 602. Additionally, or alternatively, the operations may be executed by dedicated hardware (e.g., DSP, ASIC, FPGA, circuitry, etc.), or a combination of hardware and software. Embodiments are not limited in this context.

The processor circuitry 622 may execute instructions for a data generator 606. The data generator 606 may prepare a data stream 634 for transmission from the diagnostic stream producer 602 to a diagnostic stream consumer 604 within a time window 670 assigned to the diagnostic stream producer 602 in a TSN 102. The data generator 606 may determine an amount of transmit time needed to send the data stream 634 from the diagnostic stream producer 602 to the diagnostic stream consumer 604 during the time window 670 assigned to the diagnostic stream producer 602. The data generator 606 may also determine an amount of residual time for the time window 670 based on the transmit time information 418.

In one embodiment, for example, a CNC may assign a time window 670 to the diagnostic stream producer 602 prior to sending the diagnostic messages 642 in the diagnostic stream 636. The diagnostic stream 636 can be adjusted to fit an existing schedule, or the schedule may be created with a sufficient size to accommodate the diagnostic stream 636. The CNC may distribute a schedule of time window assignments for the TSN nodes 104 to some or all of the TSN nodes 104 within the TSN 102. The schedule of time window assignments include time window assignments for some or all of the TSN nodes 104 within the TSN 102. In this manner, one TSN node 104 will know time window assignments for other TSN nodes 104 in the TSN 102, and can monitor time windows for the other TSN nodes 104 when receiving packets and frames for the other TSN nodes 104. The time window 670 may be defined in accordance with any TSN or network protocols, such as a time window as defined by IEEE 802.1Qbv, for example. An 802.1Qbv time window is determined based on a maximum path length between a deepest node of interest and a destination (e.g., a monitor) so that the entire chain of ACPs can be transported to a monitor. As discussed in more detail below, the monitor is designed to consume the ACPs, analyze the ACPs, and produce a result indicating whether a TSN node 104 has been compromised. Embodiments are not limited to an IEEE 802.1Qbv, and other time windows defined by other TSN protocols may be used for a given implementation.

The processor circuitry 622 may execute instructions for an ACP generator 608. In general, the ACP generator 608 may generate a set of alignment-check packets (ACPs) 612 for a given TSN node 104. An ACP 612 is a well-defined packet structure that contains diagnostic information for the TSN node 104. A security monitor may receive the ACP for a TSN node 104, analyze the ACP, and determine whether the TSN node 104 has been compromised or is under a security attack.

It is worthy to note that a set of ACPs 612 may be transmitted from a TSN node 104, while only a subset of the transmitted ACPs 612 may be received by another TSN node 104, or ultimately at a final destination such as the monitor 614. This may occur for several reasons. For instance, some of the transmitted ACPs 612 will not be received within a defined time window, such as during a security attack, and therefore dropped. In another example, only a subset of the transmitted ACPs 612 will be needed for diagnostic purposes, such as by the monitor 614, and therefore dropped from further transmission along a network path. In yet another example, some of the transmitted ACPs 612 may be corrupted or dropped because of transmission problems incurred by the TSN 102.

Attackers may utilize various attack vectors to implement a timing attack on a TSN node 104, such as a diagnostic stream producer 602, in order to desynchronize the synchronized timing of the TSN 102. For instance, an attacker may inject malicious software (malware) into the diagnostic stream producer 602 or inject fake data into timing information received by the diagnostic stream producer 602 in order to cause a local clock 108 for the diagnostic stream producer 602 to maintain a local time that is different from the network time of the TSN 102. The desynchronization causes the diagnostic stream producer 602 to shift its assigned timing window 670, due to clock drift, which impacts traffic scheduling. This deteriorates timing guarantees between the diagnostic stream producer 602 and other TSN nodes 104 in the TSN 102, such as the diagnostic stream consumer 604, for example. Another example of an attack is when other TSN nodes 104 along a network path to the monitor 614 (e.g., intermediate nodes) are impacted and therefore a misalignment of the windows will occur at these TSN nodes 104.

The diagnostic stream producer 602 may generate diagnostic information that can be used by the diagnostic stream consumer 604 to detect misalignment of a timing window 670 for the diagnostic stream producer 602. The diagnostic stream producer 602 may send a specially crafted set of ACPs 612 in one or more diagnostic messages that collectively form a diagnostic stream 636 towards the diagnostic stream consumer 604. The specially crafted set of packets may be referred to individually as an ACP 612 or collectively as a set of ACPs 612. The diagnostic stream producer 602 may communicate diagnostic messages 642 with the set of ACPs 612 using an in-band channel such as the unified stream 638 (e.g., interleaved within normal data streams using a priority scheme) of the TSN 102 or an out-of-band channel such as the diagnostic stream 636 (e.g., a dedicated diagnostic channel reserved only for diagnostic traffic) of the TSN 102. The diagnostic stream consumer 604 may include a monitor 614 that parses the diagnostic stream 636 or the unified stream 638 for the diagnostic messages 642, analyzes the ACPs 612 carried by the diagnostic messages 642, and performs security inferences to determine whether a desynchronization event has occurred for the diagnostic stream producer 602 based on results of the analysis.

It may be possible, however, for an attacker to intercept the diagnostic messages 642 in order to modify the set of ACPs 612 or forge a fake set of ACPs 612. In order to enhance security for ACPs 612, each ACP 612 is designed to be unique, bounded to a TSN node 104, and unforgeable. An ACP 612 is made unique and unforgeable using a pair-wise cryptographic key shared between a TSN node 104 and a monitor 614. A keyed hash binds the node number and the packet sequence number. Further, each ACP has a unique identifier with a defined minimum size or bit-width. Forgery can happen during message relay within a resident time. After relaying a message, freshness of the identifier forces a brand-new forgery attempt. For example, an Ethernet packet minimum payload can accommodate identifiers up to 368 bits long.

The ACP generator 608 may generate a set of ACPs 612 for the diagnostic stream producer 602, where a given set of ACPs 612 comprises a number of ACP 1 through m, where m is any positive integer. The ACP generator 608 may determine a particular number of ACPs to generate for a given set of ACPs 612 by examining a time window 670 assigned to the diagnostic stream producer 602.

In one embodiment, the diagnostic stream producer 602 may transmit one or more diagnostic messages 642 using a dedicated diagnostic stream 636. In this case, the ACP generator 608 may determine a particular number of ACPs to generate for a given set of ACPs 612 by examining the time window 670. For example, assume the diagnostic stream producer 602 is assigned a time window 670 of a time interval T, where T is any positive integer. Further assume the interface 626 can transmit the diagnostic stream 636 within the entire time interval T, as denoted by transmit time t, where t represents any positive integer. The ACP generator 608 will generate a set of ACPs 612 that can fit within the entire time interval T, where T=t.

In one embodiment, the diagnostic stream producer 602 may transmit one or more diagnostic messages 642 using a shared unified stream 638. In this case, the ACP generator 608 may determine a particular number of ACPs to generate for a given set of ACPs 612 by examining the residual time left in the transmit window. For example, assume the diagnostic stream producer 602 is assigned a time window 670 of a time interval T, where T is any positive integer. Further assume the interface 626 can transmit the data stream 634 within the time interval T, as denoted by transmit time t, where t represents any positive integer. A residual time r is calculated as a difference between the time interval T and the transmit time t, where T−t=r.

The ACP generator 608 may determine a set of ACPs 612 associated with the diagnostic stream producer 602 that can be sent within the residual time r for the time window 670. Each ACP 612 of the set of ACPs 612 may have a defined size set by the ACP generator 608. Given a transmit speed of the interface 626 and/or the communication channel 208, the ACP generator 608 may determine a time value associated with each ACP 612 needed to transmit the ACP 612. The ACP generator 608 may determine a number of ACPs 612 it can generate that can be transmitted within the remaining residual time r for the transmit window 670 assigned to the diagnostic stream producer 602.

In one embodiment, for example, the ACP generator 608 may generate a single ACP 612 (e.g., m=1) within the set of ACPs 612 associated with the diagnostic stream producer 602. In one embodiment, for example, the ACP generator 608 may generate multiple ACPs 612 (e.g., m>1) within the set of ACPs 612 associated with the diagnostic stream producer 602.

An ACP 612 has a well-defined packet structure designed to carry diagnostic information associated with the diagnostic stream producer 602. An ACP 612 may be sent as a separate packet and/or frame with a defined structure, such as discussed with reference to FIG. 23, for example. Alternatively, an ACP 612 may be sent as part of another packet, such as a payload for an Ethernet packet, such as discussed with reference to FIG. 22. When using an Ethernet packet, for example, an ACP 612 may have a defined length of 368 bits, a node identifier to comprise a length of 8 bits, an ACP sequence number to comprise a length of 232 bits, and an authentication code to comprise a length of 128 bits.

Embodiments are not limited to this particular packet structure, fields, or field lengths. The Ethernet packet carries one ACP in its payload. The Ethernet packet is the smallest option that provides higher granularity. However, other network packets could be used higher in the network stack, such as Internet Protocol (IP) frames, User Datagram Protocol (UDP) datagrams. Note these options may start to increase the granularity of quantification of misalignment due to a given packet size.

Each ACP 612 may include diagnostic information associated with the diagnostic stream producer 602. The diagnostic information may comprise a node identifier for the diagnostic stream producer 602, an ACP sequence number, an authentication code for the diagnostic stream producer 602. The diagnostic information may optionally include security information, measurements, key performance indicators (KPIs), status information, etc., from any monitoring hardware or software that is assigned to monitor the diagnostic stream producer 602.

The diagnostic information may comprise a node identifier. A node identifier is a unique identifier for a TSN node 104. The node identifier indicates a TSN node that originates a given ACP 612. For example, assume a TSN 102 comprises a set of TSN nodes 1 through n, where n represents any positive integer. Further assume the TSN 102 comprise five TSN nodes (e.g., n=5). Each TSN node is assigned a node identifier from 1 to 5. If a TSN node 3 generates a set of ACPs 612 that is part of a diagnostic message 642, a diagnostic stream producer 602 or a diagnostic stream consumer 604 that receives the diagnostic message 642 may use the node identifier to determine that the ACP 612 was generated by the TSN node 3. In one embodiment, for example, the node identifier is a unique identifier for the diagnostic stream producer 602, the node identifier having a defined minimum size (or bit-width) to prevent forgeries.

The diagnostic information may comprise a set of ACPs 612, each ACP 612 having an ACP sequence number 1 through m, where m represents any positive integer. The ACP generator 608 may generate and arrange the set of ACPs 612 within the diagnostic message 642 according to a sequence, where the ACP sequence number represents an ordered number for an ACP 612 in an ordered number of ACPs 612 within the sequence. For instance, assume a diagnostic stream producer 602 transmits a set of ACPs 612 comprising 1 through m, where m is set to 5. The ACP generator 608 may assign a first ACP with an ACP sequence number of 1, a second ACP with an ACP sequence number of 2, and so forth through the fifth ACP with an ACP sequence number of 5.

The diagnostic information may comprise an authentication code. In one embodiment, for example, the authentication code may be generated by a cryptographic key used by the diagnostic stream producer 602 and the diagnostic stream consumer 604 of the TSN 102. The authentication code may represent any cryptographically secure authentication code generated in accordance with a given cryptographic scheme, such as symmetric-key schemes, asymmetric-key schemes, public key encryption schemes, Rivest-Shamir-Adleman (RSA) public key encryption schemes, and so forth. Embodiments are not limited to a particular cryptographic scheme.

For example, the processor circuitry 622 may execute instructions for a cryptographic engine 610. The cryptographic engine 610 may generate authentication codes for the diagnostic stream producer 602. The cryptographic engine 610 may receive as input a set of cryptographic information, such as a symmetric or asymmetric security key, and output the authentication codes based on the security key. The ACP generator 608 may receive as input the authentication codes from the cryptographic engine 610, and insert an authentication code into the ACPs 612 associated with the diagnostic stream producer 602.

Once the ACP generator 608 generates the ACPs 612, the ACP generator 608 may insert the set of ACPs 612 into one or more diagnostic streams 636. For instance, a set of ACPs 612 may be sent as individual messages, where each ACP 612 is sent in sequence to form the diagnostic stream 636. If misalignment occur, individual ACPs will be lost along the way, and this independence is how the monitor 614 is able to determine which one "survived" the journey up to the monitor 614. Alternatively, the ACP generator 608 may insert the ACPs 612 into one or more diagnostic messages 642. A diagnostic message 642 may comprise a single ACP 612 or a set of ACPs 612, and in some cases, may include other types of diagnostic information. Embodiments are not limited in this context.

An interface 626 may send the diagnostic messages 642 with the set of ACPs 612 in a diagnostic stream 636 and/or a unified stream 638 from the diagnostic stream producer 602 to the diagnostic stream consumer 604 within the residual time for the time window assigned to the diagnostic stream producer 602. Continuing with the previous example, if the set of ACPs 612 comprises 5 ACPs 612 denoted 1 through 5, then the 5-ACP diagnostic stream 636 will comprise the 5 ACPs 612 having ACP sequence numbers 1 through 5.

In various embodiments, the interface 626 will transmit the 5 ACPs 612 in reverse order from highest to lowest ACP sequence number, starting with ACP5, ACP4, ACP3, ACP2, and ACP1. This will allow the monitor 614 to quickly determine a number of dropped ACPs 612 based on a lowest ACP sequence number received by the diagnostic stream consumer 604. However, it may be possible for the interface 626 to transmit the 5 ACPs 612 in order from lowest to highest ACP sequence number. This would necessitate additional signaling overhead and information inserted into the diagnostic messages 642, such as an original number of ACPs 612 generated for the diagnostic stream producer 602.

In some cases, the diagnostic stream producer 602 may have an IDS 110 monitoring operations for the diagnostic stream producer 602. In such cases, the diagnostic information may optionally comprise security information from the IDS 110 associated with the diagnostic stream producer 602. The diagnostic stream producer 602 may determine whether security information has been generated for the diagnostic stream producer 602 by the IDS 110, and retrieve the security information from the IDS 110. The diagnostic stream producer 602 may add the security information to one or more ACPs 612, or in a different portion of the diagnostic message 642 (e.g., a different field), and send the diagnostic message 642 with the set of ACPs 612 and the security information from the IDS 110 from the diagnostic stream producer 602 to the diagnostic stream consumer 604 within the residual time for the time window assigned to the diagnostic stream producer 602.

In one embodiment, for example, a diagnostic stream consumer 604 such as a TSN 104 may be implemented, at least in part, by a computing apparatus that includes processor circuitry 628, memory 630 and an interface 632. The memory 630 may be communicatively coupled to the processor circuitry 628 and the interface 632. The memory 630 may store instructions that when executed by the processor circuitry 628, causes the processor circuitry 628 to perform one or more operations for a diagnostic stream consumer 604. Additionally, or alternatively, the operations may be executed by dedicated hardware (e.g., DSP, ASIC, FPGA, circuitry, etc.), or a combination of hardware and software. Embodiments are not limited in this context.

The processor circuitry 628 may execute instructions for a monitor 614. The monitor 614 may receive one or more diagnostic messages 642 from a diagnostic stream 636 or a unified stream 638 via the interface 632. As described with reference to the diagnostic stream producer 602, a diagnostic message 642 may comprise a set of ACPs 612 for a TSN node 104, such as the diagnostic stream producer 602. For example, the set of ACPs 612 may include a first node ACP from a first set of ACPs 612 associated with a first TSN node 104 in the TSN 102. The first TSN node 104 may comprise, for example, a diagnostic stream producer 602. The first node ACP may carry diagnostic information associated with the first TSN node 104. For example, the diagnostic information may comprise, among other types of information, a node identifier for the first TSN node 104, an ACP sequence number for the first TSN node 104, and an authentication code for the first TSN node 104. The first node ACP may have a defined size known by the diagnostic stream consumer 604.

The processor circuitry 628 may execute instructions for a cryptographic engine 618 to authenticate the first node ACP based on the authentication code. The cryptographic engine 618 may receive as input the authentication code and a set of cryptographic information, such as a symmetric or asymmetric security key, and output a verification that the authentication code is based on the security key. The monitor 614 may receive as input the verification or authentication from the cryptographic engine 618.

In some cases, authentication does not verify. For example, this can happen when a forgery attack is attempted. The forged ACPs can indicate where the forgery is happening. TSN nodes 104 closer to the monitor 614 would have their ACPs 612 authentication verified, but at some depth of the network, the ACPs will start not to verify due to forgery. This also indicates that an anomaly, likely an attack, is happening. In some cases, but not all, it is even possible to distinguish an anomaly from an attack. In an anomaly, usually some packets are corrupted and do not verify. In an attack, the adversary may try to forge as much as possible to maximize the likelihood of a forged packet to go through. However, the attacker may attempt to affect a selected number of ACPs, and that would appear like an anomaly to the monitor 614.

Once authentication and verification is complete, the monitor 614 may determine a number of dropped ACPs from the first set of ACPs 612 associated with the first TSN node 104 that were not received within a time window associated with the first TSN node 104. The diagnostic stream consumer 604 has a schedule of time windows assigned to some or all of the TSN nodes 104 within the TSN 102, including the diagnostic stream producer 602. The diagnostic stream consumer 604 monitors the time window assigned to the diagnostic stream producer 602 when receiving the ACPs 612 from the diagnostic stream producer 602. When an ACP 612 is received within the time window, it is stored in memory 630 as a received ACP of a set of received ACPs 620, where a number of received ACPs 620 is 1 through q, where q is any positive integer. When an ACP 612 is not received within the time window, however, it is dropped by the diagnostic stream consumer 604. Consequently, the set of ACPs 612 transmitted by the diagnostic stream producer 602 may not equal the set of ACPs 620 received by the diagnostic stream consumer 604. For example, in some cases, the set of ACPs 612 transmitted by the diagnostic stream producer 602 will be less than the set of ACPs 620 received by the diagnostic stream consumer 604. One reason for this difference is that the local clock 108 for the diagnostic stream producer 602 has been compromised, due to time bias introduced by an attacker, and therefore is no longer synchronized to the local clock 108 of the diagnostic stream consumer 604. As such, the time window assigned to the diagnostic stream producer 602 and calculated by the compromised local clock 108 of the diagnostic stream producer 602 to transmit the set of ACPs 612 will be different from the time window calculated by the non-compromised local clock 108 of the diagnostic stream consumer 604.

One way the monitor 614 may detect when the local clock 108 of the diagnostic stream producer 602 has been compromised is by inspecting the ACP sequence number of the first node ACP. The monitor 614 may determine or estimate a desynchronization time for the first TSN node 104 based on the number of dropped ACPs from the first set of ACPs 612 associated with the first TSN node 104 and the defined size for the first node ACP. Since the monitor 614 knows that each ACP 612 has a defined size, and it knows a communications speed of the TSN 102, the monitor 614 may calculate an estimated time value associated with each dropped ACP 612. For instance, if there were originally 5 ACPs 612 (e.g., m=5) transmitted and only 2 ACPs 612 were received within the time window (e.g., received ACPs 620 where q=2), this means 3 ACPs 612 were dropped (e.g., m−q=5−2=3 dropped ACPs 612). In this case, the monitor 614 will calculate a time value for the 3 dropped ACPs, which when summed equal to the amount of time (e.g., a desynchronization time) that the first TSN node 104 has desynchronized relatively to its neighbor. The monitor 614 may compare the desynchronization time with a defined threshold, determine whether the comparison indicates sufficient evidence of a security attack on the first TSN node 104, and output a control signal to indicate there is sufficient evidence of a security attack to generate an alarm or alert and take corrective security actions in response to the security attack.

It is worthy to note that if an ACP is dropped due to a misalignment in time of the windows, it is either the receiver or the transmitter that is off. The monitor 614 may not be able to distinguish immediately which TSN node 104 is desynchronized, as the window shift is relative in time. However, as the diagnostic stream progresses, and more ACPs are dropped or not dropped, it is possible for the monitor 614 to identify which node is the one indeed, in relation to its peer, that has shifted (e.g., desynchronized) in time.

The processor circuitry 628 may execute instructions for an alert generator 616. The alert generator 616 may receive the control signal indicating an attack on the first TSN node 104 from the monitor 614, and generate an alert for the TSN 102 indicating the first TSN node 104 is under a security attack. The diagnostic stream consumer 604 may send an alert message to a CNC or a SIEM via the interface 632. The CNC or SIEM may initiate security procedures in response to the security attack, such as isolating the first TSN node 104, updating routing tables for other TSN nodes 104 within the TSN 102 (e.g., switch nodes, relay nodes, etc.), informing neighboring TSN nodes of the attack on the first TSN node 104, and other corrective actions.

Figure 6B:
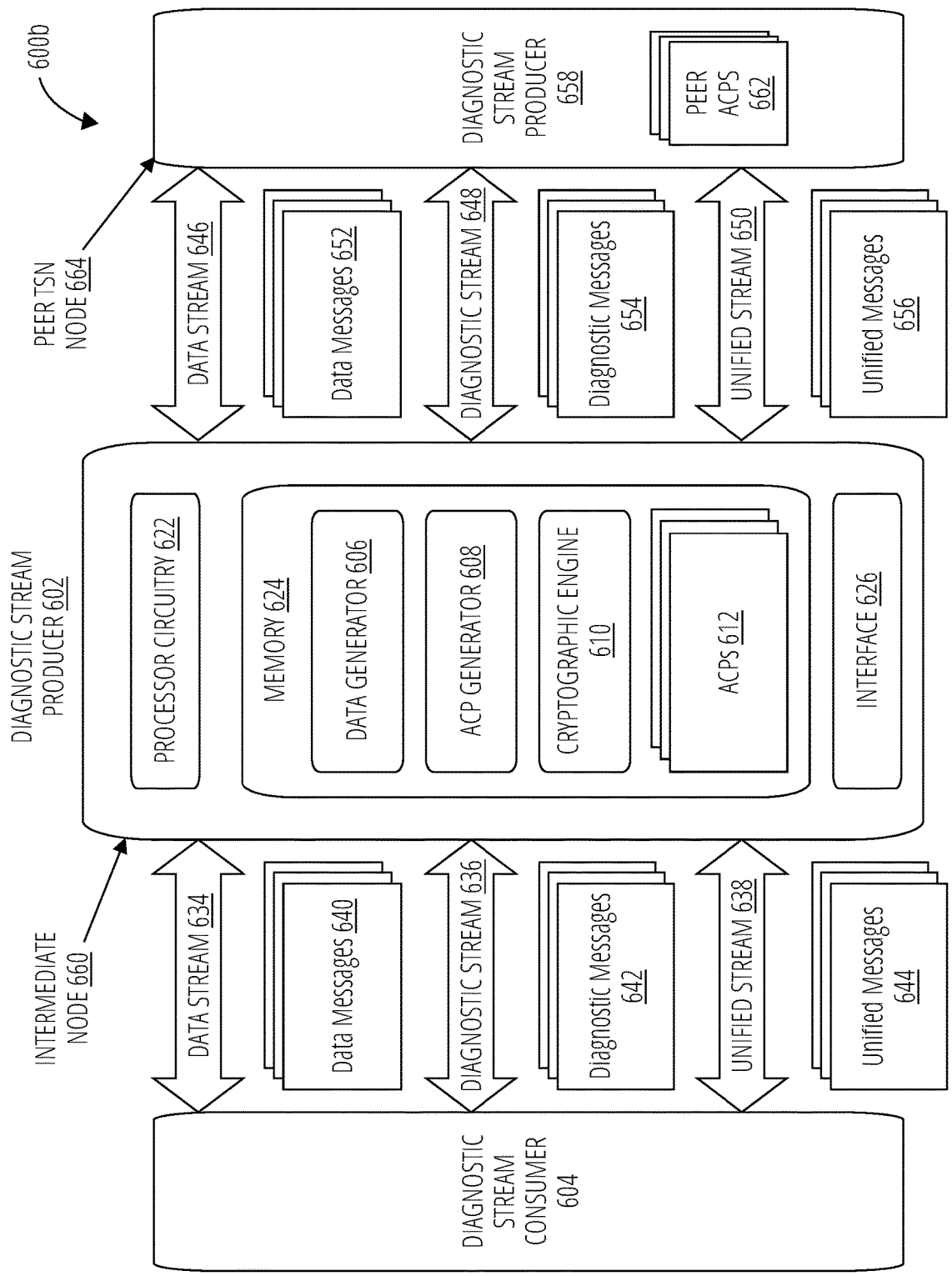
FIG. 6B illustrates an aspect of a system 600b in accordance with one embodiment.

FIG. 6B illustrates a system 600b suitable for a TSN, such as the TSN 102, for example. As depicted in FIG. 6B, the system 600b may be similar to system 600a. The system 600*b*, however, further depicts the first diagnostic stream producer 602 operating as an intermediate node 660 between a second diagnostic stream producer 658 and the diagnostic stream consumer 604. The second diagnostic stream producer 658 may be the same or similar to the first diagnostic stream producer 602 in structure and functions.

As depicted in FIG. 6B, the diagnostic stream producer 602 may comprise an intermediate node 660 in a network path between the second diagnostic stream producer 658 and the diagnostic stream consumer 604. In addition to generating a set of ACPs 612 for the diagnostic stream producer 602, the ACP generator 608 of the diagnostic stream producer 602 may determine that a set of peer ACPs 662 associated with a peer TSN node 664 in the TSN 102 have been received by the diagnostic stream producer 602. A number of given peer ACPs 662 is 1 through p, where p is any integer. The peer TSN node 664 may be implemented as, for example, the diagnostic stream producer 658.

As with an ACP 612, each peer ACP 662 in the set of peer ACPs 662 may have an ACP sequence number. The ACP generator 608 may retrieve a peer ACP 662 from the set of peer ACPs 662 having an ACP sequence number that is a lowest ACP sequence number of the other peer ACPs 662 within the set of peer ACPs 662. Since each peer ACP 662 has an assigned ACP sequence number in order from smallest value (e.g., 1) to a largest value (e.g., p), the ACP generator 608 may sort the ACP sequence numbers from the smallest value to the largest value, and select the ACP sequence numbers of the sorted order of ACP sequence numbers that has a lowest ACP sequence number in the order of ACP sequence numbers. For example, assume the diagnostic stream producer 658 transmits a set of 1 through p peer ACPs 662, where p=10. Further assume that only 5 of the peer ACPs 662 were received within a transmit window for the diagnostic stream producer 658 as monitored by the diagnostic stream producer 602. This means that the peer ACPs 662 having the ACP sequence numbers of 10 through 6 were received within the time window, and the peer ACPs 662 having the ACP sequence numbers of 5 through 1 were dropped. The peer ACP 662 from the set of peer ACPs 662 having an ACP sequence number of 6 is the lowest ACP sequence number of the peer ACPs 662 that were transmitted from the diagnostic stream producer 658 and received by the diagnostic stream producer 602.

The ACP generator 608 may discard any peer ACPs 662 from the set of peer ACPs 662 having an ACP sequence number that is lower than the lowest ACP sequence number, which in the previous example is peer ACPs 662 having ACP sequence numbers 1 through 5. The diagnostic stream producer 602 may send the diagnostic message 642 with the set of ACPs 612 and the peer ACP with the lowest ACP sequence number, which in the previous example is peer ACP 662 having an ACP sequence number of 6, from the diagnostic stream producer 602 to the diagnostic stream consumer 604 within the residual time for the time window assigned to the diagnostic stream producer 602.

Operations and additional examples for the systems 600*a*, 600*b* will be described with reference to FIGS. 7-21, particularly with respect to the TSN 102 having multiple TSN nodes 104 in a given network topology.

Operations for the disclosed embodiments may be further described with reference to the following figures. Some of the figures may include a logic flow. Although such figures presented herein may include a particular logic flow, it can be appreciated that the logic flow merely provides an example of how the general functionality as described herein can be implemented. Further, a given logic flow does not necessarily have to be executed in the order presented unless otherwise indicated. Moreover, not all acts illustrated in a logic flow may be required in some embodiments. In addition, the given logic flow may be implemented by a hardware element, a software element executed by a processor, or any combination thereof. The embodiments are not limited in this context.

Figure 7A:
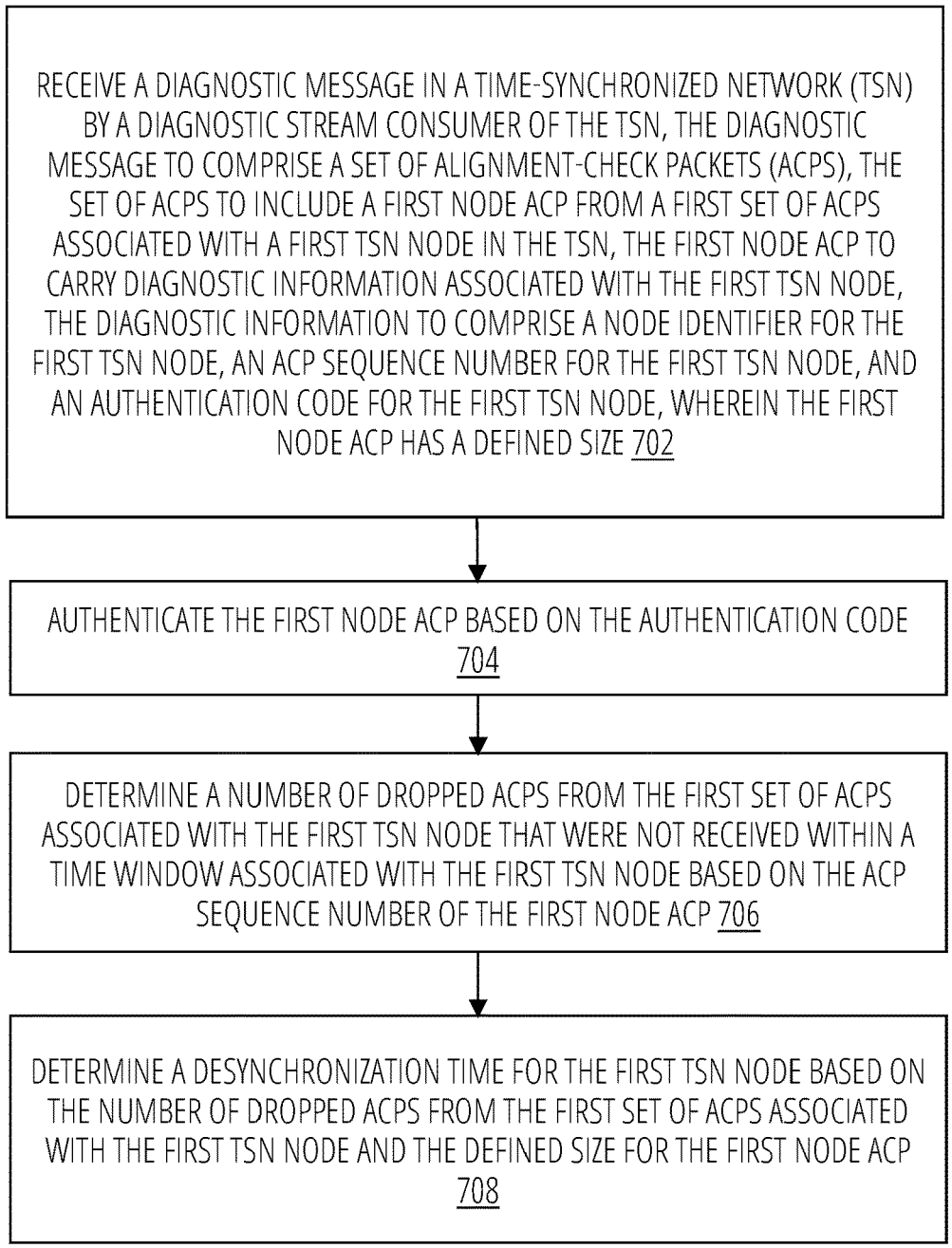
FIG. 7A illustrates a logic flow 700a in accordance with one embodiment.

FIG. 7A illustrates an embodiment of a logic flow 700*a*. The logic flow 700*a* may be representative of some or all of the operations executed by one or more embodiments described herein. For example, the logic flow 700*a* may include some or all of the operations performed by devices or entities within the TSNs 102, 200 or 300, the TSN node 104, the IDS 110, the apparatus 400, the apparatus 500, and/or the systems 600*a*, 600*b*. More particularly, the logic flow 700*a* illustrates an example where a diagnostic stream consumer 604 receives a diagnostic stream 636 or a unified stream 638 transporting diagnostic information for one or more TSN nodes 104, and analyzes the diagnostic information to determine whether the one or more TSN nodes 104 are under a security attack based on the analysis.

In block 702, logic flow 700*a* receives a diagnostic message in a time-synchronized network (TSN) by a diagnostic consumer node of the TSN, the diagnostic message to comprise a set of alignment-check packets (ACPs), the set of ACPs to include a first node ACP from a first set of ACPs associated with a first TSN node in the TSN, the first node ACP to carry diagnostic information associated with the first TSN node, the diagnostic information to comprise a node identifier for the first TSN node, an ACP sequence number for the first TSN node, and an authentication code for the first TSN node, wherein the first node ACP has a defined size. For example, a diagnostic stream consumer 604 receives a diagnostic message 642 in a TSN 102. The diagnostic message 642 comprises a set of one or more ACPs 612. The set of ACPs 612 include a first node ACP from a first set of ACPs 612 associated with a first TSN node 104 in the TSN 102. The first TSN node may comprise, for example, a diagnostic stream producer 602. The first node ACP carries diagnostic information associated with the first TSN node. The diagnostic information comprises a node identifier for the first TSN node, an ACP sequence number for the first TSN node, and an authentication code for the first TSN node. The first node ACP has a defined size by TSN protocol design.

In block 704, logic flow 700*a* authenticates the first node ACP based on the authentication code. For example, a cryptographic engine 618 for the diagnostic stream consumer 604 may authenticate the first node ACP based on the authentication code in the first node ACP. Failed authentication operations may localize which TSN node 104 is under attack, such as when ACPs are forged, as previously discussed.

In block 706, logic flow 700*a* determines a number of dropped ACPs from the first set of ACPs associated with the first TSN node that were not received within a time window associated with the first TSN node based on the ACP sequence number of the first node ACP. For example, a monitor 614 for the diagnostic stream consumer 604 may determine a number of dropped ACPs from the first set of ACPs 612 associated with the first TSN node 104 that were not received within a time window 670 associated with the first TSN node 104 based on the ACP sequence number of the first node ACP, when the ACP sequence number is the lowest ACP sequence number of the first set of ACPs 612 transmitted by the diagnostic stream producer 602 and received by the diagnostic stream consumer 604. For instance, assume the diagnostic stream producer 602 transmits 10 ACPs 612 denoted 1 through 10 in the time window 670, and the diagnostic stream consumer 604 only receives 5 ACPs 612 denoted 6-10 in the time window 670, the first node ACP will have a lowest ACP sequence number of 6. In this example, the monitor 614 will calculate a number of 5 ACPs 612 (e.g., ACPs 1 through 5) dropped by the diagnostic stream consumer 604.

In block 708, logic flow 700a determines a desynchronization time for the first TSN node based on the number of dropped ACPs from the first set of ACPs associated with the first TSN node and the defined size for the first node ACP. For example, the monitor 614 may determine a desynchronization time for the first TSN node 104 based on the number of dropped ACPs from the first set of ACPs 612 associated with the first TSN node 104 and the defined size for the first node ACP. The monitor 614 may compare the desynchronization time with a defined threshold value, and output a control signal to an alert generator 616 for the diagnostic stream consumer 604. The alert generator 616 may generate an alert and initiate security protocols to take corrective actions in response to the alert.

Figure 7B:
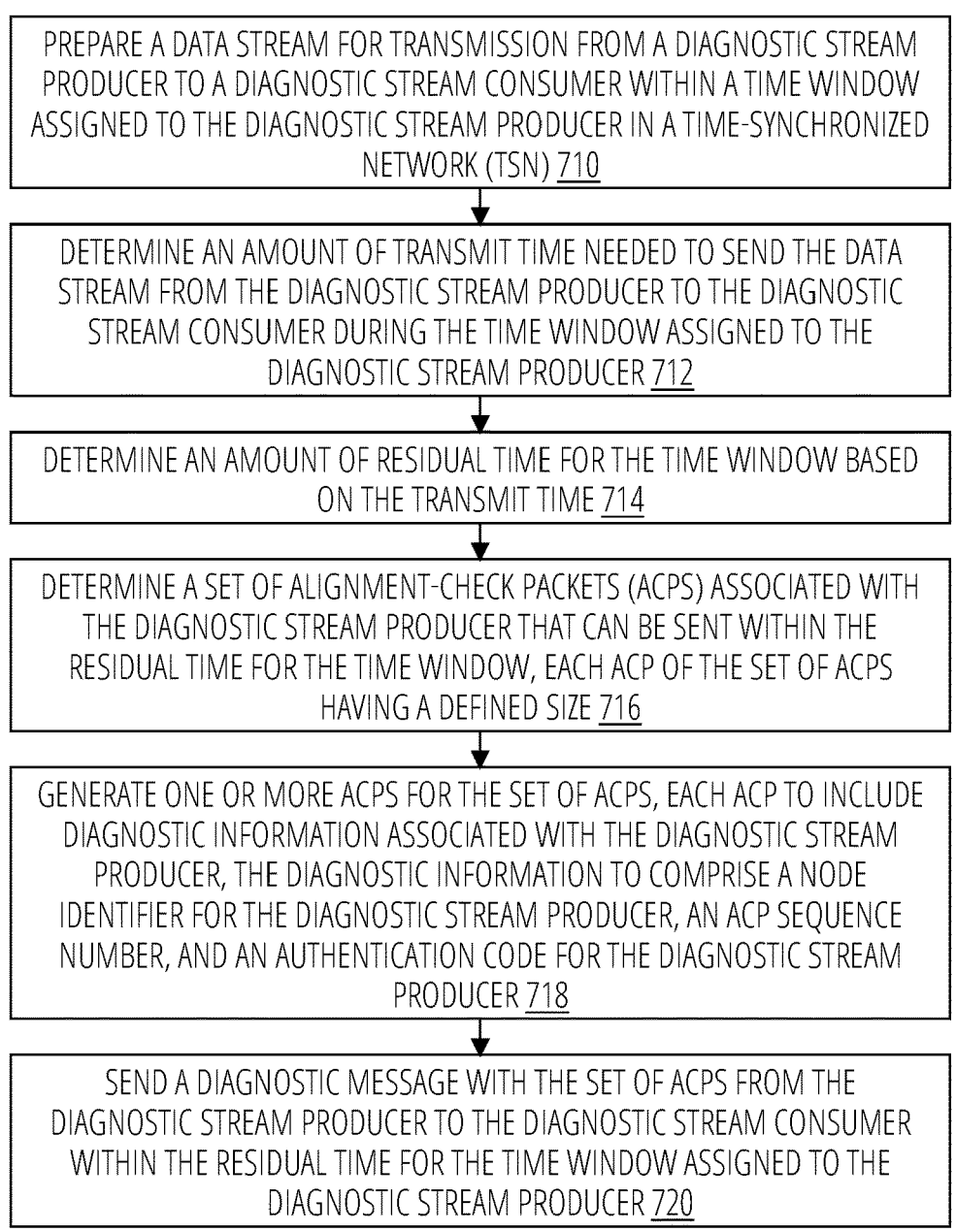
FIG. 7B illustrates a logic flow 700b in accordance with one embodiment.

FIG. 7B illustrates an embodiment of a logic flow 700b. The logic flow 700b may be representative of some or all of the operations executed by one or more embodiments described herein. For example, the logic flow 700b may include some or all of the operations performed by devices or entities within the TSNs 102, 200 or 300, the TSN node 104, the IDS 110, the apparatus 400, the apparatus 500, and/or the systems 600a, 600b. More particularly, the logic flow 700b illustrates an example where a diagnostic stream producer 602 sends a unified stream 638 transporting diagnostic information for one or more TSN nodes 104 to a diagnostic stream consumer 604. The diagnostic stream consumer 604 may analyze the diagnostic information to determine whether the one or more TSN nodes 104 are under a security attack based on the analysis.

In block 710, logic flow 700b prepares a data stream for transmission from a diagnostic stream producer to a diagnostic stream consumer within a time window assigned to the diagnostic stream producer in a time-synchronized network (TSN). For example, a diagnostic stream producer 602 may prepare a data stream 634 for transmission from the diagnostic stream producer 602 to a diagnostic stream consumer 604 within a time window 670 assigned to the diagnostic stream producer 602 in the TSN 102. In one embodiment, the CNC may assign the time window 670 to the diagnostic stream producer 602 and other TSN nodes 104 within the TSN 102 during a provisioning phase for the TSN nodes 104 in the TSN 102 and prior to a normal operating phase for the TSN nodes 104 in the TSN 102, e.g., before transmitting the data stream 634. In one embodiment, the CNC may dynamically assign the time window 670 during the operating phase of the TSN 102 using an update procedure for the TSN protocol.

In block 712, logic flow 700b determines an amount of transmit time needed to send the data stream from the diagnostic stream producer to the diagnostic stream consumer during the time window assigned to the diagnostic stream producer. For example, the ACP generator 608 for the diagnostic stream producer 602 may determine an amount of transmit time t needed to send the data stream 634 from the diagnostic stream producer 602 to the diagnostic stream consumer 604 during the time window 670 assigned to the diagnostic stream producer 602.

In block 714, logic flow 700b determines an amount of residual time for the time window based on the transmit time. For example, the ACP generator 608 may determine an amount of residual time r for the time window 670 having a time interval T based on the transmit time t, where T−t=r.

In block 716, logic flow 700b determines a set of alignment-check packets (ACPs) associated with the diagnostic stream producer that can be sent within the residual time for the time window, each ACP of the set of ACPs having a defined size. For example, the ACP generator 608 may determine a set of ACPs 612 1 through m associated with the diagnostic stream producer 602 that can be sent within the residual time r for the time window 670, each ACP 612 of the set of ACPs 612 having a defined size according to a given TSN protocol.

In block 718, logic flow 700b generates one or more ACPs for the set of ACPs, each ACP to include diagnostic information associated with the diagnostic stream producer, the diagnostic information to comprise a node identifier for the diagnostic stream producer, an ACP sequence number, and an authentication code for the diagnostic stream producer. The ACP generator 608 may generate one or more ACPs 612 for the set of ACPs 612, each ACP 612 to include diagnostic information associated with the diagnostic stream producer 602. The diagnostic information may comprise a node identifier for the diagnostic stream producer 602, an ACP sequence number, and an authentication code for the diagnostic stream producer 602.

In block 720, logic flow 700b sends a diagnostic message with the set of ACPs from the diagnostic stream producer to the diagnostic stream consumer within the residual time for the time window assigned to the diagnostic stream producer. For example, the diagnostic stream producer 602 may send a diagnostic message 642 with the set of ACPs 612 from the diagnostic stream producer 602 to the diagnostic stream consumer 604 within the residual time r for the time window 670 assigned to the diagnostic stream producer 602.

Figure 7C:
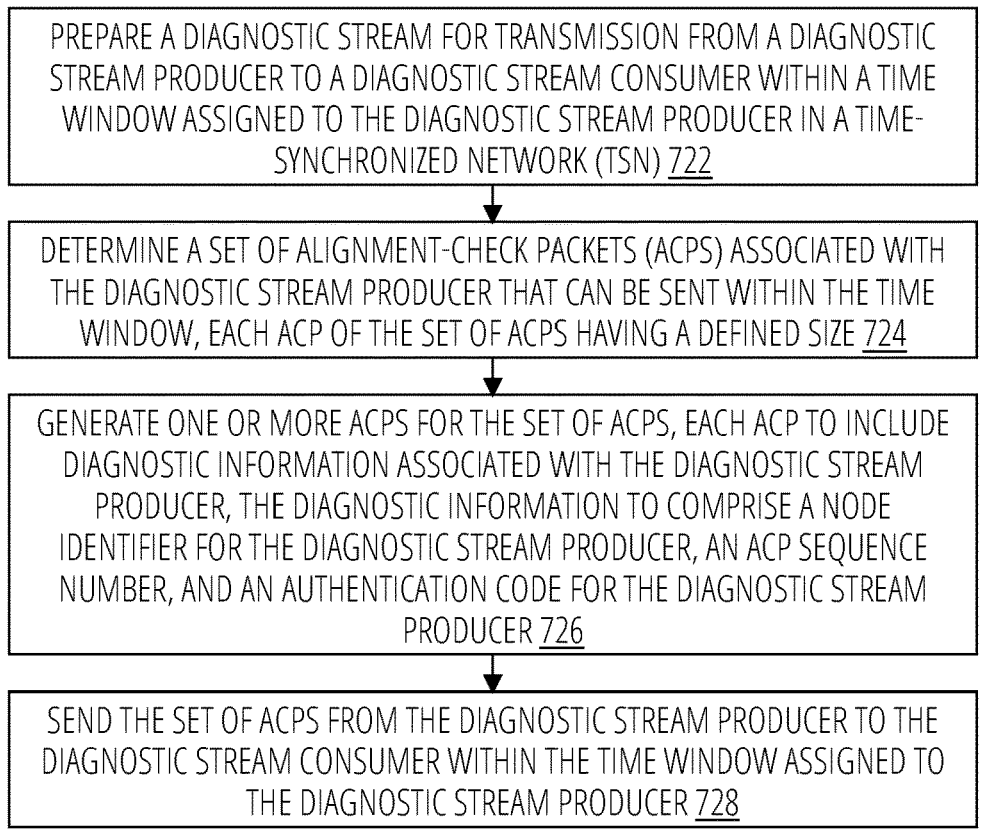
FIG. 7C illustrates a logic flow 700c in accordance with one embodiment.

FIG. 7C illustrates an embodiment of a logic flow 700c. The logic flow 700c may be representative of some or all of the operations executed by one or more embodiments described herein. For example, the logic flow 700c may include some or all of the operations performed by devices or entities within the TSNs 102, 200 or 300, the TSN node 104, the IDS 110, the apparatus 400, the apparatus 500, and/or the systems 600a, 600b. More particularly, the logic flow 700c illustrates an example where a diagnostic stream producer 602 sends a diagnostic stream 636 transporting diagnostic information for one or more TSN nodes 104 to a diagnostic stream consumer 604. The diagnostic stream consumer 604 may analyze the diagnostic information to determine whether the one or more TSN nodes 104 are under a security attack based on the analysis.

In block 722, logic flow 700c prepares a diagnostic stream for transmission from a diagnostic stream producer to a diagnostic stream consumer within a time window assigned to the diagnostic stream producer in a time-synchronized network (TSN). For instance, a diagnostic stream producer 602 may prepare a diagnostic stream 636 for transmission from the diagnostic stream producer 602 to a diagnostic stream consumer 604 within a time window assigned to the diagnostic stream producer 602 in TSN 102.

In block 724, logic flow 700c determines a set of alignment-check packets (ACPs) associated with the diagnostic stream producer that can be sent within the time window, each ACP of the set of ACPs having a defined size. For example, the ACP generator 608 of the diagnostic stream producer 602 may determine a set of ACPs 612 associated with the diagnostic stream producer 602 that can be sent within the time window, each ACP 612 of the set of ACPs 612 having a defined size or bit-width.

In block 726, logic flow 700c generates one or more ACPs for the set of ACPs, each ACP to include diagnostic information associated with the diagnostic stream producer, the diagnostic information to comprise a node identifier for the diagnostic stream producer, an ACP sequence number, and an authentication code for the diagnostic stream producer. For example, the ACP generator 608 may generate one or more ACPs 612 for the set of ACPs 612, each ACP 612 to include diagnostic information associated with the diagnostic stream producer 602, the diagnostic information to comprise a node identifier for the diagnostic stream producer 602, an ACP sequence number, and an authentication code for the diagnostic stream producer 602.

In block 728, logic flow 700c sends the set of ACPs from the diagnostic stream producer to the diagnostic stream consumer within the time window assigned to the diagnostic stream producer. For instance, the interface 626 of the diagnostic stream producer 602 may send the set of ACPs 612 from the diagnostic stream producer 602 to the diagnostic stream consumer 604 within the time window assigned to the diagnostic stream producer 602.

Figure 8:
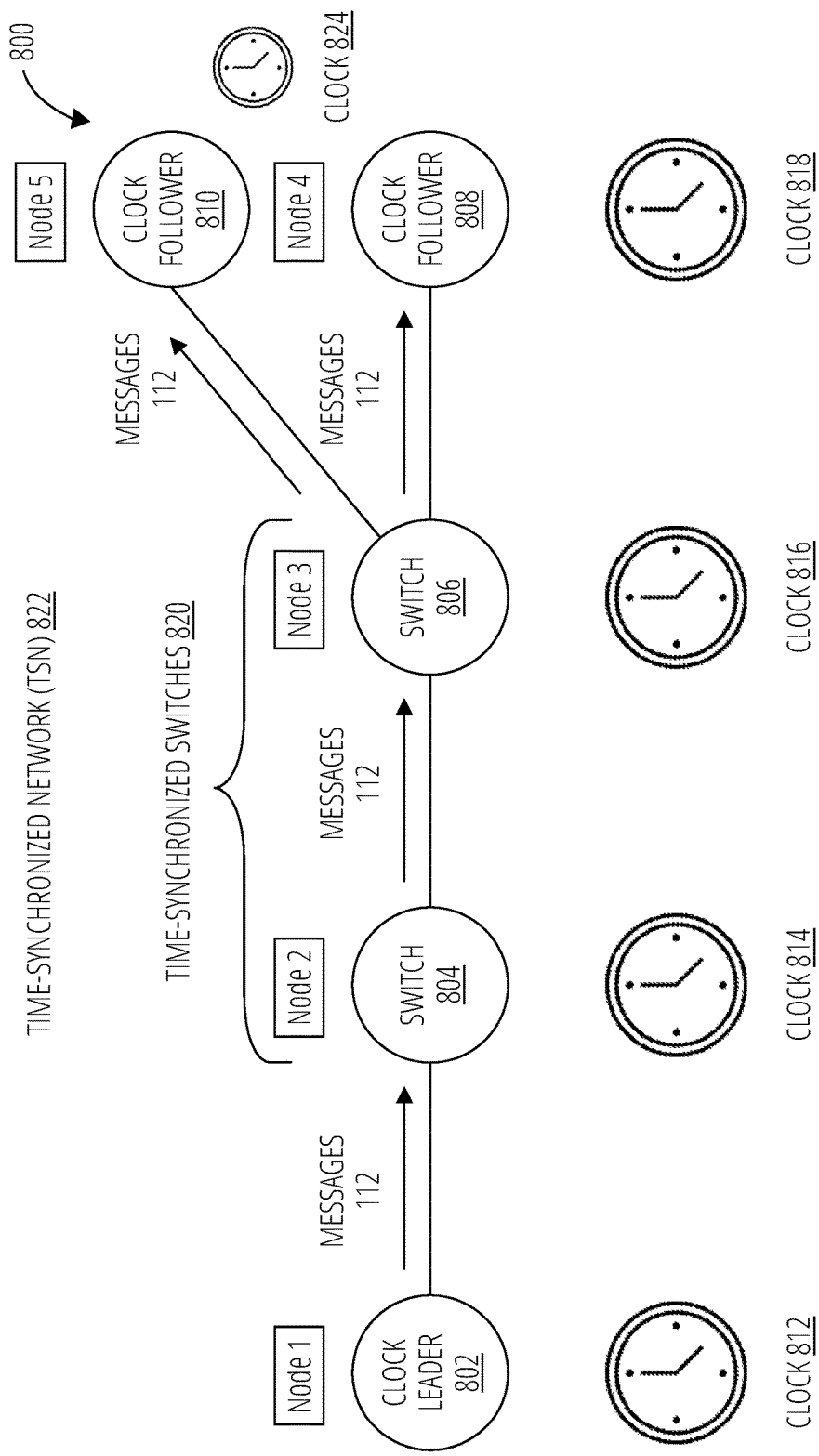
FIG. 8 illustrates an aspect of an operating environment 800 in accordance with one embodiment.

FIG. 8 illustrates an operating environment 800 for an exemplary time-synchronized network (TSN) 822 implementing one or more TSN protocols. The TSN 822 may comprise 5 TSN nodes labeled node 1, node 2, node 3, node 4 and node 5. Node 1 may comprise a clock leader 802 with a clock 812. Node 2 may comprise a switch 804 with a clock 814. Node 3 may comprise a switch 806 with a clock 816. Node 4 may comprise a clock follower 808 with a clock 818. Node 5 may comprise a clock follower 810 with a clock 824. Nodes 2, 3 may comprise time-synchronized switches 820. Nodes 1, 4 and 5 may comprise network nodes executing TSN applications that depend on timing provided by the clocks 812, 818 and 824, respectively.

As depicted in FIG. 8, the clock leader 802 may periodically send messages 112 with time information 418 to the clock followers 808, 810. The clock followers 808, 810 may update the clocks 818, 824, respectively, with the time information 418 to synchronize timing with the clock 812 of the clock leader 802. Similarly, the time-synchronized switches 820 comprising switch 804 and switch 806 will update the clocks 814, 816, respectively, to synchronize timing with the clock 812 of the clock leader 802.

Figure 9:
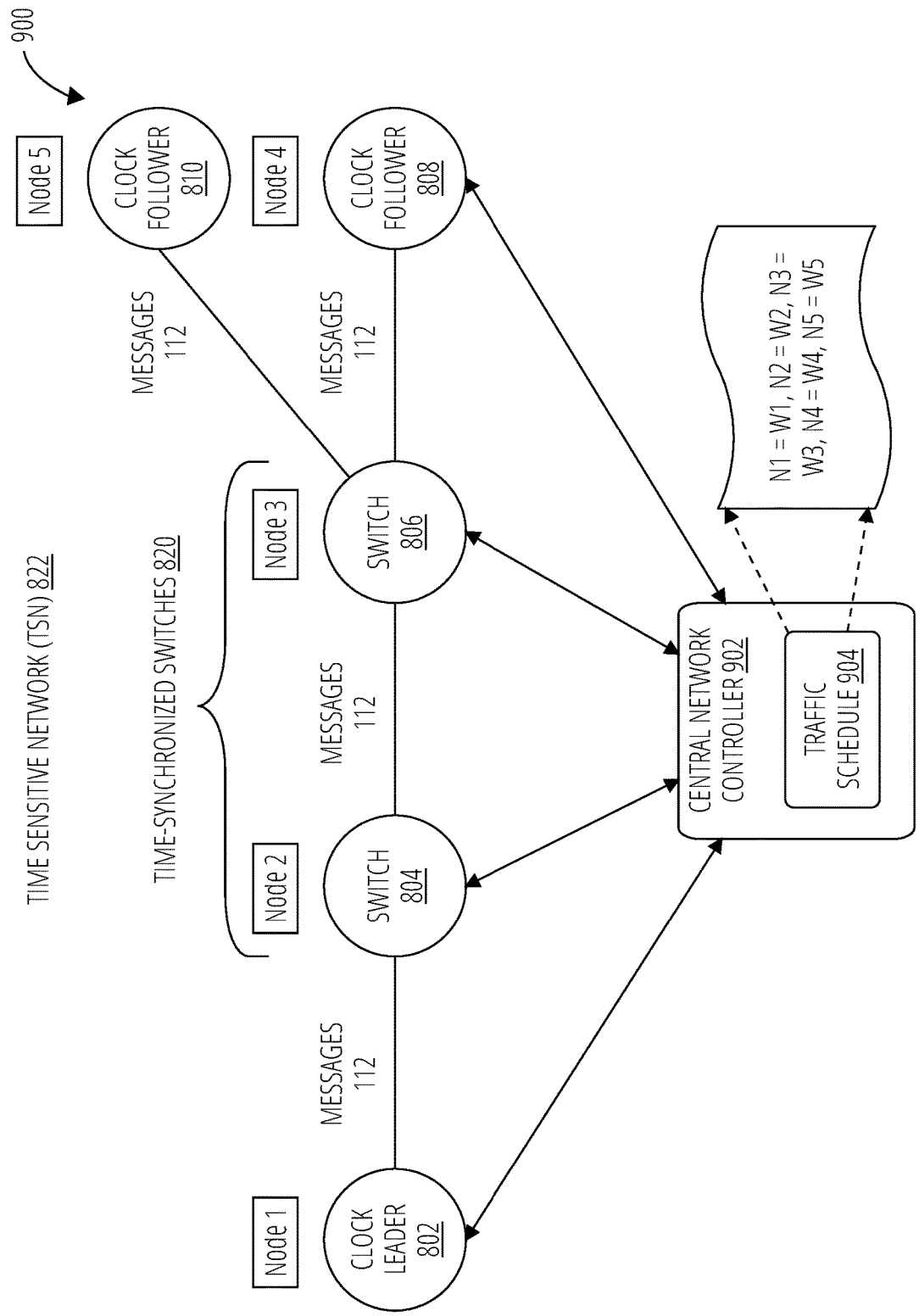
FIG. 9 illustrates an aspect of an operating environment 900 in accordance with one embodiment.

FIG. 9 illustrates an operating environment 900 for the TSN 822 implementing one or more TSN protocols, such as IEEE 802.1Qbv, for example. IEEE 802.1Qbv defines traffic scheduling for nodes 1 through 5 of the TSN 822. A central network controller 902 distributes a traffic schedule 904 to nodes 1 through 5. The traffic schedule 904 includes a time window assigned to each node 1 through 5. For instance, nodes (N) 1 through 5 may be assigned time windows (W) 1 through 5, respectively. Since the traffic schedule 904 is distributed to all the nodes 1 through 5, each of nodes 1 through 5 knows an assigned time window W1 through W5 for all nodes 1 through 5 in the TSN 102. This means each of nodes 1 through 5 can monitor an assigned time window W1 through W5 for any of the nodes 1 through 5, albeit using its own local clock.

Figure 10A:
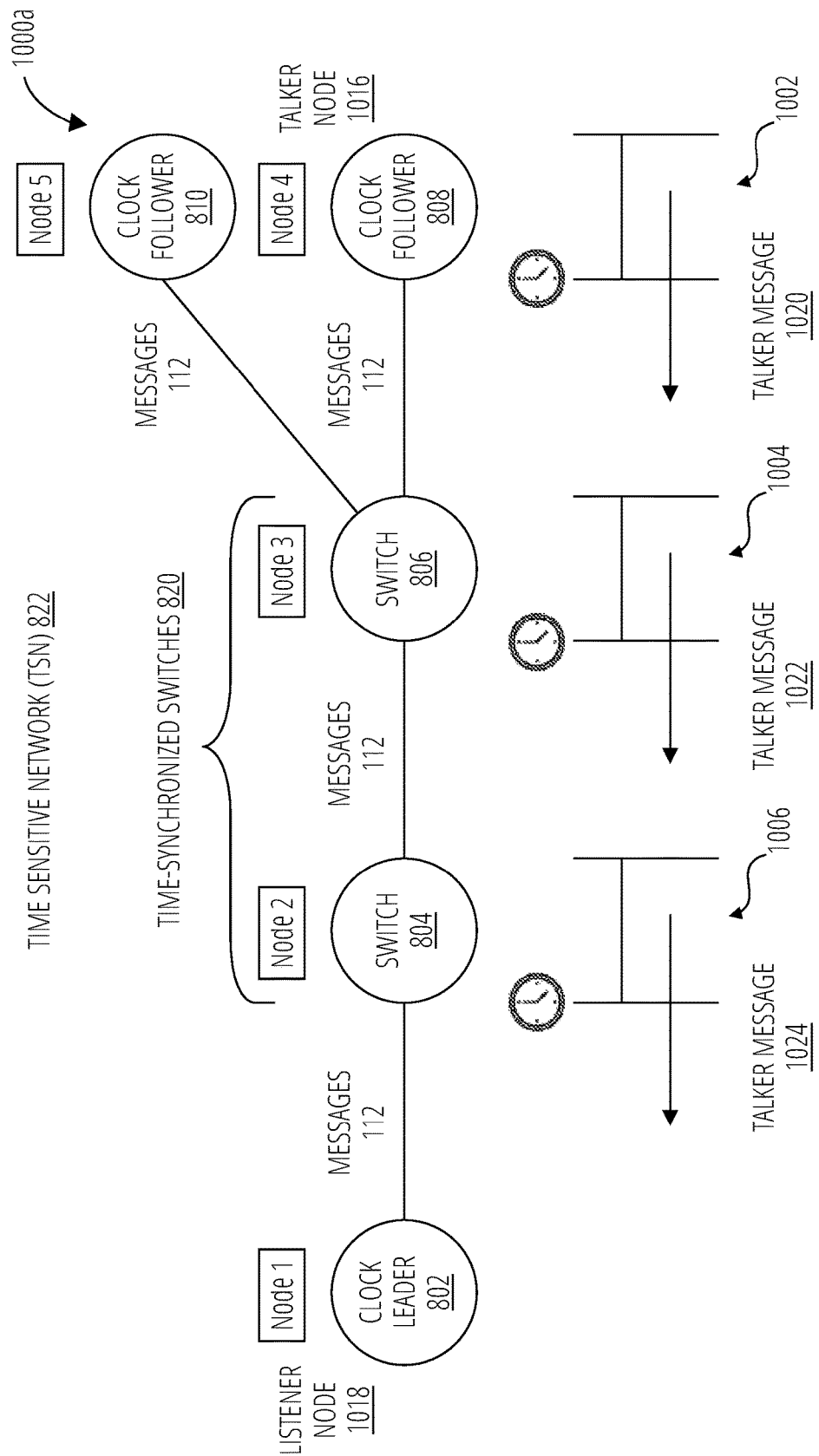
FIG. 10A illustrates an aspect of an operating environment 1000a in accordance with one embodiment.

FIG. 10A illustrates an operating environment 1000a for the TSN 822. Time-aware traffic shaping grants transmission windows to time-synchronized nodes 1 through 5. Each node 1 through 5 is assigned a specific transmission window W1 through W5 with a pre-determined cycle and duration. Data streams 634 flow between the various nodes 1 through 5, such as from a talker node 1016 to a listener node 1018 while traversing the time-synchronized switches 820. When the time-synchronized switches 820 need to transmit a data stream 634, they also operate as an intermediate talker node 1016. When the time-synchronized switches 820 need to consume a data stream 634, they also operate as a listener node 1018.

As depicted in FIG. 10A, node 4 is a clock follower 808 that is operating as a talker node 1016 to communicate a talker message 1020 during a time window 1002 (N4=W4). Node 3 is a switch 806 operating as a talker node 1016 to communicate a talker message 1022 during a time window 1004 (N3=W3). Similarly, node 2 is a switch 804 operating as a talker node 1016 to communicate a talker message 1024 during a time window 1006 (N2=W2). Node 1 is a clock leader 802 that is operating as a listener node 1018 to receive the talker messages 1020, 1022, 1024 from the nodes 4, 3, 2, respectively, via one or more data streams 634.

Figure 10B:
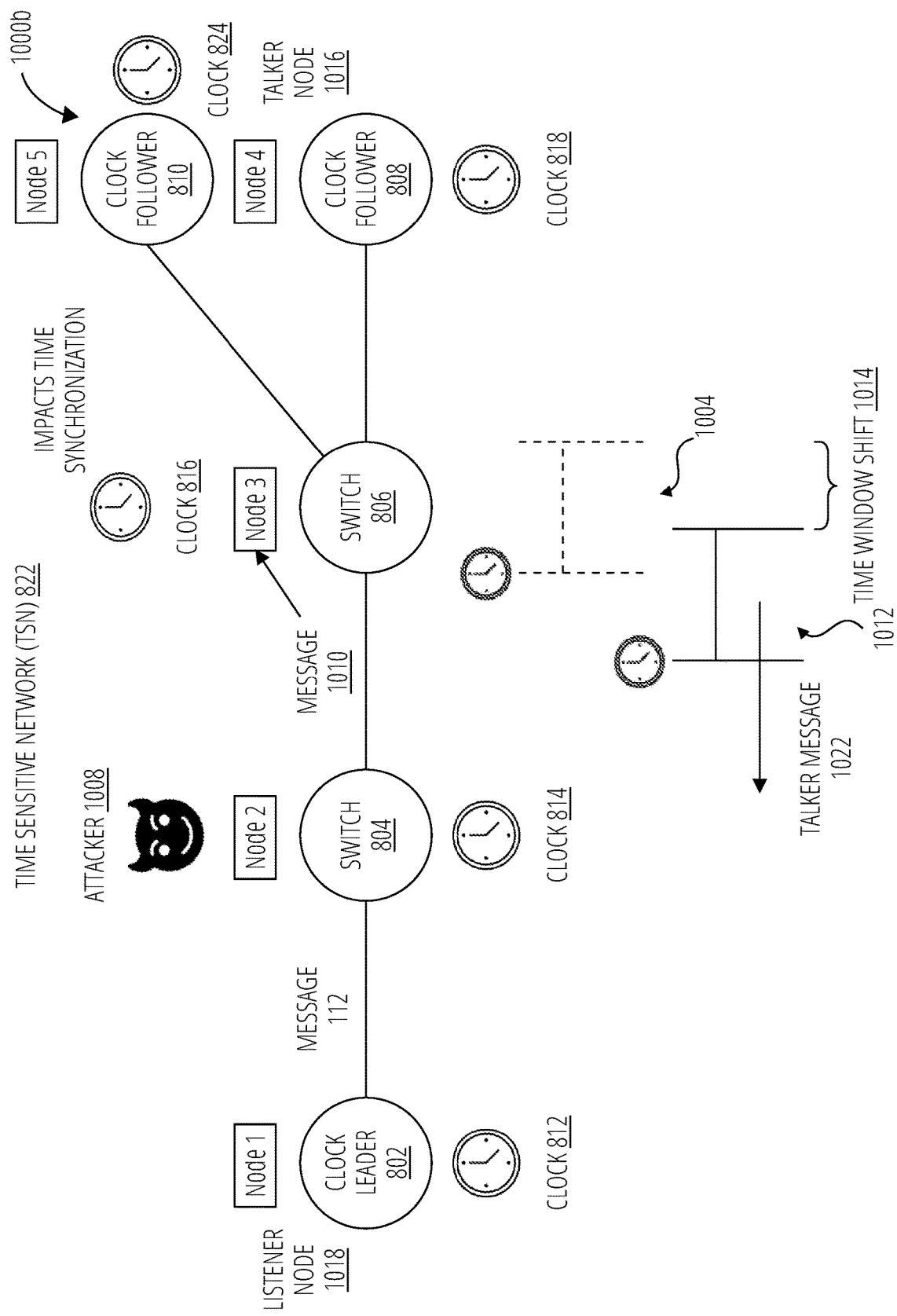
FIG. 10B illustrates an aspect of an operating environment 1000b in accordance with one embodiment.

FIG. 10B illustrates an operating environment 1000b for the TSN 822. An attacker 1008 may attempt to tamper with time synchronization for one or more of the nodes 1 through 5. The attack may cause one or more nodes 1 through 5 to be desynchronized in relation to the clock 812 of the clock leader 802. Consequently, the attack causes one or more nodes 1 through 5 to shift assigned time windows W1 through W5 in time impacting the traffic scheduling imposed by the traffic schedule 904 in accordance with IEEE 8021.Qbv. This deteriorates timing guarantees between the nodes 1 through 5 and any TSN applications 404 that depend on timing information from the nodes 1 through 5.

As shown in the operating environment 1000b, assume an attacker 1008 launches a timing attack or desynchronization attack against node 2 or switch 804. The attack causes the switch 804 to send a malicious message 1010 with erroneous timing information to node 3 or switch 806. The erroneous time information impacts time synchronization for the switch 806. The switch 806 updates the local clock 816 with the erroneous timing information, thereby causing the clock 816 to desynchronize from the network time maintained by the clock 812 of the clock leader 802. In addition, any TSN nodes 104 operating downstream from the switch 806 are similarly impacted by the attacker 1008, thereby causing an entire section of the TSN 102 to run local clocks at the same malicious time. This means that the clocks 818 and 824 for the clock follower 808 and the clock follower 810, respectively, are now on the same erroneous time reference as the switch 806.

As a result of the attacker 1008, the switch 806 uses the wrong time measurement to send the talker message 1022. Instead of using the time window 1004 assigned by the central network controller 902, the switch 806 uses the time window 1012, which represents a time window shift 1014 for the time window 1004. The time window shift 1014 causes a misalignment of the IEEE 802.1Qbv time windows for the nodes 1 through 5. Further, the switch 806 is rendered incapable of detecting any desynchronization attacks made on the clock follower 808 and the clock follower 810.

Figure 11A:
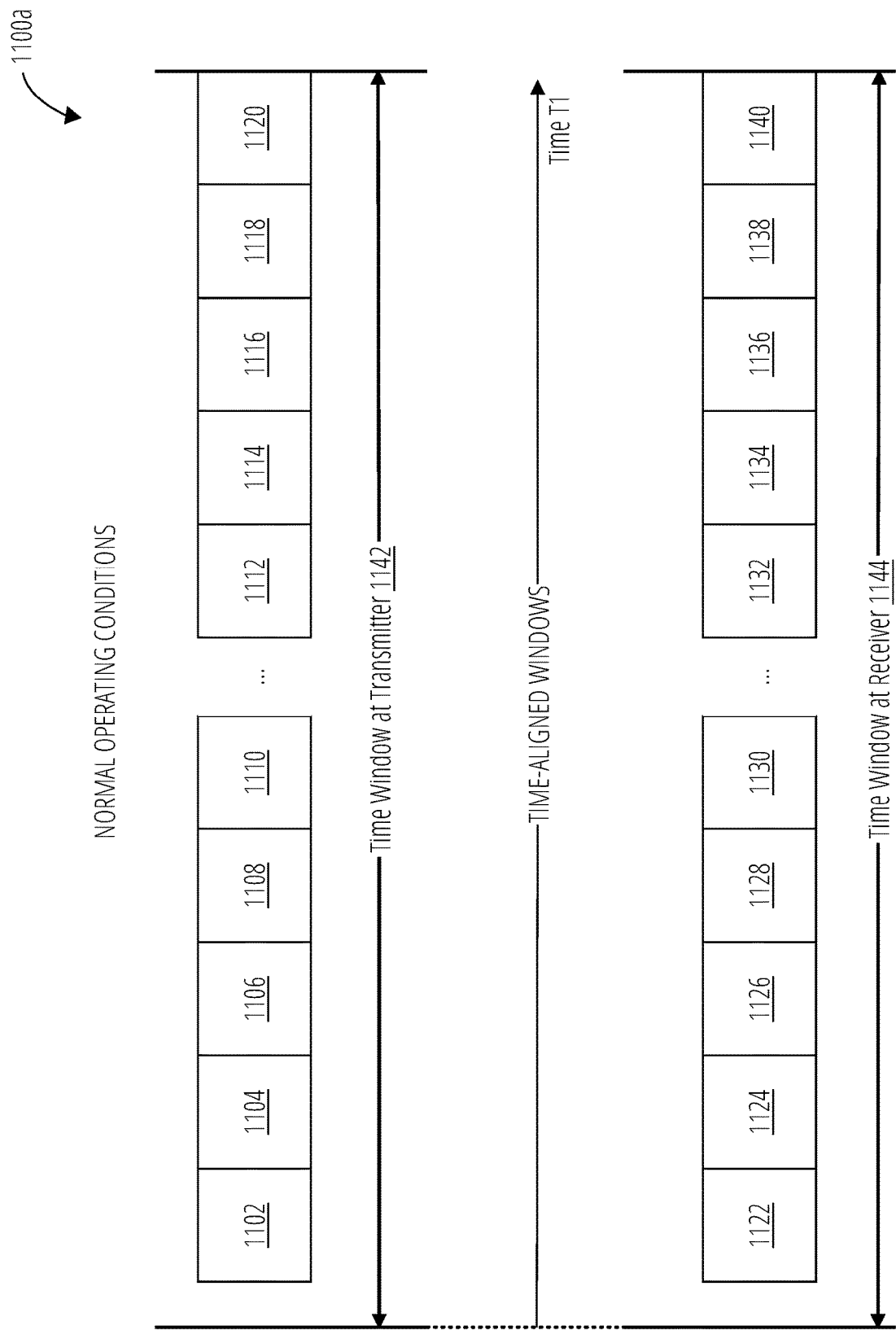
FIG. 11A illustrates an aspect of a packet and frame structure 1100a in accordance with one embodiment.

FIG. 11A illustrates a packet and frame structure 1100a for the TSN 822 during normal operating conditions, such as depicted in the operating environment 1000a, for example. As shown in FIG. 11A, assume node 3 sends a set of packets 1102-1120 during a time window at transmitter 1142. The time window at transmitter 1142 is the time window W3 as assigned to node 3 by the central network controller 902. Node 3 uses the clock 816 which provides a time reference for opening and closing the time window W3 from the perspective of node 3. Further assume that node 2 receives the full set of packets 1102-1120, as denoted by the packets 1122-1140, during a time window at receiver 1144. The time window at receiver 1144 is the same time window W3 assigned to node 3 by the central network controller 902, and it is known by node 2 via the traffic schedule 904. Node 2 uses the clock 814 which provides a time reference for opening and closing the time window W3 when monitoring the time window W3 from the perspective of node 2. The time window at transmitter 1142 is time-aligned with the time window at receiver 1144 at time T1. Since the time windows are time-aligned, all the packets transmitted by node 3 are received by node 2 in a same time window assigned to node 3.

Figure 11B:
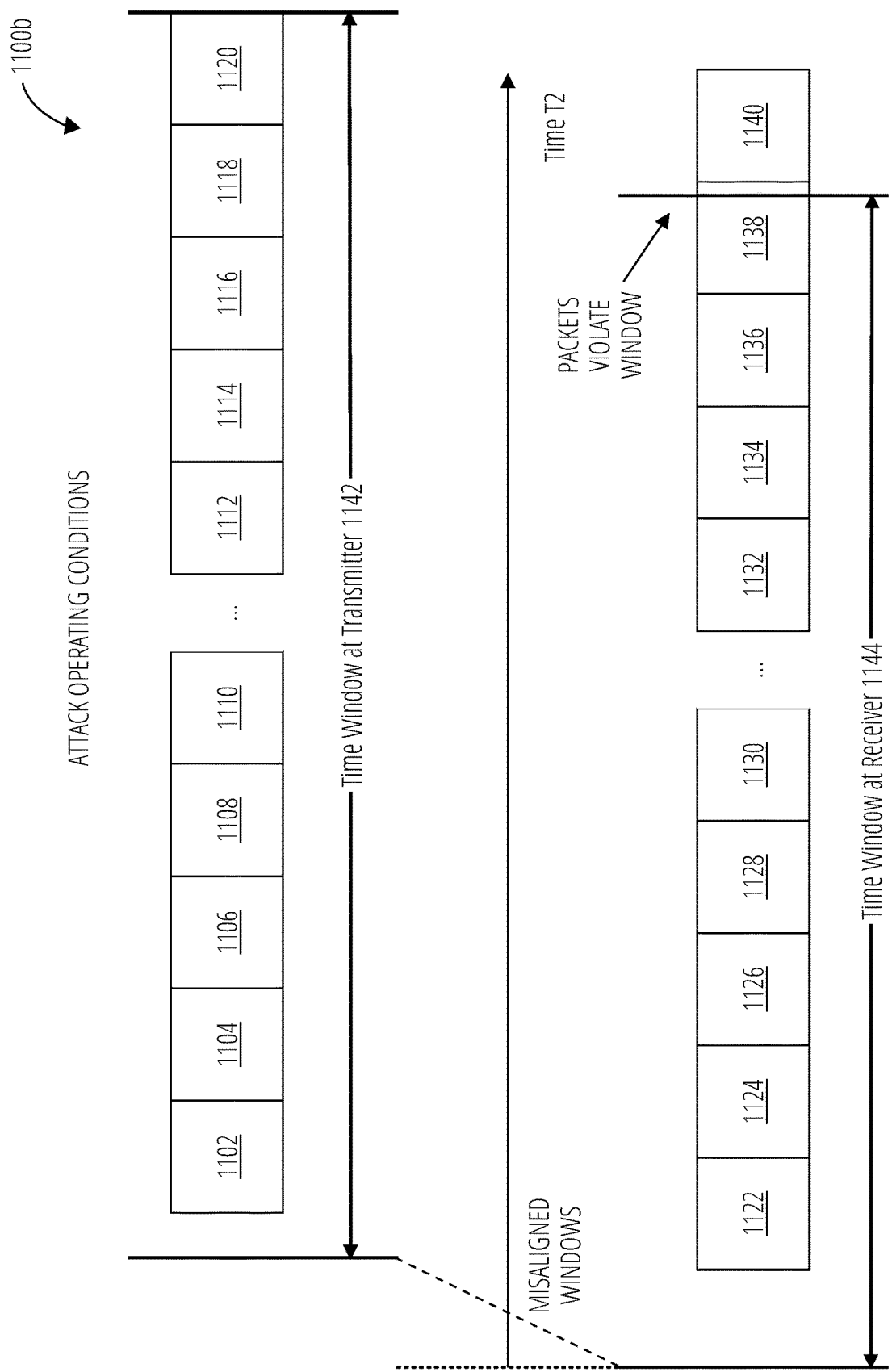
FIG. 11B illustrates an aspect of a packet and frame structure 1100b in accordance with one embodiment.

FIG. 11B illustrates a packet and frame structure 1100b for the TSN 822 during attack conditions, such as depicted in the operating environment 1000b, for example. As shown in FIG. 11B, assume node 3 sends a set of packets 1102-1120 during a time window at transmitter 1142. The time window at transmitter 1142 is the time window W3 as assigned to node 3 by the central network controller 902. Node 3 uses the clock 816 which provides a time reference for opening and closing the time window W3 from the perspective of node 3. Further assume that node 2 receives a subset of the set of packets 1102-1120, as denoted by the packets 1122-1138, during a time window at receiver 1144. Node 2 uses the clock 814 which provides a time reference for opening and closing the time window W3 when monitoring the time window W3 from the perspective of node 2. During monitoring operations, node 2 monitors for packets arriving outside of the time window W3, whether before a start time for the time window W3 (early arriving packets) or after an end time for the time window W3 (late arriving packets), and drops the early or late arriving packets from an ingress queue for W3. In this example, node 3 determines that the transmitted packet 1120 violates the time window at receiver 1144, and therefore node 2 drops the transmitted packet 1120, which is received as a late arriving packet 1140. The time window at receiver 1144 is the same time window W3 assigned to node 3 by the central network controller 902, and it is known by node 2 via the traffic schedule 904. However, the time window at transmitter 1142 is not time-aligned with the time window at receiver 1144 at time T2, due to the attacker 1008. Since the time windows are not time-aligned, all the packets transmitted by node 3 are not received by node 2 in a same time window assigned to node 3.

Figure 12:
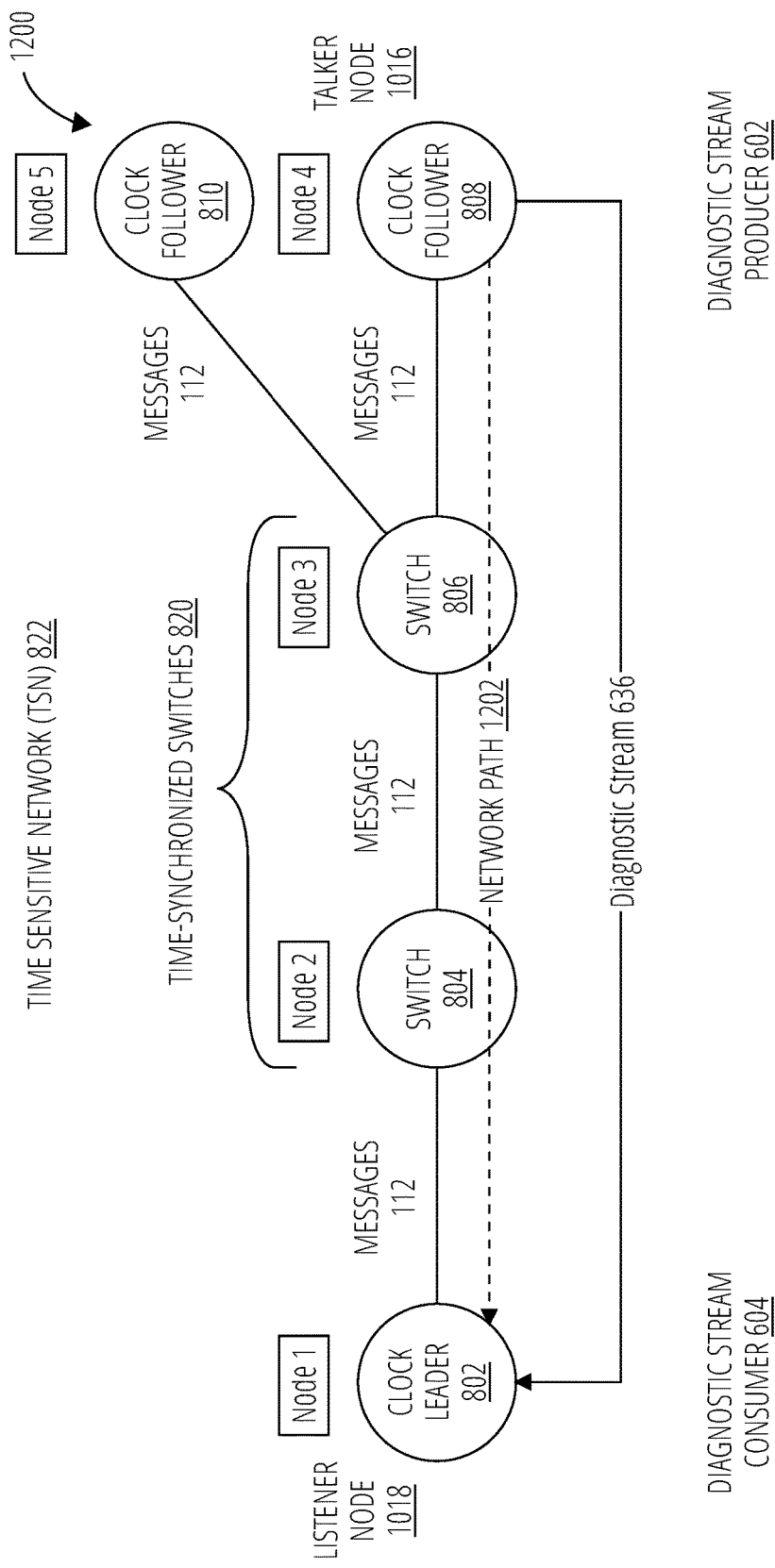
FIG. 12 illustrates an aspect of an operating environment 1200 in accordance with one embodiment.

FIG. 12 illustrates an operating environment 1200 for the TSN 822. To detect misaligned time windows for the nodes 1 through 5, the nodes 1 through 5 may be implemented as diagnostic stream producers 602 and/or diagnostic stream consumers 604, as discussed with reference to FIGS. 6A, 6B and systems 600a, 600b, respectively. For example, assume node 4 implemented as the clock follower 808 is also a talker node 1016 and implements a diagnostic stream producer 602. Further assume node 1 implemented as the clock leader 802 is also a listener node 1018 and implements a diagnostic stream consumer 604. Node 4 as the diagnostic stream producer 602 can generate a diagnostic stream 636 with one or more diagnostic messages 642, and send the diagnostic stream 636 to node 1 as the diagnostic stream consumer 604. The diagnostic stream 636 may comprise one or more ACPs 612 associated with the diagnostic stream producer 602, which in this case is the clock follower 808. In various embodiments, the diagnostic stream 636 may be transmitted by an in-band channel or an out-of-band channel from the diagnostic stream producer 602 to the diagnostic stream consumer 604 along the network path 1202. The diagnostic stream 636 may be used by the diagnostic stream consumer 604 to detect time window misalignment, such as described with reference to FIGS. 11A, 111B, for example.

Figure 13A:
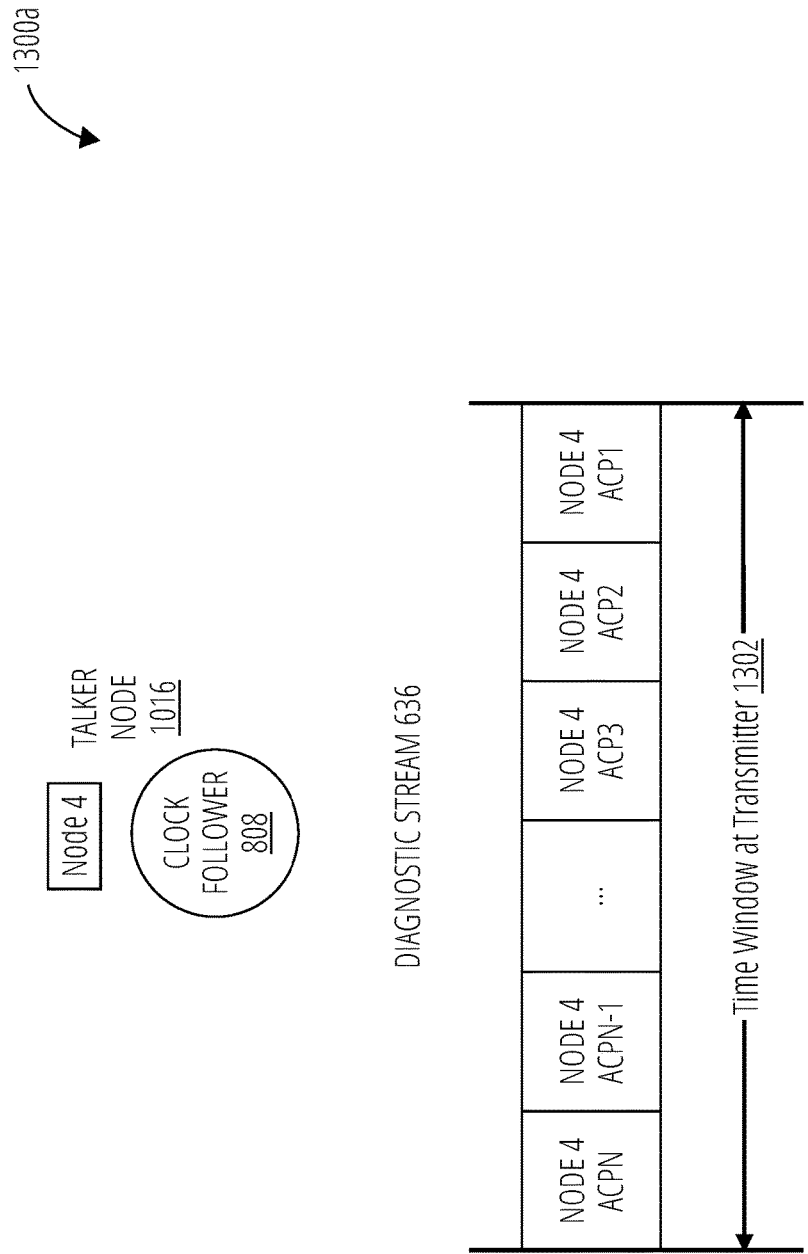
FIG. 13A illustrates an aspect of a packet and frame structure 1300a in accordance with one embodiment.

FIG. 13A illustrates a packet and frame structure 1300a for a diagnostic stream 636 generated by the clock follower 808 operating as a talker node 1016 implemented as a diagnostic stream producer 602. As previously described, each node 1 through 5 inserts a set of small alignment-check packets (ACPs) completely filling the Qbv time window W1 through W5 assigned to a respective node 1 through 5.

FIG. 13A illustrates a case where an entire time window assigned to a TSN node 104 is used to send a set of ACPs 612. As depicted in FIG. 13A, assume the diagnostic stream producer 602 of the clock follower 808 generates a diagnostic stream 636. The diagnostic stream producer 602 sends the diagnostic stream 636 during a time window at transmitter 1302, which in this case is time window W4. The ACP generator 608 fills the time window W4 at transmitter 1302 with a set of ACPs 612 associated with the diagnostic stream producer 602, which in this case is node 4 or the clock follower 808. The set of ACPs 612 are denoted as Node 4 ACP1, Node 4 ACP2, Node 4 ACP3, . . . , Node 4 ACP N−1, Node 4 ACP N. The diagnostic stream producer 602 transmits the set of ACPs 612 to the diagnostic stream consumer 604 along the network path 1202.

It is worthy to note that a particular number and size for the ACPs 612 may be modified, at least in part, to account for estimated maximum and minimum attack amplitudes to be detected for a given type of desynchronization attack. Embodiments are not limited in this context.

It is also worthy to note that FIG. 13A depicts node 4 sending the set of ACPs 612 at the end of the time window W4. However, node 4 may also send the set of ACPs 612 at the beginning of the time window W4 using a similar approach. In this case, a window misalignment will drop packets arriving before a receiving window is open. Embodiments are not limited in this context.

It is also worthy to note that FIG. 13A depicts node 4 sending the set of ACPs 612 in a diagnostic stream 636. However, node 4 may also send the set of ACPs 612 in a unified stream 638, as described with reference to FIG. 13B. Embodiments are not limited in this context.

Figure 13B:
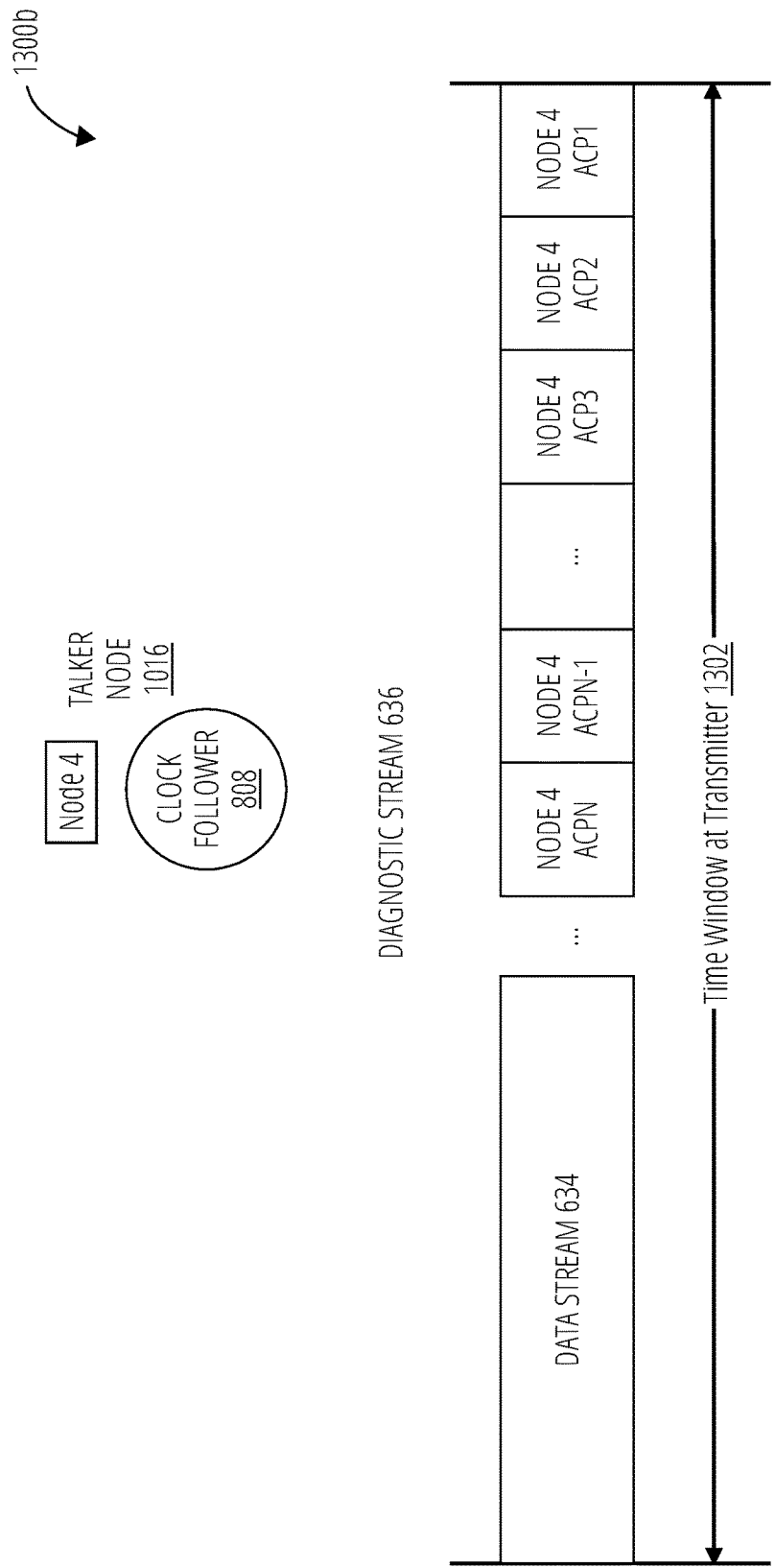
FIG. 13B illustrates an aspect of a packet and frame structure 1300b in accordance with one embodiment.

FIG. 13B illustrates a packet and frame structure 1300a for a unified stream 638 generated by the clock follower 808 operating as a talker node 1016 implemented as a diagnostic stream producer 602. As previously described, each node 1 through 5 inserts a set of small alignment-check packets (ACPs) the end of the data stream 634, completely filling the Qbv time window W1 through W5 assigned to a respective node 1 through 5.

As depicted in FIG. 13B, assume the diagnostic stream producer 602 of the clock follower 808 generates a data stream 634. The diagnostic stream producer 602 sends the data stream 634 during a time window at transmitter 1302, which in this case is time window W4. The ACP generator 608 fills a residual time r for the time window at transmitter 1302 with a set of ACPs 612 associated with the diagnostic stream producer 602, which in this case is node 4 or the clock follower 808. The set of ACPs 612 are denoted as Node 4 ACP1, Node 4 ACP2, Node 4 ACP3, . . . , Node 4 ACP N−1, Node 4 ACP N. The diagnostic stream producer 602 transmits the set of ACPs 612 to the diagnostic stream consumer 604 along the network path 1202.

It is worthy to note that a particular number and size for the ACPs 612 may be modified, at least in part, to account for estimated maximum and minimum attack amplitudes to be detected for a given type of desynchronization attack. Embodiments are not limited in this context.

It is also worthy to note that FIG. 13B depicts node 4 sending the set of ACPs 612 at the end of the time window W4. However, node 4 may also send the set of ACPs 612 at the beginning of the time window W4 using a similar approach. In this case, a window misalignment will drop packets arriving before a receiving window is open. Embodiments are not limited in this context.

The following figures continue with the example shown in FIG. 13B, where the diagnostic stream producer 602 sends a unified stream 638 that combines a data stream 634 with a set of ACPs 612 in a diagnostic stream 636. However, it may be appreciated that the same principles may be applied to node 4 sending the set of ACPs 612 in a dedicated diagnostic stream 636, as discussed with reference to FIG. 13A. Embodiments are not limited in this context.

Figure 14:
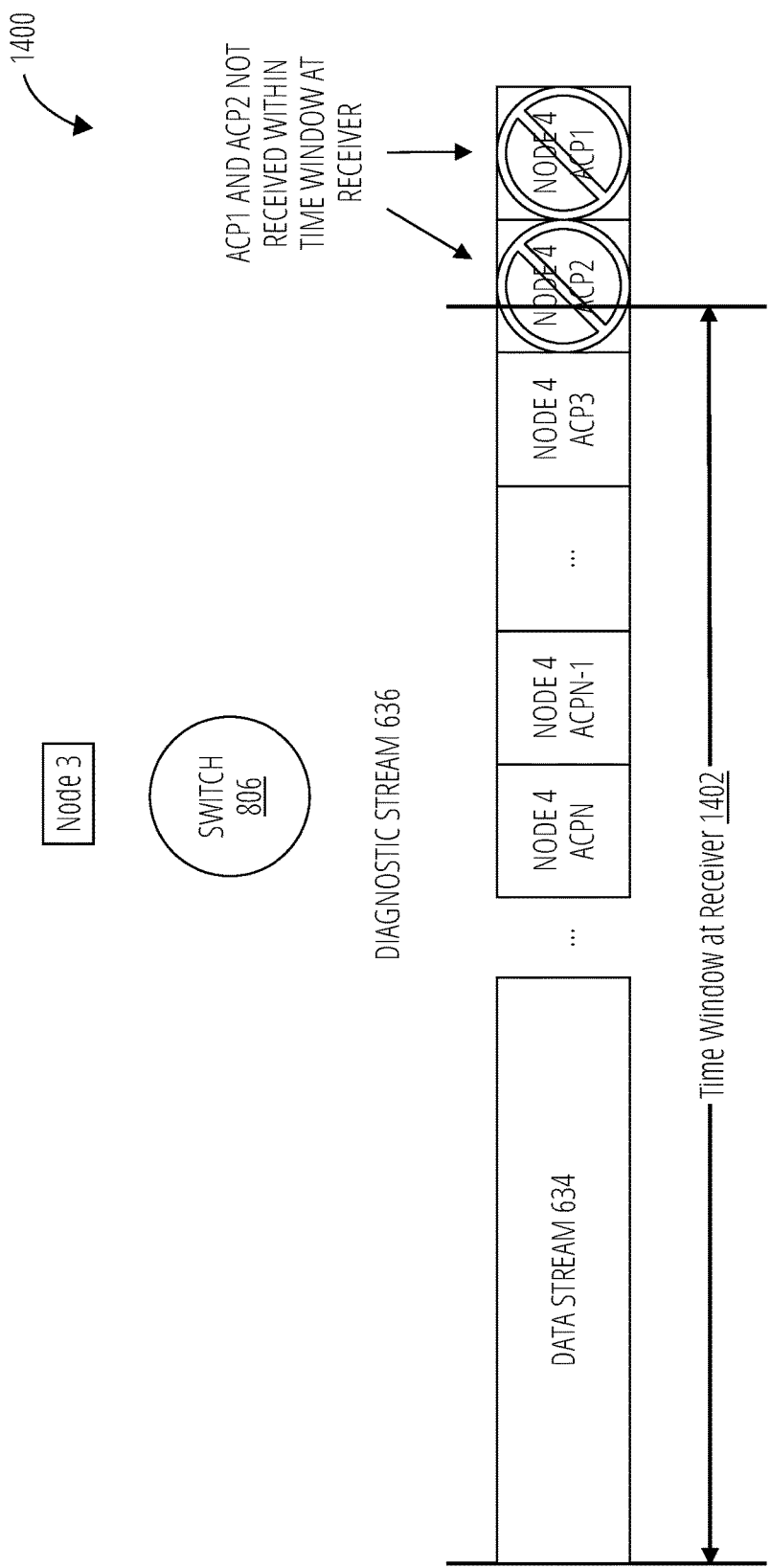
FIG. 14 illustrates an aspect of a packet and frame structure 1400 in accordance with one embodiment.

FIG. 14 illustrates a packet and frame structure 1400 for a diagnostic stream 636 generated by the clock follower 808 operating as a talker node 1016 implemented as a diagnostic stream producer 602, and sent by the diagnostic stream producer 602 to the diagnostic stream consumer 604 along the network path 1202. During transit along the network path 1202, the diagnostic stream 636 may be received by one or more intermediate nodes 660, such as node 3 implemented as the switch 806.

As depicted in FIG. 14, node 3 or switch 806 receives the diagnostic stream 636 during a time window at receiver 1402, which in this case is time window W4 assigned to node 4 and monitored by node 3. When time misalignment occurs, the diagnostic stream 636 is truncated at a certain point, and any ACPs 612 at the end of the diagnostic stream 636 are dropped. For example, due to time window misalignment, Node 4 ACP1 and Node 4 ACP2 of the diagnostic stream 636 are late arriving packets and are therefore dropped by node 3.

Figure 15:
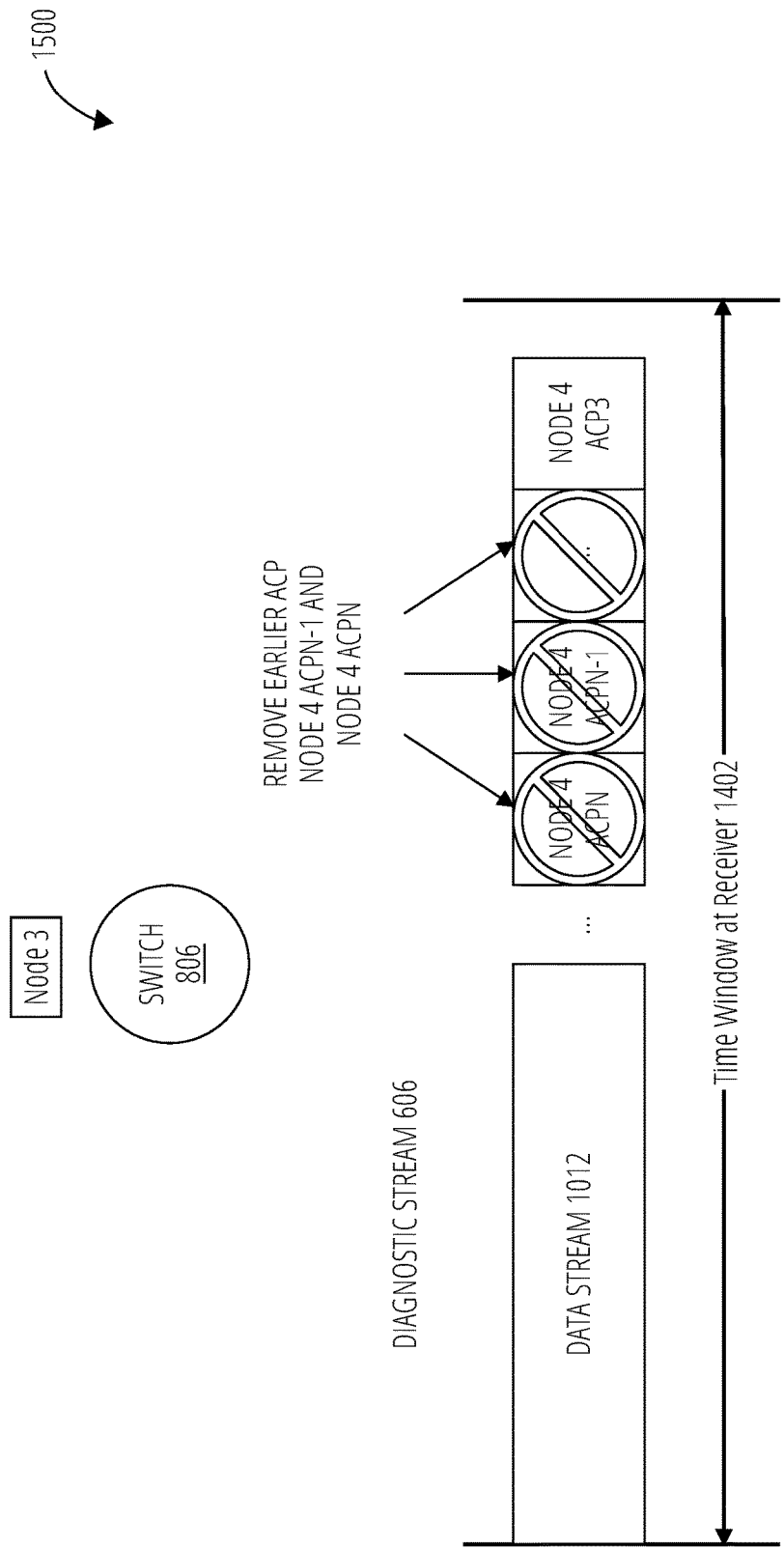
FIG. 15 illustrates an aspect of a packet and frame structure 1500 in accordance with one embodiment.

FIG. 15 illustrates a packet and frame structure 1500 for a diagnostic stream 636 received by node 3 or switch 806. Since Node 4 ACP1 and Node 4 ACP2 are of a defined size, it is possible for node 3 (or any monitor 614) to quantify an amount of time desynchronization by determining a number of dropped ACPs, which in this case is 2 dropped ACPs. A number of dropped ACPs from a given node can be determined from a received ACP with a lowest ACP sequence number. In this example, the number of dropped ACPs from node 4 can be determined from a received ACP with a lowest ACP sequence number, which in this case is Node 4 ACP3. As a result, node 3 keeps Node 4 ACP3, and removes any received ACPs having a higher ACP sequence number than Node 4 ACP3 from the diagnostic stream 636, which in this case is denoted by Node 4 ACP N−1 and Node 4 ACP N. This isolates Node 4 ACP3 from the diagnostic stream 636, which in turn can be transmitted by nodes 2, 3 along the network path 1202 to the diagnostic stream consumer 604 of node 1.

Figure 16:
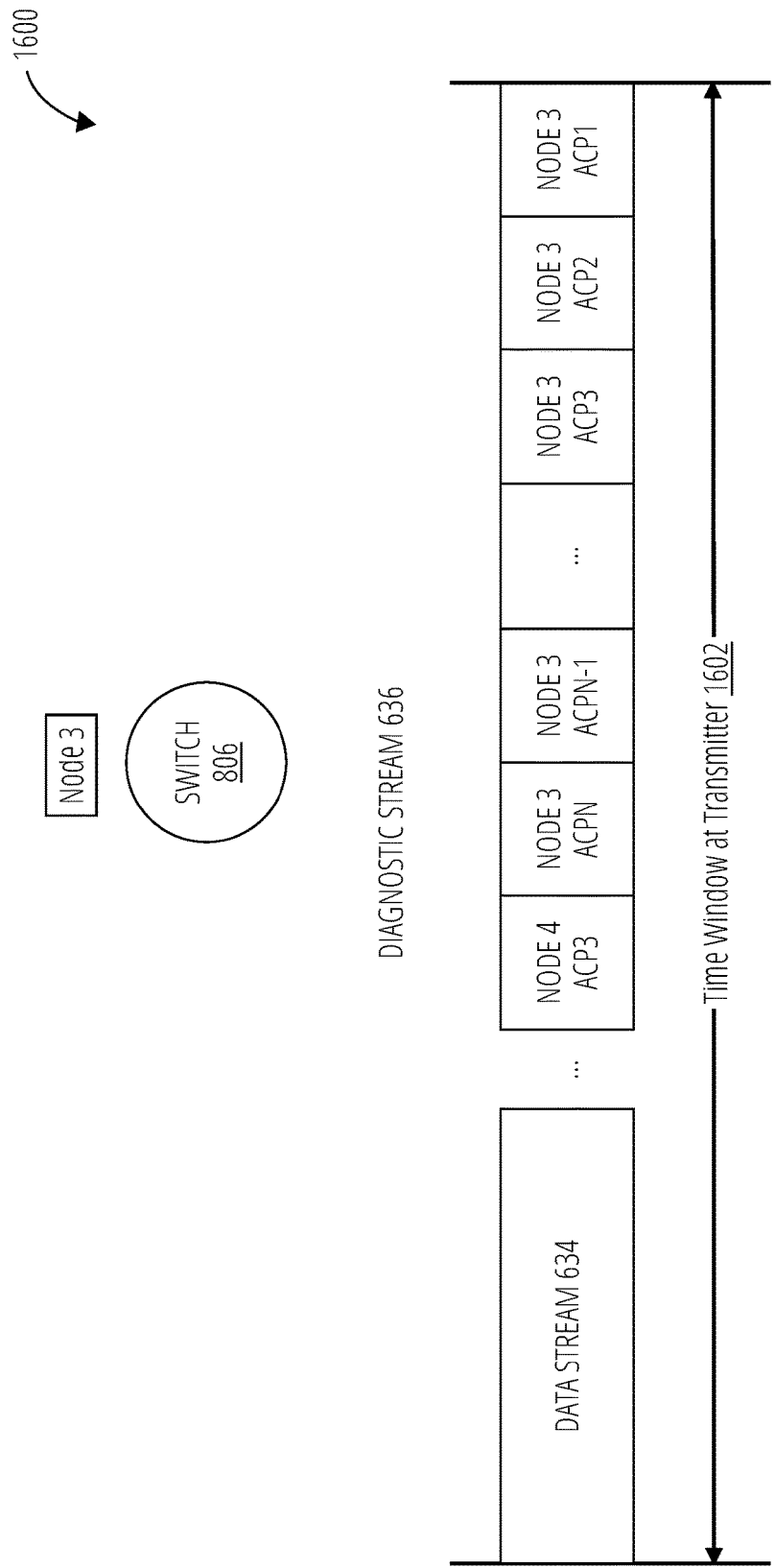
FIG. 16 illustrates an aspect of a packet and frame structure 1600 in accordance with one embodiment.

FIG. 16 illustrates a packet and frame structure 1600 for a diagnostic stream 636 generated by the switch 806 operating as a talker node 1016 implemented as a diagnostic stream producer 602, and sent by the diagnostic stream producer 602 to the diagnostic stream consumer 604 along the network path 1202.

During transit along the network path 1202, the diagnostic stream 636 generated by the clock follower 808 as a diagnostic stream producer 602 may be received by one or more intermediate nodes 660, such as node 3 implemented as the switch 806. As described with reference to FIG. 15, node 3 can isolate Node 4 ACP3 from the diagnostic stream 636 to quantify an amount of time desynchronization introduced by node 4. Node 3 can transmit the Node 4 ACP3 along the network path 1202 to the diagnostic stream consumer 604. In some cases, however, node 3 can also implement a diagnostic stream producer 602 to generate a set of ACPs 612 associated with node 3.

As depicted in FIG. 16, the packet and frame structure 1600 illustrates a diagnostic stream 636 generated by node 3 or the switch 806 operating as a talker node 1016 implemented as a diagnostic stream producer 602. As previously described, each node 1 through 5 inserts a set of small alignment-check packets (ACPs) the end of the data stream 634, completely filling the Qbv time window W1 through W5 assigned to a respective node 1 through 5.

As depicted in FIG. 16, assume the diagnostic stream producer 602 of the switch 806 generates a data stream 634. The diagnostic stream producer 602 sends the data stream 634 during a time window at transmitter 1602, which in this case is time window W3. The ACP generator 608 fills a residual time r for the time window at transmitter 1602 with a set of ACPs 612 associated with the diagnostic stream producer 602, which in this case is node 3 or the switch 806. The set of ACPs 612 are denoted as Node 3 ACP1, Node 3 ACP2, Node 3 ACP3, . . . , Node 3 ACP N−1, Node 3 ACP N. In addition, the ACP generator 608 also retrieves Node 4 ACP3 from memory, which is useful to quantify time desynchronization incurred by node 4, and inserts that into the set of ACPs 612 for node 3. The diagnostic stream producer 602 transmits the set of ACPs 612 to the diagnostic stream consumer 604 along the network path 1202.

Figure 17:
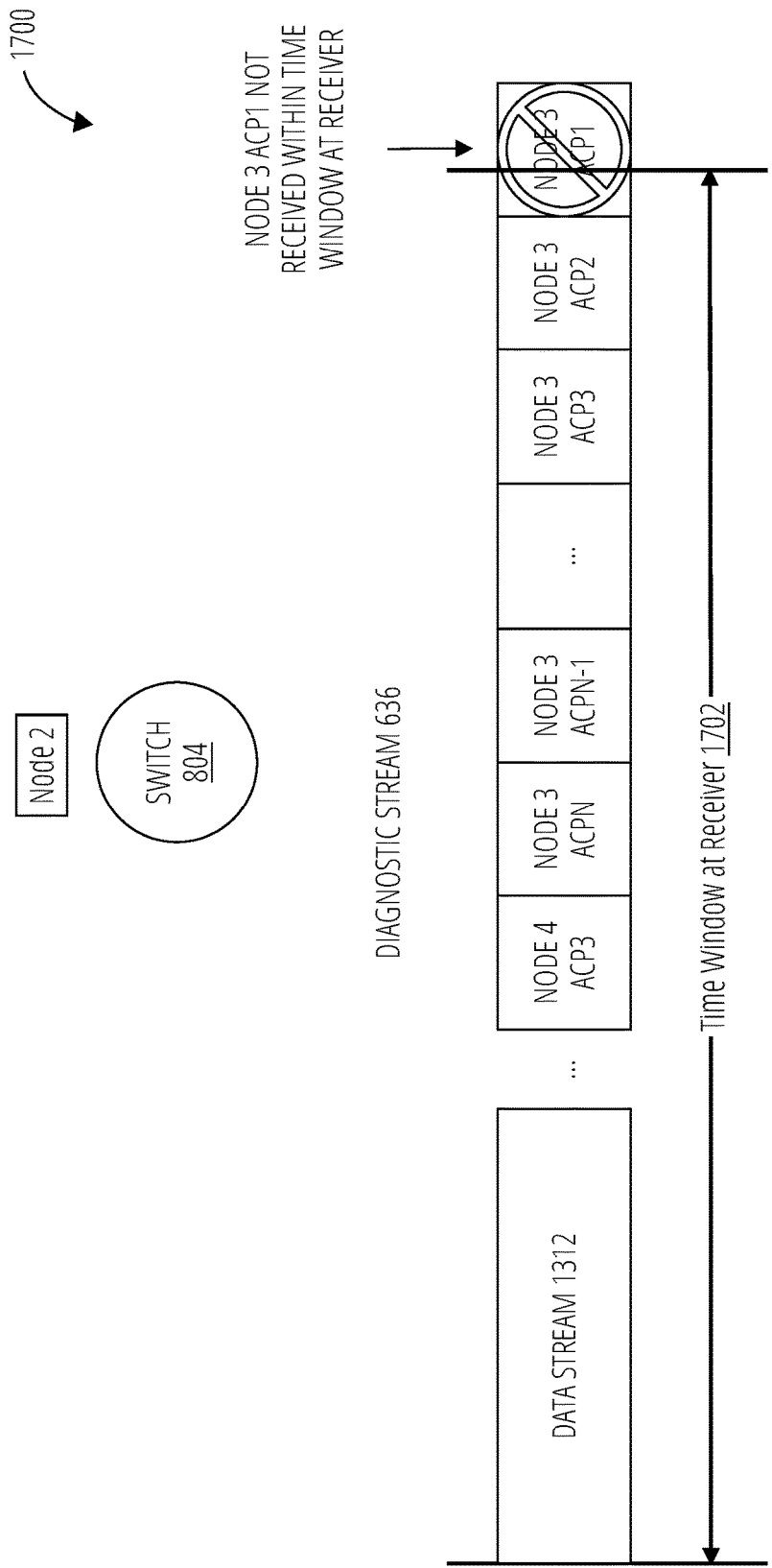
FIG. 17 illustrates an aspect of a packet and frame structure 1700 in accordance with one embodiment.

FIG. 17 illustrates a packet and frame structure 1700 for a diagnostic stream 636 generated by the switch 806 operating as a talker node 1016 implemented as a diagnostic stream producer 602, and sent by the diagnostic stream producer 602 to the diagnostic stream consumer 604 along the network path 1202. During transit along the network path 1202, the diagnostic stream 636 may be received by one or more intermediate nodes 660, such as node 2 implemented as the switch 804.

As depicted in FIG. 17, node 2 or switch 804 receives the diagnostic stream 636 during a time window at receiver 1702, which in this case is time window W3 assigned to node 3 and monitored by node 2. When time misalignment occurs, the diagnostic stream 636 is truncated at a certain point, and any ACPs 612 at the end of the diagnostic stream 636 are dropped. For example, due to time window misalignment, Node 3 ACP1 of the diagnostic stream 636 are late arriving packets and are therefore dropped by node 2.

Figure 18:
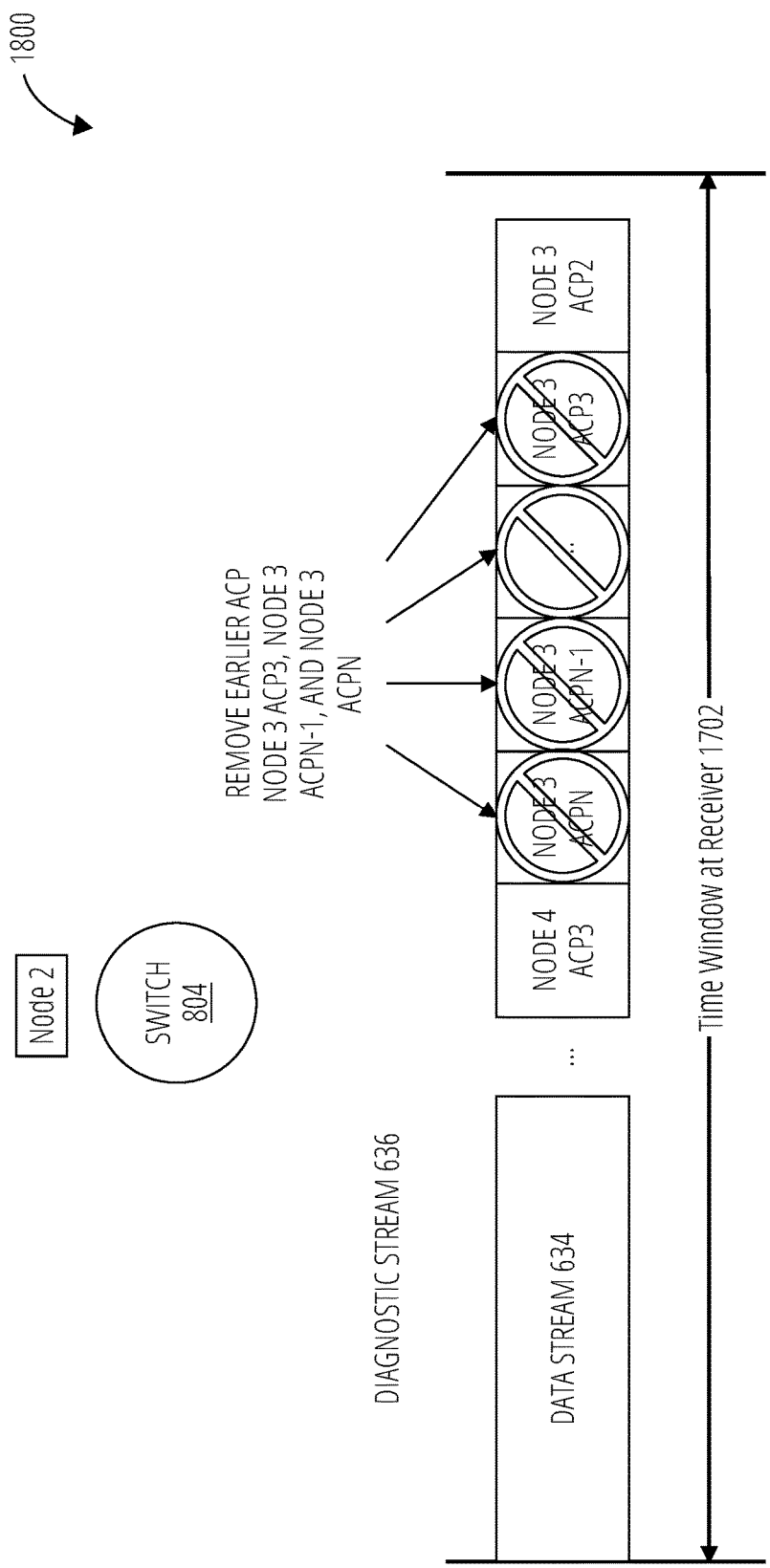
FIG. 18 illustrates an aspect of a packet and frame structure 1800 in accordance with one embodiment.

FIG. 18 illustrates a packet and frame structure 1800 for a diagnostic stream 636 received by node 2 or switch 804. Since Node 3 ACP1 is of a defined size, it is possible for node 2 (or any monitor 614) to quantify an amount of time desynchronization by determining a number of dropped ACPs, which in this case is 1 dropped ACP. A number of dropped ACPs from a given node can be determined from a received ACP with a lowest ACP sequence number. In this example, the number of dropped ACPs from node 3 can be determined from a received ACP with a lowest ACP sequence number, which in this case is Node 3 ACP2. As a result, node 2 keeps Node 3 ACP2, and removes any received ACPs having a higher ACP sequence number than Node 3 ACP2 from the diagnostic stream 636, which in this case is denoted by Node 3 ACP3, Node 3 ACP N−1 and Node 3 ACP N. Node 2, however, keeps Node 4 ACP3 from the diagnostic stream 636. This isolates Node 3 ACP2 and Node 4 ACP3 from the diagnostic stream 636, which in turn can be transmitted by node 2 along the network path 1202 to the diagnostic stream consumer 604 of node 1.

Figure 19:
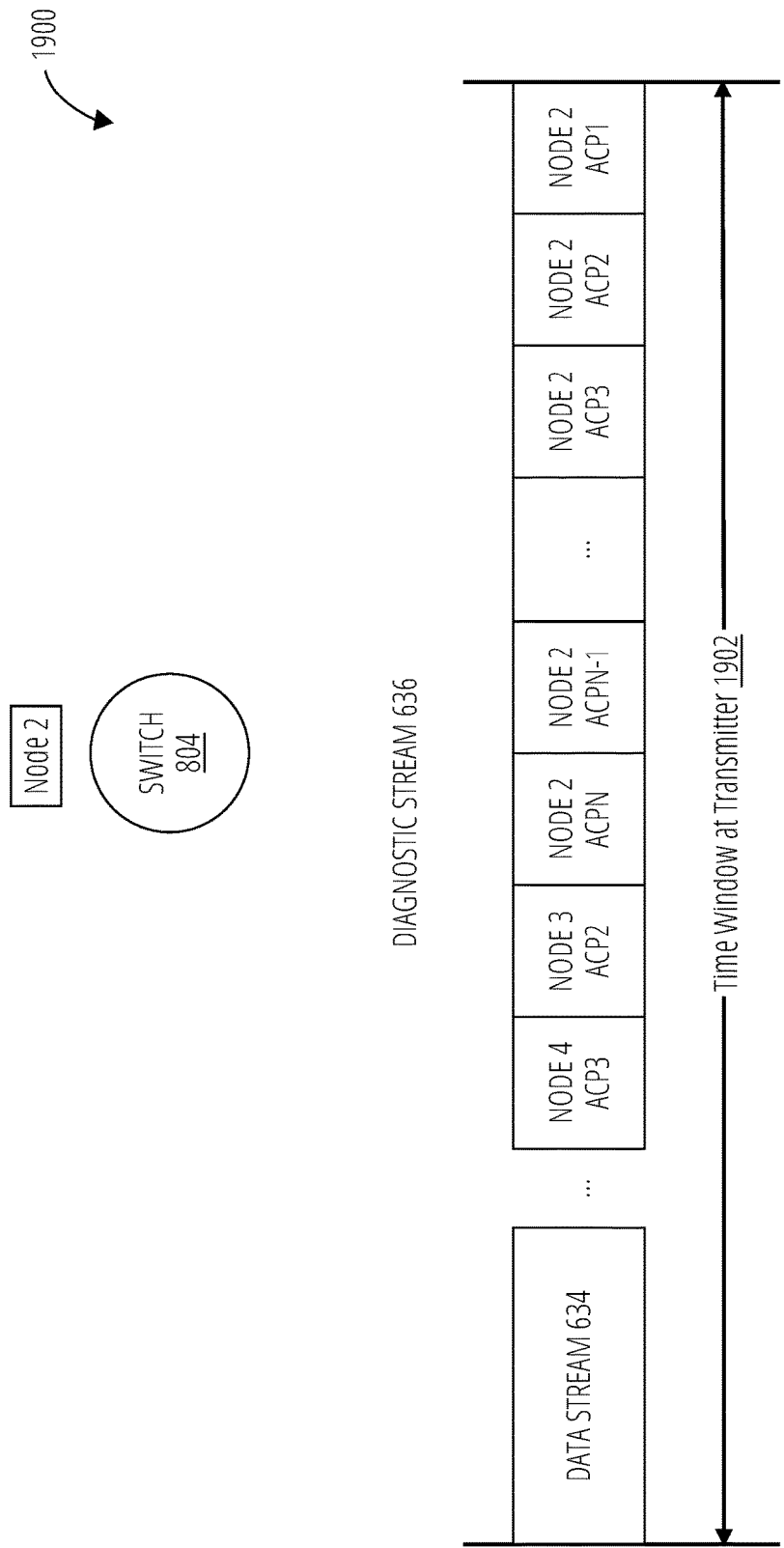
FIG. 19 illustrates an aspect of a packet and frame structure 1900 in accordance with one embodiment.

FIG. 19 illustrates a packet and frame structure 1900 for a diagnostic stream 636 generated by the switch 804 operating as a talker node 1016 implemented as a diagnostic stream producer 602, and sent by the diagnostic stream producer 602 to the diagnostic stream consumer 604 along the network path 1202.

During transit along the network path 1202, the diagnostic stream 636 generated by the clock follower 808 and the switch 806 as diagnostic stream producers 602 may be received by one or more intermediate nodes 660, such as node 2 implemented as the switch 804. As described with reference to FIG. 18, node 2 can isolate Node 4 ACP3 and Node 3 ACP2 from the diagnostic stream 636 to quantify an amount of time desynchronization introduced by nodes 4 and 3, respectively. Node 2 can transmit the Node 4 ACP3 and the Node 3 ACP2 along the network path 1202 to the diagnostic stream consumer 604. In some cases, however, node 2 can also implement a diagnostic stream producer 602 to generate a set of ACPs 612 associated with node 2.

As depicted in FIG. 19, the packet and frame structure 1900 illustrates a diagnostic stream 636 generated by node 2 or the switch 804 operating as a talker node 1016 implemented as a diagnostic stream producer 602. As previously described, each node 1 through 5 inserts a set of small alignment-check packets (ACPs) the end of the data stream 634, completely filling the Qbv time window W1 through W5 assigned to a respective node 1 through 5.

As depicted in FIG. 19, assume the diagnostic stream producer 602 of the switch 804 generates a data stream 634. The diagnostic stream producer 602 sends the data stream 634 during a time window at transmitter 1902, which in this case is time window W2. The ACP generator 608 fills a residual time r for the time window at transmitter 1902 with a set of ACPs 612 associated with the diagnostic stream producer 602, which in this case is node 2 or the switch 804. The set of ACPs 612 are denoted as Node 2 ACP1, Node 2 ACP2, Node 2 ACP3, . . . , Node 2 ACP N−1, Node 2 ACP N. In addition, the ACP generator 608 also retrieves Node 4 ACP3 and Node 3 ACP2 from memory, which is useful to quantify time desynchronization incurred by node 4 and node 3, respectively, and inserts that into the set of ACPs 612 for node 2. The diagnostic stream producer 602 transmits the set of ACPs 612 to the diagnostic stream consumer 604 along the network path 1202.

Figure 20:
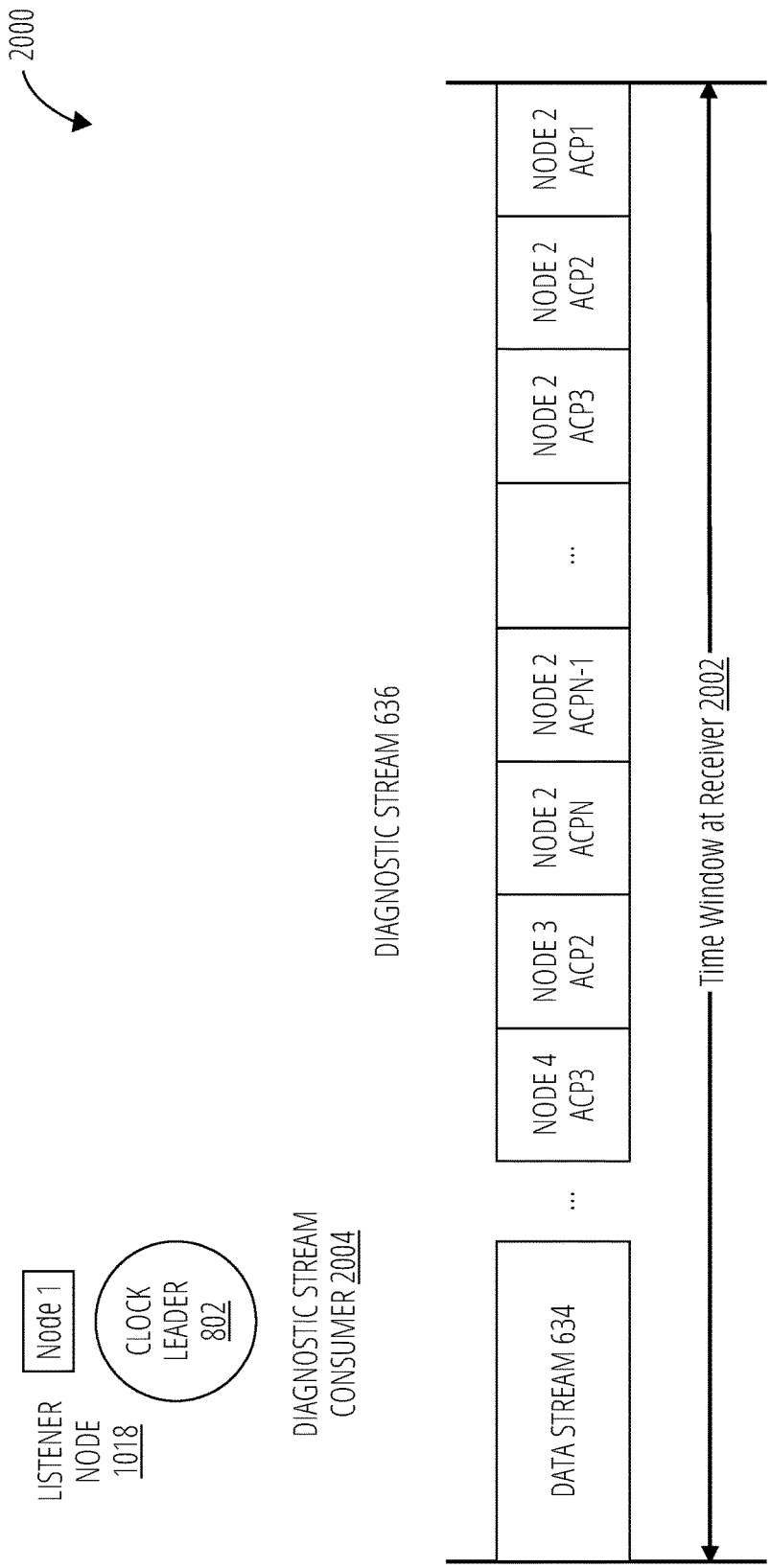
FIG. 20 illustrates an aspect of a packet and frame structure 2000 in accordance with one embodiment.

FIG. 20 illustrates a packet and frame structure 2000 for a diagnostic stream 636 generated by the switch 804 operating as a talker node 1016 implemented as a diagnostic stream producer 602, and sent by the diagnostic stream producer 602 to the diagnostic stream consumer 604 along the network path 1202. During transit along the network path 1202, the diagnostic stream 636 may be received by the diagnostic stream consumer 604, such as node 1 implemented as the clock leader 802 and the listener node 1018.

As depicted in FIG. 20, node 1 or clock leader 802 receives the diagnostic stream 636 during a time window at receiver 2002, which in this case is time window W2 assigned to node 2 and monitored by node 1. When time misalignment occurs, the diagnostic stream 636 is truncated at a certain point, and any ACPs 612 at the end of the diagnostic stream 636 are dropped. In this case, the full set of ACPs 612 transmitted by node 2 are received by node 1 during the time window at receiver 2002. There are no late arriving packets from node 2. This indicates that the clock 814 used by node 2 is synchronized with the clock 812 used by node 1.

Figure 21:
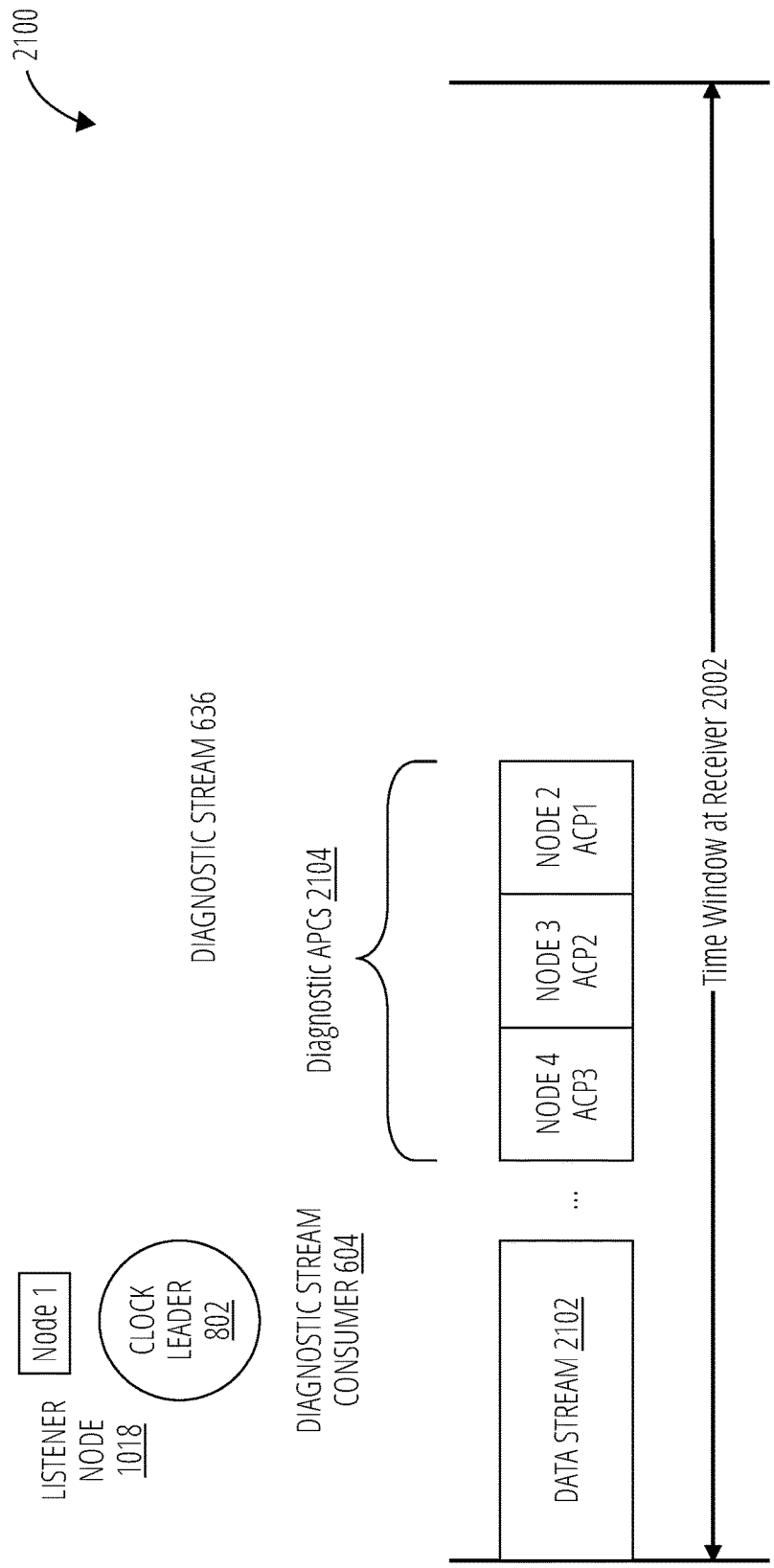
FIG. 21 illustrates an aspect of a packet and frame structure 2100 in accordance with one embodiment.

FIG. 21 illustrates a packet and frame structure 2100 for a diagnostic stream 636 generated by nodes 2-5 along the network path 1202 and received by node 1 as the diagnostic stream consumer 604. The monitor 614 for the diagnostic stream consumer 604 decodes the diagnostic stream 636 and retrieves a set of diagnostic APCs 2104. The diagnostic APCs 2104 may comprise one or more APCs that have a lowest ACP sequence number for each node 1 through 5 that have been safely received within a corresponding time window W1 through W5 assigned by the central network controller 902. For instance, in this example the diagnostic APCs 2104 may comprise Node 4 ACP3, Node 3 ACP2 and Node 2 ACP1. The ACP sequence number of each node indicates its timing relative to the neighboring upstream node. The monitor 614 goes through the diagnostic APCs 2104 and determines how delayed each node was in relation to the receiver's window. Specifically, an amount of time that a given node 1 through 5 is desynchronized is given by the APC size (in seconds) and the number of APCs that a receiving node did not receive in time. In this manner, the monitor 614 may use the diagnostic APCs 2104 to determine a desynchronization time associated with nodes 2-4 (if any), and take corrective actions as needed.

FIG. 22 illustrates a packet and frame structure 2200 for an IEEE 802.3 Ethernet packet and frame. As shown in FIG. 22, the packet and frame structure 2200 may comprise multiple information fields, including a preamble 2202 of 7 octets, a start frame delimiter 2204 of 1 octet, a medium access control (MAC) destination 2206 of 6 octets, a MAC source 2208 of 6 octets, an 802.1Q tag (opt) 2210 of 4 octets, an EtherType (ethernet II) or length (IEEE 802.3) 2212 of 2 octets, a payload 2214 of 45-1500 octets, a frame check sequence 2216 (32-bit CRC) of 4 octets, and an interpacket gap 2218 of 12 octets. An L1 Ethernet frame plus an interpacket gap 2218 may comprise a combined information field of length of 72-1530 octets. An L2 Ethernet frame may comprise a first combined information field of 64-1522 octets and a second information field of 12 octets. Embodiments are not limited to using IEEE 802.3 Ethernet as an L1 or L2 transport, and other communications protocols may be used as desired for a given implementation. Embodiments are not limited in this context.

Specific dimensions for a set of ACPs 612 may be determined based on a frame payload capacity, such as the packet and frame structure 2200 for Ethernet, for example. Time granularity of detection is a function of the minimum packet size and the channel speed. The smallest Ethernet packet is 72 bytes+12 bytes of interpacket gap. In a first example, given a 5 gigahertz (GHz) 1300*a* megabits per second (Mbps) wireless channel, each bit is approximately 0.769 nanoseconds (ns). In the first example, 72 bytes (443.07 ns)+interpacket gap (73.84 ns)=516.92 ns. In a second example, given a 1 Gbps wired channel, each bit is approximately 1ns. In the second example, 72 bytes (72 ns)+interpacket gap (12 ns)=84 ns. In a third example, given a 40 Gbps wired channel, each bit is approximately 25 picoseconds (ps). In the third example, 72 bytes (14.4 ns)+interpacket gap (2.4 ns)=16.8 ns. Embodiments are not limited to these examples.

The time provided by the three examples may be used to calculate a number of ACPs for a set of ACPs 612 for a given time window (e.g., IEEE 802.1Qbv time window). Assume each ACP is 84 bytes wide (672 bits). In this case, each ACP covers an APC_timewidth of: (1) 516.92 ns in 5 GHz 1300 Mbps wireless channel; (2) 84 ns in 1 Gbps wired channel; and (3) 16.8 ns in 40 Gbps wired channel. Given a desired maximum delay detection D, the number of ACPs (NumACPs) is given by Equation (1) as follows:

$$NumACPs = D/APC\_timewidth \qquad \text{Equation (1)}$$

For example, for a monitor 614 to detect 10 microsecond (s) delays in a 1 Gbps wired channel, a number of APCs needed would be 120 ACPs.

A minimum window size is given by Equation (2) as follows:

$$W\_size \text{ (bits)} = 672 * (NumAPCs + NumNodes - 1) \quad \text{Equation (2)}$$

For example, for a TSN with 100 nodes, and each time window with 120 ACPs, the minimum window size is 147840 bits for a 1 Gbps wired network to detect 10 us attacks. Each bit is 84 ns wide, thus a window of 12.5 ms is needed.

Figure 23:
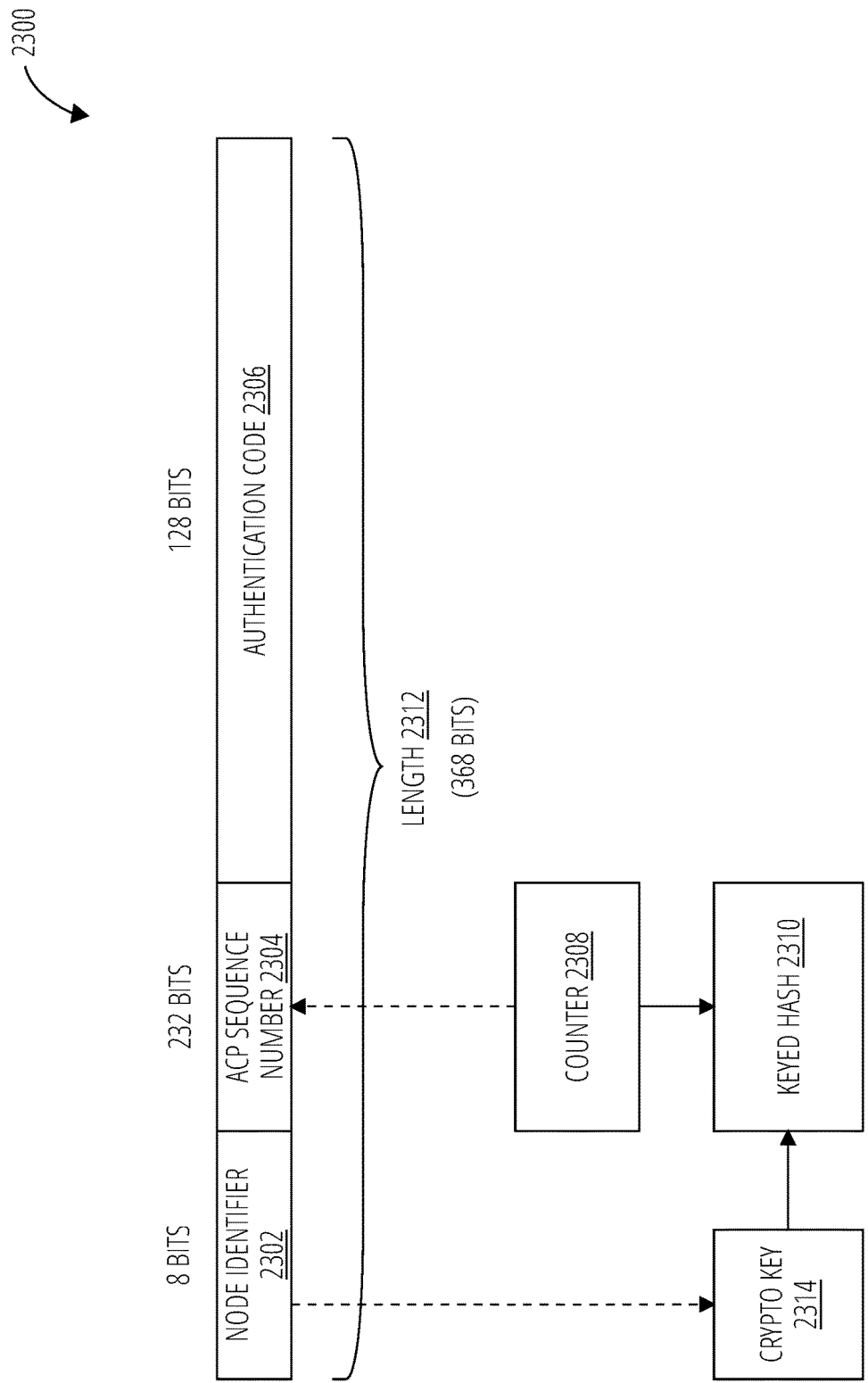
FIG. 23 illustrates an aspect of an alignment-check packet (ACP) structure 2300 in accordance with one embodiment.

FIG. 23 illustrates an exemplary ACP structure 2300 suitable for the ACPs 612. As depicted in FIG. 23, the ACP structure 2300 has three information fields. The first information field is for a node identifier 2302 and it comprises a length of 8 bits. The second information field is for an ACP sequence number 2304 and it comprises a length of 232 bits. The third information field is for an authentication code 2306 and it has a length of 128 bits. The three information fields have a combined total length of 368 bits. It may be appreciated that the number of fields and length of each field is given by way of example and not limitation, and a different number of fields and field lengths can be used for a given implementation. Embodiments are not limited in this context.

Each ACP 612 is generated to be unique, bounded to a TSN node 104, and unforgeable using a cryptographic algorithm. In one embodiment, for example, a pair-wise crypto key 2314 is shared between a TSN node 104 and a monitor 614. The crypto key 2314 is used as a first input to a key hash algorithm. A count value from a counter 2308 is used as a second input to the key hash algorithm. The key hash algorithm receives the two inputs and outputs a keyed hash 2310. The keyed hash 2310 binds the node identifier 2302 for a TSN node 104 and an ACP sequence number 2304. A monitor 614 can use the keyed hash 2310 to authenticate and verify each ACP of a set of ACPs 612.

Some embodiments can avoid exhausting a count value of ACP numbers by changing the cryptographic key on a periodic, aperiodic or on-demand basis. This prevents a condition where a TSN node 104 or TSN 102 runs out of sequence numbers. Cryptographic keys are changed periodically, following well-known specifications, such as those from the National Institute of Standards and Technology (NIST). Re-keying operations may also be triggered when a system is potentially running out of ACP sequence numbers.

Embodiments are specifically designed to protect a TSN 102 from an attacker 1008 attempting to compromise one or more TSN nodes 104 from multiple attack vectors. For instance, assume the attacker 1008 attempts to block traffic or does not forward traffic. The attacker 1008 reveals itself, as traffic from the nodes pertaining to the entire stream path is expected by the monitor 614. In another example, assume the attacker 1008 attempts to drop additional packets. The dropping of packets indicates an abnormality, and that abnormality reveals that the attacker 1008 is attempting to compromise the TSN 102. Therefore, there is no incentive for the attacker 1008 to drop packets. In still another example, assume the attacker 1008 does not drop packets. If the attacker 1008 chooses not to drop packets, other nodes impacted by the attacker 1008 will eventually drop packets. In yet another example, assume the attacker 1008 attempts to inject new packets into the TSN 102. In this case, the attacker 1008 cannot forge ACPs 612 as any forged ACP will be detected via the cryptograph scheme used by the TSN nodes 104 and the monitor 614.

Figure 24:
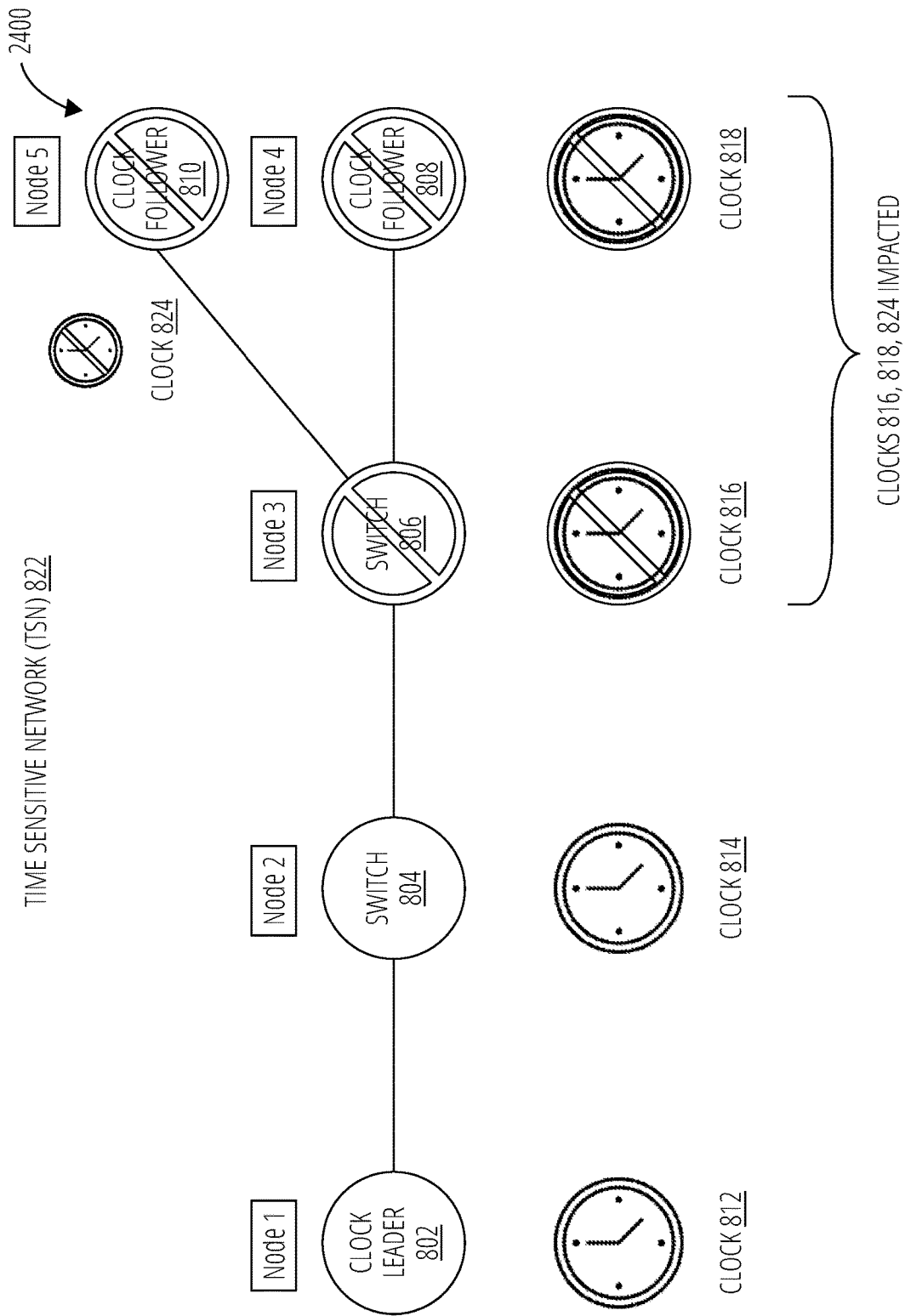
FIG. 24 illustrates an aspect of an operating environment 2400 in accordance with one embodiment.

FIG. 24 illustrates an operating environment 2400 for the TSN 822. As previously discussed, assume an attacker 1008 launches a timing attack or desynchronization attack against node 2 or switch 804. The attack causes the switch 804 to send a malicious message 1010 with erroneous timing information to node 3 or switch 806. The erroneous time information impacts time synchronization for the switch 806. The switch 806 updates the local clock 816 with the erroneous timing information, thereby causing the clock 816 to desynchronize from the network time maintained by the clock 812 of the clock leader 802. In addition, any TSN nodes 104 operating downstream from the switch 806 are similarly impacted by the attacker 1008, thereby causing an entire section of the TSN 102 to run local clocks at the same malicious time. This means that the clocks 818 and 824 for the clock follower 808 and the clock follower 810, respectively, are now on the same erroneous time reference as the switch 806.

Figure 25:
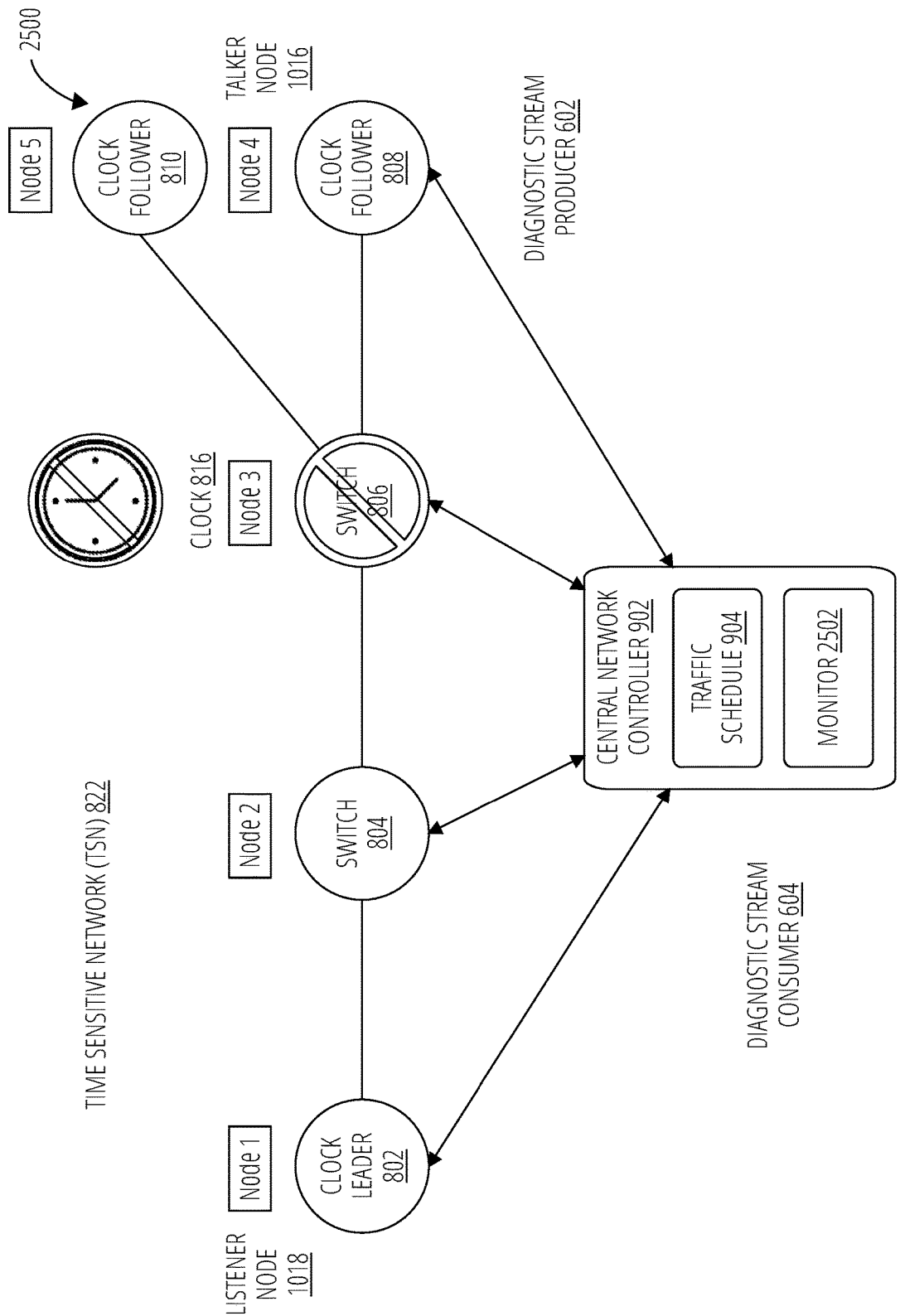
FIG. 25 illustrates an aspect of an operating environment 2500 in accordance with one embodiment.

FIG. 25 illustrates an operating environment 2500 for the TSN 822. As discussed with reference to FIG. 24, when the attacker 1008 compromises a TSN node 104, it propagates the desynchronization attack to any TSN nodes 104 that operate downstream from the TSN node 104. Consequently, an attack on node 2 causes the propagation of erroneous time information 418 to nodes 3-5. However, timing of diagnostic streams 636 may be used to defeat downstream propagation of malicious time references.

As depicted in FIG. 25, in order to quickly detect propagation of an attack, nodes 1 through 5 should report to a monitor 2502 for the central network controller 902 immediately upon the receipt of a new timeSync message, such as a message 112, before updating its local clock. The previous (receiver) node desynchronizes first, while the transmitter is still using its old reference of time. For instance, assume the attacker 1008 attacks node 2, which sends a malicious time reference to node 3. Node 3 would become compromised and start using the malicious time reference. However, nodes 4 and 5 would report messages 112 received from node 3 to the monitor 2502 before updating local clocks 818, 824, respectively. This allows the monitor 2502 time to detect any time window misalignments (e.g., 820.1Qbv time windows W1 through W5) before the nodes 4-5 are all following the malicious time issued by node 3. As a result, a compromised TSN node 104 can be isolated from the TSN 102 before propagating a timing attack to downstream TSN nodes 104, thereby containing impact of the timing attack on the entire TSN 102.

As previously described, regardless of where implemented in the TSN 102, a monitor (e.g., monitor 614, monitor 2502) analyzes the received diagnostic APCs 2104, and it determines which ones are misaligned. Utilizing the ACP sequence number 2304 and node identifier 2302 of an ACP, the monitor extracts how much the misalignment in time is and which TSN node 104 is suffering from the misalignment. Since the TSN nodes 104 may misalign relative to each other, the monitor may remove ambiguity by analyzing the previous and next neighbors of the two nodes that are in doubt. Other branches of the network can also help remove ambiguity, as a node A at depth D in one branch would desynchronize in relation to its parent node, and another node B also at depth D would not desynchronize in relation to the same parent node. In this case the problem is likely with node A, and not the common parent. If both node A and node B presented a desynchronization event, then is likely that the problem is with the common parent node.

The TSN 102 should also consider a frequency for a diagnostic stream 636. Since time synchronization messages (e.g., messages 112) propagate downstream, the impact of a desynchronization event will also propagate downstream. Thus, it is important to generate a given diagnostic stream 636 before and after a given node disciplines its clock. This allows the monitor to follow the desynchronization propagation as it occurs.

Figure 26B:
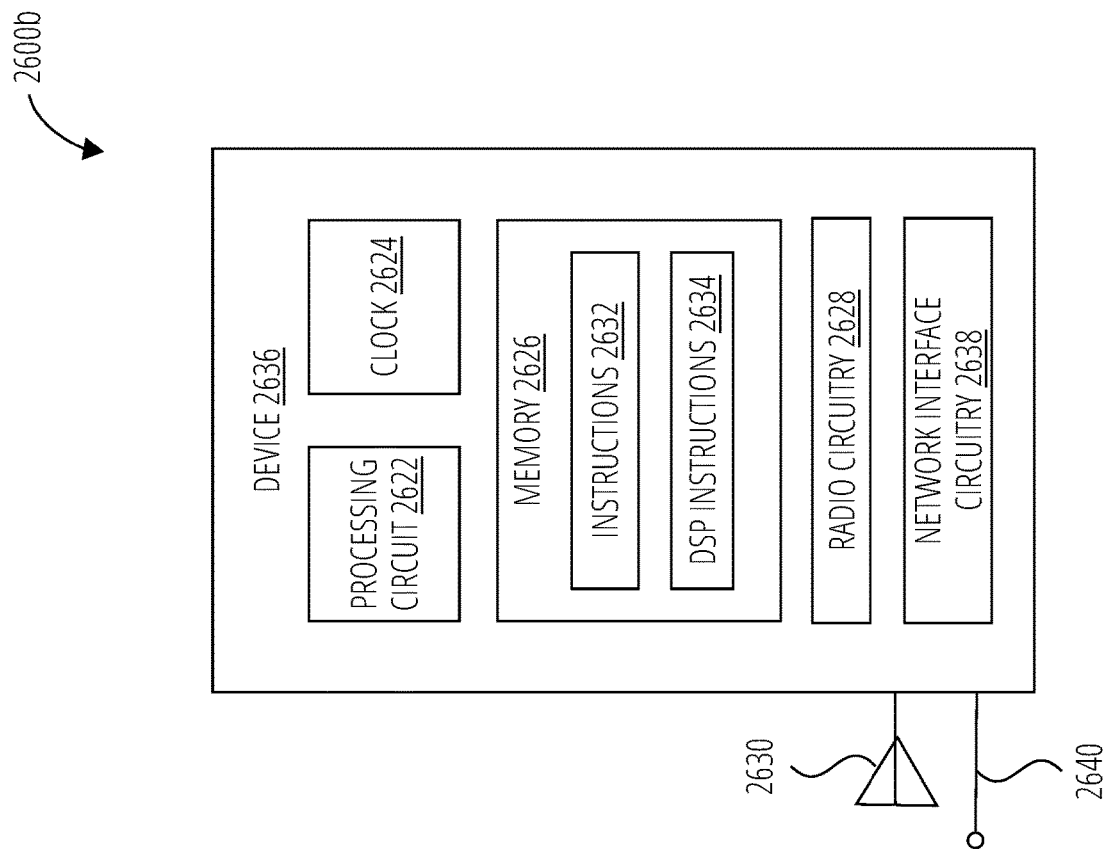
FIG. 26B illustrates an aspect of a TSN node 2600b in accordance with one embodiment.
Figure 26A:
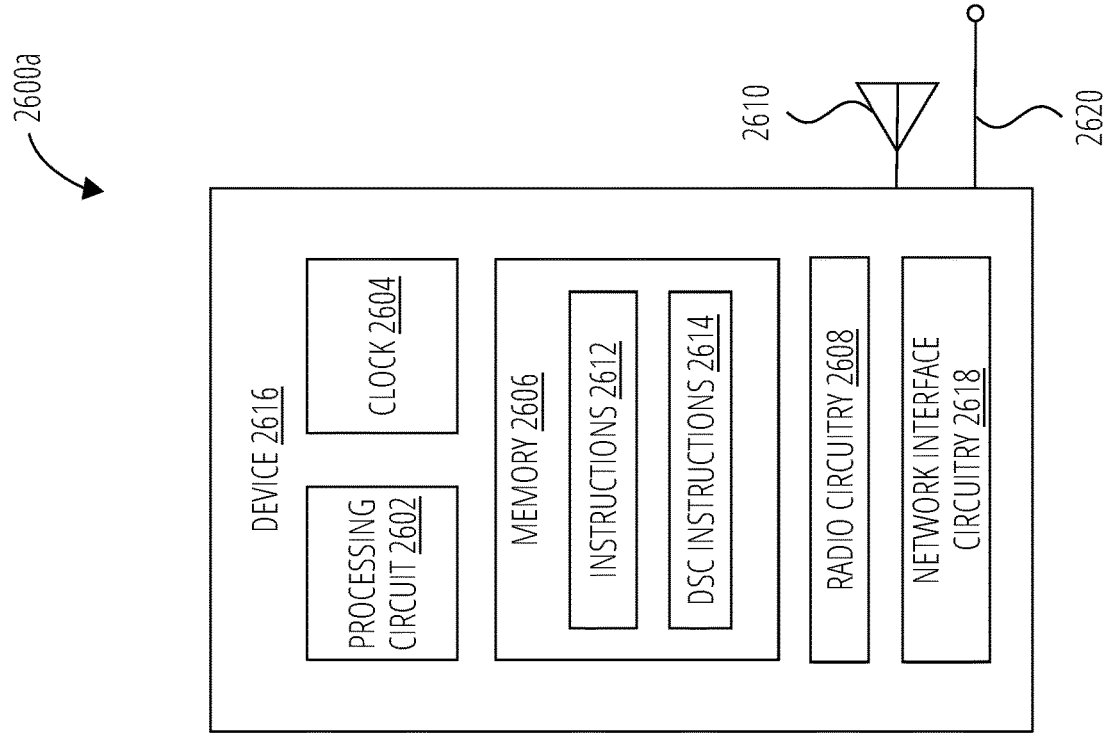
FIG. 26A illustrates an aspect of a TSN node 2600a in accordance with one embodiment.

FIG. 26A depicts a device 2616. The device 2616 could be any one of the TSN nodes 104 in a TSN network. Device 2616 includes a processing circuit 2602, a clock 2604, memory 2606, radio circuitry 2608, an antenna 2610, a network interface circuitry 2618, and a wired connection 2620. Memory 2606 stores instructions 2612 and diagnostic stream consumer instructions 2614. During operation, processing circuit 2602 can execute instructions 2612 and/or diagnostic stream consumer instructions 2614 to cause device 2616 to consume, analyze and monitor diagnostic streams 636 and/or unified streams 638 carrying diagnostic messages 642 with a set of ACPs 612 from other devices in the TSN network. In some examples, processing circuit 2602 can execute instructions 2612 and/or diagnostic stream consumer instructions 2614 to cause device 2616 to operate as a clock leader (CL) for the TSN network, such as sending time synchronization messages, time update messages, and other timing messages defined by various IEEE standards as discussed herein. Furthermore, processing circuit 2602 can execute instructions 2612 to cause device 2616 to send, via radio circuitry 2608 and antenna 2610 or network interface circuitry 2618 timing messages as the CL for a CF in a TSN network. In addition, processing circuit 2602 can execute instructions 2612 to cause device 2616 to send, via radio circuitry 2608 and antenna 2610 or network interface circuitry 2618 security messages in response to a security attack, such as alert messages, notification messages, network reconfiguration messages, device isolation messages, model update messages, and other messages in a TSN network.

FIG. 26B depicts a device 2636. The device 2636 could be any one of the TSN nodes 104 in a TSN network. Device 2636 includes a processing circuit 2622, a clock 2624, memory 2626, radio circuitry 2628, an antenna 2630, a network interface circuitry 2638, and a wired connection 2640. Memory 2626 stores instructions 2632 and diagnostic stream producer instructions 2634. During operation, processing circuit 2622 can execute instructions 2632 and/or diagnostic stream producer instructions 2634 to cause device 2636 to generate and send diagnostic streams 636 and/or unified streams 638 carrying diagnostic messages 642 with a set of ACPs 612 to other devices in the TSN network. In some examples, processing circuit 2622 can execute instructions 2632 and/or diagnostic stream producer instructions 2634 to operate as a clock follower (CF) for the TSN network, such as receiving timing messages as a clock follower (e.g., from time measurements from a global clock for a TSN network) from other devices in the TSN network, such as the device 2616. In some examples, processing circuit 2622 can execute instructions 2632 and/or diagnostic stream producer instructions 2634 to cause device 2636 to receive time synchronization messages, time update messages, and other timing messages defined by various IEEE standards as discussed herein. Furthermore, processing circuit 2622 can execute instructions 2632 and/or diagnostic stream producer instructions 2634 to cause device 2636 to receive, via radio circuitry 2628 and antenna 2630 or network interface circuitry 2638 timing messages as the CF for a CL in a TSN network. In addition, processing circuit 2622 can execute instructions 2632 and/or diagnostic stream producer instructions 2634 to cause device 2636 to send, via radio circuitry 2628 and antenna 2630 or network interface circuitry 2638 security messages in response to a security attack, such as alert messages, notification messages, network reconfiguration messages, device isolation messages, model update messages, and other messages in a TSN network.

Figure 27:
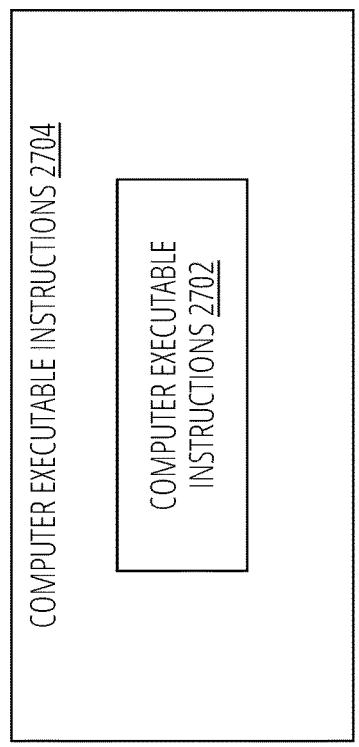
FIG. 27 illustrates an aspect of a computer-readable medium 2700 in accordance with one embodiment.

FIG. 27 illustrates computer-readable storage computer-readable medium 2700. Computer-readable storage computer-readable medium 2700 may comprise any non-transitory computer-readable storage medium or machine-readable storage medium, such as an optical, magnetic or semiconductor storage medium. In various embodiments, computer-readable storage computer-readable medium 2700 may comprise an article of manufacture. In some embodiments, computer-readable storage computer-readable medium 2700 may store computer executable instructions 2702 with which circuitry (e.g., processing circuitry 414, processor circuitry 622, processor circuitry 628, processing circuit 2602, processing circuit 2622, radio circuitry 2608, radio circuitry 2628, network interface circuitry 2618, network interface circuitry 2638, clock manager 106, clock circuitry 412, interface 626, interface 632, or the like) can execute. For example, computer executable instructions 2702 can include instructions to implement operations described with respect to logic flows 1900 and 2000. Examples of computer-readable storage computer-readable medium 2700 or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions 2702 may include any suitable type of code, such as source code, compiled code, interpreted code, executable code, static code, dynamic code, object-oriented code, visual code, and the like.

As described herein, embodiments include various novel and non-obvious technical improvements to security schemes for time-synchronized networking, including but not limited to, properties and features such as:

Schedule Distribution: A Central Network Controller distributing a traffic schedule also informs the receiving nodes of a transmit window of its neighbors to enable alignment checks.

Fundamental_observations: Once the attack happens the resulting consequence leaves an irreversible trace (relative time discrepancy between two nodes) that is leveraged to detect the attack.

Unforgeability: Transmitters create a stream of unique, unforgeable, and node-bounded packets that fills a time window and are sent as a stream towards the monitor.

Inspection: A receiving node checks the arrival time of the packets against its neighbor transmit window, and it drops packets outside the neighbor's time window.

Detection: Dropping of packets indicates an attack due to misalignment.

Localization: The specific packet(s) dropped indicates where the desynchronization event is occurring.

Quantification: A number of packets dropped indicates an amplitude of a desynchronization event (e.g., the amplitude of the attack).

Additional embodiments may include various novel and non-obvious technical improvements to security schemes for time-synchronized networking, including but not limited to, properties and features such as:

Latency reduction: Instead of waiting for the diagnostic stream to be sent out and then adjusting the clock, the node can move ahead with the clock adjustment and then compensate for the difference in the time window. In other words, the transmission gate of the time window would temporarily operate on a compensated time rather than the actual time of the platform.

Contents_of ACPs: If executing this technique in conjunction with other IDS techniques, the ACPs can also carry the status (and other related data) resulting from the IDS execution, in addition to the standard fields.

Compensation for link delay: Link delay contributes to the misalignment of the time windows. However, link delays are fairly stable, and its historical value can be used to correct the receiver's time window to the transmitter's time window.

Diagnostic stream_priority: Diagnostic streams are assigned as the highest priority traffic. Alternatively, all nodes can automatically treat diagnostic messages as high priority.

The following aspects and examples pertain to further embodiments, from which numerous permutations and configurations will be apparent.

In one example, a method, may include receiving a diagnostic message in a time-synchronized network (TSN) by a diagnostic stream consumer of the TSN, the diagnostic message to comprise a set of alignment-check packets (ACPs), the set of ACPs to include a first node ACP from a first set of ACPs associated with a first TSN node in the TSN, the first node ACP to carry diagnostic information associated with the first TSN node, the diagnostic information to comprise a node identifier for the first TSN node, an ACP sequence number for the first TSN node, and an authentication code for the first TSN node, may also include where the first node ACP has a defined size, authenticating the first node ACP based on the authentication code, determining a number of dropped ACPs from the first set of ACPs associated with the first TSN node that were not received within a time window associated with the first TSN node based on the ACP sequence number of the first node ACP, and determining a desynchronization time for the first TSN node based on the number of dropped ACPs from the first set of ACPs associated with the first TSN node and the defined size for the first node ACP.

The method, of any previous example, may also include where the first TSN node is a diagnostic stream producer.

The method, of any previous example, may also include where the ACPs in the first set of ACPs have a sequence, and the ACP sequence number of the first node ACP represents an ordered number for the first node ACP in an ordered number of ACPs within the sequence.

The method, of any previous example, may include sending the time window associated with the first TSN node to neighboring nodes of the first TSN node prior to receiving the diagnostic message.

The method, of any previous example, may include receiving the diagnostic message from a dedicated diagnostic stream channel for the TSN.

The method, of any previous example, may include receiving the diagnostic message with an identifier to identify a priority level for the diagnostic message, the priority level to indicate a highest priority level for transport through the TSN.

The method, of any previous example, may include receiving the diagnostic message as part of a message stream channel transporting non-diagnostic messages for the TSN.

The method, of any previous example, may include authenticating the ACP based on the authentication code, the authentication code generated by a cryptographic key used by the first TSN node and the diagnostic consumer node of the TSN.

The method, of any previous example, may also include where the TSN node identifier is a unique identifier for the first TSN node, the TSN node identifier having a defined minimum size.

The method, of any previous example, may also include where the first node ACP has a defined length of 368 bits, the TSN node identifier to comprise a length of 8 bits, the ACP sequence number to comprise a length of 232 bits, and the authentication code has a length of 128 bits.

The method, of any previous example, may also include where the diagnostic information further may include information from an intrusion detection system (IDS) associated with the first TSN node.

The method, of any previous example, may include reducing the ACP sequence number of the first node ACP by one to determine the number of dropped ACPs from the first set of ACPs associated with the first TSN node that were not received within a time window associated with the first TSN node, converting the defined size of the first node ACP to a time value based on a transmission speed of the TSN, and multiplying the number of dropped ACPs from the first set of ACPs associated with the first TSN node by the time value to determine the desynchronization time for the first TSN node.

The method, of any previous example, may include comparing the desynchronization time for the first TSN node to a defined threshold value, determining whether the first TSN node is under a security attack based on the comparison, and generating an alert when the first TSN node is determined to be under a security attack.

The method, of any previous example, may also include where the set of ACPs to include a second node ACP from a second set of ACPs associated with a second TSN node in the TSN, the second node ACP from the second set of ACPs to carry diagnostic information associated with the second TSN node, the diagnostic information to comprise a node identifier for the second TSN node, an ACP sequence number for the second TSN node, and an authentication code for the second TSN node, may also include where the second node ACP from the second set of ACPs has a defined size.

The method, of any previous example, may include comparing the desynchronization time for the first TSN node with a desynchronization time for a second TSN node, and determining a source of a security attack based on the comparison. Other technical features may be readily apparent to one skilled in the art from the following figures, descriptions, and claims.

In one example, a method, may include preparing a diagnostic stream for transmission from a diagnostic stream producer to a diagnostic stream consumer within a time window assigned to the diagnostic stream producer in a time-synchronized network (TSN), determining a set of alignment-check packets (ACPs) associated with the diagnostic stream producer that can be sent within the time window, each ACP of the set of ACPs having a defined size, generating one or more ACPs for the set of ACPs, each ACP to include diagnostic information associated with the diagnostic stream producer, the diagnostic information to comprise a node identifier for the diagnostic stream producer, an ACP sequence number, and an authentication code for the diagnostic stream producer, sending the set of ACPs from the diagnostic stream producer to the diagnostic stream consumer within the time window assigned to the diagnostic stream producer.

The method, of any previous example, may also include where the diagnostic stream producer and the diagnostic stream consumer are both TSN nodes within the TSN.

The method, of any previous example, may also include where the diagnostic stream producer is a talker node within the TSN, and the diagnostic stream consumer is a listener node within the TSN.

The method, of any previous example, may also include where the diagnostic stream producer is a TSN node within the TSN, and the diagnostic stream consumer is a central network controller within the TSN.

The method, of any previous example, may also include where the diagnostic stream producer is an intermediate node between another diagnostic stream producer and the diagnostic stream consumer, may include determining that a set of peer ACPs associated with a peer TSN node in the TSN have been received by the diagnostic stream producer, each peer ACP in the set of peer ACPs to have an ACP sequence number, retrieving a peer ACP from the set of peer ACPs having an ACP sequence number that is a lowest ACP sequence number of the other peer ACPs within the set of peer ACPs, discarding any peer ACPs from the set of peer ACPs having an ACP sequence number that is higher than the highest ACP sequence number, and sending the diagnostic message with the set of ACPs and the peer ACP with the lowest ACP sequence number from the diagnostic stream producer to the diagnostic stream consumer within the time window assigned to the diagnostic stream producer.

The method, of any previous example, may include generating a single ACP within the set of ACPs associated with the diagnostic stream producer.

The method, of any previous example, may include generating multiple ACPs within the set of ACPs associated with the diagnostic stream producer.

The method, of any previous example, may include arranging the set of ACPs within the diagnostic stream according to a sequence, the ACP sequence number to represent an ordered number for the ACP in an ordered number of ACPs within the sequence.

The method, of any previous example, may include receiving the time window associated with the diagnostic stream producer from a central network controller prior to sending the diagnostic stream.

The method, of any previous example, may include sending the diagnostic message over a dedicated diagnostic stream channel for the TSN.

The method, of any previous example, may include sending the diagnostic message as part of a message stream channel transporting non-diagnostic messages for the TSN.

The method, of any previous example, may include generating the authentication code for the diagnostic message, the authentication code generated by a cryptographic key used by the diagnostic stream producer and the diagnostic stream consumer of the TSN.

The method, of any previous example, may also include where the node identifier is a unique identifier for the diagnostic stream producer, the node identifier having a defined minimum size.

The method, of any previous example, may also include where each ACP has a defined length of 368 bits, the node identifier to comprise a length of 8 bits, the ACP sequence number to comprise a length of 232 bits, and the authentication code to comprise a length of 128 bits.

The method, of any previous example, may include determining information from an intrusion detection system (IDS) associated with the diagnostic stream producer has been received by the diagnostic stream producer, retrieving the information from the IDS, and sending the diagnostic message with the set of ACPs and the information from the IDS from the diagnostic stream producer to the diagnostic stream consumer within the residual time for the time window assigned to the diagnostic stream producer. Other technical features may be readily apparent to one skilled in the art from the following figures, descriptions, and claims.

In one example, a method, may include preparing a data stream for transmission from a diagnostic stream producer to a diagnostic stream consumer within a time window assigned to the diagnostic stream producer in a time-synchronized network (TSN), determining an amount of transmit time needed to send the data stream from the diagnostic stream producer to the diagnostic stream consumer during the time window assigned to the diagnostic stream producer, determining an amount of residual time for the time window based on the transmit time, determining a set of alignment-check packets (ACPs) associated with the diagnostic stream producer that can be sent within the residual time for the time window, each ACP of the set of ACPs having a defined size, generating one or more ACPs for the set of ACPs, each ACP to include diagnostic information associated with the diagnostic stream producer, the diagnostic information to comprise a node identifier for the diagnostic stream producer, an ACP sequence number, and an authentication code for the diagnostic stream producer, sending a diagnostic message with the set of ACPs from the diagnostic stream producer to the diagnostic stream consumer within the residual time for the time window assigned to the diagnostic stream producer.

The method, of any previous example, may also include where the diagnostic stream producer and the diagnostic stream consumer are both TSN nodes within the TSN.

The method, of any previous example, may also include where the diagnostic stream producer is a talker node within the TSN, and the diagnostic stream consumer is a listener node within the TSN.

The method, of any previous example, may also include where the diagnostic stream producer is a TSN node within the TSN, and the diagnostic stream consumer is a central network controller within the TSN.

The method, of any previous example, may also include where the diagnostic stream producer is an intermediate node between another diagnostic stream producer and the diagnostic stream consumer, may include determining that a set of peer ACPs associated with a peer TSN node in the TSN have been received by the diagnostic stream producer, each peer ACP in the set of peer ACPs to have an ACP sequence number, retrieving a peer ACP from the set of peer ACPs having an ACP sequence number that is a lowest ACP sequence number of the other peer ACPs within the set of peer ACPs, discarding any peer ACPs from the set of peer ACPs having an ACP sequence number that is higher than the highest ACP sequence number, and sending the diagnostic message with the set of ACPs and the peer ACP with the lowest ACP sequence number from the diagnostic stream producer to the diagnostic stream consumer within the residual time for the time window assigned to the diagnostic stream producer.

The method, of any previous example, may include generating a single ACP within the set of ACPs associated with the diagnostic stream producer.

The method, of any previous example, may include generating multiple ACPs within the set of ACPs associated with the diagnostic stream producer.

The method, of any previous example, may include arranging the set of ACPs within the diagnostic message according to a sequence, the ACP sequence number to represent an ordered number for the ACP in an ordered number of ACPs within the sequence.

The method, of any previous example, may include receiving the time window associated with the diagnostic stream producer from a central network controller prior to sending the diagnostic message.

The method, of any previous example, may include sending the diagnostic message over a dedicated diagnostic stream channel for the TSN.

The method, of any previous example, may include sending the diagnostic message with an identifier to identify a priority level for the diagnostic message, the priority level to indicate a highest priority level for transport through the TSN.

The method, of any previous example, may include sending the diagnostic message as part of a message stream channel transporting non-diagnostic messages for the TSN.

The method, of any previous example, may include generating the authentication code for the diagnostic message, the authentication code generated by a cryptographic key used by the diagnostic stream producer and the diagnostic stream consumer of the TSN.

The method, of any previous example, may also include where the node identifier is a unique identifier for the diagnostic stream producer, the node identifier having a defined minimum size.

The method, of any previous example, may also include where each ACP has a defined length of 368 bits, the node identifier to comprise a length of 8 bits, the ACP sequence number to comprise a length of 232 bits, and the authentication code to comprise a length of 128 bits.

The method, of any previous example, may include determining information from an intrusion detection system (IDS) associated with the diagnostic stream producer has been received by the diagnostic stream producer, retrieving the information from the IDS, and sending the diagnostic message with the set of ACPs and the information from the IDS from the diagnostic stream producer to the diagnostic stream consumer within the residual time for the time window assigned to the diagnostic stream producer. Other technical features may be readily apparent to one skilled in the art from the following figures, descriptions, and claims.

In one example, a computing apparatus may include a processor circuitry. The computing apparatus may include a memory storing instructions that, when executed by the processor circuitry, cause the processor circuitry to receive a diagnostic message in a time-synchronized network (TSN) by a diagnostic stream consumer of the TSN, the diagnostic message to comprise a set of alignment-check packets (ACPs), the set of ACPs to include a first node ACP from a first set of ACPs associated with a first TSN node in the TSN, the first node ACP to carry diagnostic information associated with the first TSN node, the diagnostic information to comprise a node identifier for the first TSN node, an ACP sequence number for the first TSN node, and an authentication code for the first TSN node, may also include where the first node ACP has a defined size, authenticate the first node ACP based on the authentication code, determine a number of dropped ACPs from the first set of ACPs associated with the first TSN node that were not received within a time window associated with the first TSN node based on the ACP sequence number of the first node ACP, and determine a desynchronization time for the first TSN node based on the number of dropped ACPs from the first set of ACPs associated with the first TSN node and the defined size for the first node ACP.

The computing apparatus, of any previous example, may also include where the first TSN node is a diagnostic stream producer.

The computing apparatus, of any previous example, may also include where the ACPs in the first set of ACPs have a sequence, and the ACP sequence number of the first node ACP represents an ordered number for the first node ACP in an ordered number of ACPs within the sequence.

The computing apparatus, of any previous example, the processor circuitry to send the time window associated with the first TSN node to neighboring nodes of the first TSN node prior to receiving the diagnostic message.

The computing apparatus, of any previous example, the processor circuitry to receive the diagnostic message from a dedicated diagnostic stream channel for the TSN.

The computing apparatus, of any previous example, the processor circuitry to receive the diagnostic message with an identifier to identify a priority level for the diagnostic message, the priority level to indicate a highest priority level for transport through the TSN.

The computing apparatus, of any previous example, the processor circuitry to receive the diagnostic message as part of a message stream channel transporting non-diagnostic messages for the TSN.

The computing apparatus, of any previous example, the processor circuitry to authenticate the ACP based on the authentication code, the authentication code generated by a cryptographic key used by the first TSN node and the diagnostic consumer node of the TSN.

The computing apparatus, of any previous example, may also include where the TSN node identifier is a unique identifier for the first TSN node, the TSN node identifier having a defined minimum size.

The computing apparatus, of any previous example, may also include where the first node ACP has a defined length of 368 bits, the TSN node identifier to comprise a length of 8 bits, the ACP sequence number to comprise a length of 232 bits, and the authentication code has a length of 128 bits.

The computing apparatus, of any previous example, may also include where the diagnostic information further may include information from an intrusion detection system (IDS) associated with the first TSN node.

The computing apparatus, of any previous example, the processor circuitry to reduce the ACP sequence number of the first node ACP by one to determine the number of dropped ACPs from the first set of ACPs associated with the first TSN node that were not received within a time window associated with the first TSN node, convert the defined size of the first node ACP to a time value based on a transmission speed of the TSN, and multiply the number of dropped ACPs from the first set of ACPs associated with the first TSN node by the time value to determine the desynchronization time for the first TSN node.

The computing apparatus, of any previous example, the processor circuitry to compare the desynchronization time for the first TSN node to a defined threshold value, determine whether the first TSN node is under a security attack based on the comparison, and generate an alert when the first TSN node is determined to be under a security attack.

The computing apparatus, of any previous example, may also include where the set of ACPs to include a second node ACP from a second set of ACPs associated with a second TSN node in the TSN, the second node ACP from the second set of ACPs to carry diagnostic information associated with the second TSN node, the diagnostic information to comprise a node identifier for the second TSN node, an ACP sequence number for the second TSN node, and an authentication code for the second TSN node, may also include where the second node ACP from the second set of ACPs has a defined size.

The computing apparatus, of any previous example, the processor circuitry to compare the desynchronization time for the first TSN node with a desynchronization time for a second TSN node, and determine a source of a security attack based on the comparison. Other technical features may be readily apparent to one skilled in the art from the following figures, descriptions, and claims.

In one example, a non-transitory computer-readable storage medium, the computer-readable storage medium including instructions that when executed by a computer, cause the computer to receive a diagnostic message in a time-synchronized network (TSN) by a diagnostic stream consumer of the TSN, the diagnostic message to comprise a set of alignment-check packets (ACPs), the set of ACPs to include a first node ACP from a first set of ACPs associated with a first TSN node in the TSN, the first node ACP to carry diagnostic information associated with the first TSN node, the diagnostic information to comprise a node identifier for the first TSN node, an ACP sequence number for the first TSN node, and an authentication code for the first TSN node, may also include where the first node ACP has a defined size, authenticate the first node ACP based on the authentication code, determine a number of dropped ACPs from the first set of ACPs associated with the first TSN node that were not received within a time window associated with the first TSN node based on the ACP sequence number of the first node ACP, and determine a desynchronization time for the first TSN node based on the number of dropped ACPs from the first set of ACPs associated with the first TSN node and the defined size for the first node ACP.

The computer-readable storage medium, of any previous example, may also include where the first TSN node is a diagnostic stream producer.

The computer-readable storage medium, of any previous example, may also include where the ACPs in the first set of ACPs have a sequence, and the ACP sequence number of the first node ACP represents an ordered number for the first node ACP in an ordered number of ACPs within the sequence.

The computer-readable storage medium, of any previous example, may include instructions that when executed by a computer, cause the computer to send the time window associated with the first TSN node to neighboring nodes of the first TSN node prior to receiving the diagnostic message.

The computer-readable storage medium, of any previous example, may include instructions that when executed by a computer, cause the computer to receive the diagnostic message from a dedicated diagnostic stream channel for the TSN.

The computer-readable storage medium, of any previous example, may include instructions that when executed by a computer, cause the computer to receive the diagnostic message with an identifier to identify a priority level for the diagnostic message, the priority level to indicate a highest priority level for transport through the TSN.

The computer-readable storage medium, of any previous example, may include instructions that when executed by a computer, cause the computer to receive the diagnostic message as part of a message stream channel transporting non-diagnostic messages for the TSN.

The computer-readable storage medium, of any previous example, may include instructions that when executed by a computer, cause the computer to authenticate the ACP based on the authentication code, the authentication code generated by a cryptographic key used by the first TSN node and the diagnostic consumer node of the TSN.

The computer-readable storage medium, of any previous example, may also include where the TSN node identifier is a unique identifier for the first TSN node, the TSN node identifier having a defined minimum size.

The computer-readable storage medium, of any previous example, may also include where the first node ACP has a defined length of 368 bits, the TSN node identifier to comprise a length of 8 bits, the ACP sequence number to comprise a length of 232 bits, and the authentication code has a length of 128 bits.

The computer-readable storage medium, of any previous example, may also include where the diagnostic information further may include information from an intrusion detection system (IDS) associated with the first TSN node.

The computer-readable storage medium, of any previous example, may include instructions that when executed by a computer, cause the computer to reduce the ACP sequence number of the first node ACP by one to determine the number of dropped ACPs from the first set of ACPs associated with the first TSN node that were not received within a time window associated with the first TSN node, convert the defined size of the first node ACP to a time value based on a transmission speed of the TSN, and multiply the number of dropped ACPs from the first set of ACPs associated with the first TSN node by the time value to determine the desynchronization time for the first TSN node.

The computer-readable storage medium, of any previous example, may include instructions that when executed by a computer, cause the computer to compare the desynchronization time for the first TSN node to a defined threshold value, determine whether the first TSN node is under a security attack based on the comparison, and generate an alert when the first TSN node is determined to be under a security attack.

The computer-readable storage medium, of any previous example, may also include where the set of ACPs to include a second node ACP from a second set of ACPs associated with a second TSN node in the TSN, the second node ACP from the second set of ACPs to carry diagnostic information associated with the second TSN node, the diagnostic information to comprise a node identifier for the second TSN node, an ACP sequence number for the second TSN node, and an authentication code for the second TSN node, may also include where the second node ACP from the second set of ACPs has a defined size.

The computer-readable storage medium, of any previous example, may include instructions that when executed by a computer, cause the computer to compare the desynchronization time for the first TSN node with a desynchronization time for a second TSN node, and determine a source of a security attack based on the comparison. Other technical features may be readily apparent to one skilled in the art from the following figures, descriptions, and claims.

In one example, a computing apparatus may include a processor circuitry. The computing apparatus may include a memory storing instructions that, when executed by the processor circuitry, cause the processor circuitry to prepare a diagnostic stream for transmission from a diagnostic stream producer to a diagnostic stream consumer within a time window assigned to the diagnostic stream producer in a time-synchronized network (TSN), determine a set of alignment-check packets (ACPs) associated with the diagnostic stream producer that can be sent within the time window, each ACP of the set of ACPs having a defined size, generate one or more ACPs for the set of ACPs, each ACP to include diagnostic information associated with the diagnostic stream producer, the diagnostic information to comprise a node identifier for the diagnostic stream producer, an ACP sequence number, and an authentication code for the diagnostic stream producer, send the set of ACPs from the diagnostic stream producer to the diagnostic stream consumer within the time window assigned to the diagnostic stream producer.

The computing apparatus, of any previous example, may also include where the diagnostic stream producer and the diagnostic stream consumer are both TSN nodes within the TSN.

The computing apparatus, of any previous example, may also include where the diagnostic stream producer is a talker node within the TSN, and the diagnostic stream consumer is a listener node within the TSN.

The computing apparatus, of any previous example, may also include where the diagnostic stream producer is a TSN node within the TSN, and the diagnostic stream consumer is a central network controller within the TSN.

The computing apparatus, of any previous example, may also include where the diagnostic stream producer is an intermediate node between another diagnostic stream producer and the diagnostic stream consumer, the processor circuitry to determine that a set of peer ACPs associated with a peer TSN node in the TSN have been received by the diagnostic stream producer, each peer ACP in the set of peer ACPs to have an ACP sequence number, retrieve a peer ACP from the set of peer ACPs having an ACP sequence number that is a lowest ACP sequence number of the other peer ACPs within the set of peer ACPs, discard any peer ACPs from the set of peer ACPs having an ACP sequence number that is higher than the highest ACP sequence number, and send the diagnostic message with the set of ACPs and the peer ACP with the lowest ACP sequence number from the diagnostic stream producer to the diagnostic stream consumer within the time window assigned to the diagnostic stream producer.

The computing apparatus, of any previous example, the processor circuitry to generate a single ACP within the set of ACPs associated with the diagnostic stream producer.

The computing apparatus, of any previous example, the processor circuitry to generate multiple ACPs within the set of ACPs associated with the diagnostic stream producer.

The computing apparatus, of any previous example, the processor circuitry to arrange the set of ACPs within the diagnostic stream according to a sequence, the ACP sequence number to represent an ordered number for the ACP in an ordered number of ACPs within the sequence.

The computing apparatus, of any previous example, the processor circuitry to receive the time window associated with the diagnostic stream producer from a central network controller prior to sending the diagnostic stream.

The computing apparatus, of any previous example, the processor circuitry to send the diagnostic message over a dedicated diagnostic stream channel for the TSN.

The computing apparatus, of any previous example, the processor circuitry to send the diagnostic message as part of a message stream channel transporting non-diagnostic messages for the TSN.

The computing apparatus, of any previous example, the processor circuitry to generate the authentication code for the diagnostic message, the authentication code generated by a cryptographic key used by the diagnostic stream producer and the diagnostic stream consumer of the TSN.

The computing apparatus, of any previous example, may also include where the node identifier is a unique identifier for the diagnostic stream producer, the node identifier having a defined minimum size.

The computing apparatus, of any previous example, may also include where each ACP has a defined length of 368 bits, the node identifier to comprise a length of 8 bits, the ACP sequence number to comprise a length of 232 bits, and the authentication code to comprise a length of 128 bits.

The computing apparatus, of any previous example, the processor circuitry to determine information from an intrusion detection system (IDS) associated with the diagnostic stream producer has been received by the diagnostic stream producer, retrieve the information from the IDS, and send the diagnostic message with the set of ACPs and the information from the IDS from the diagnostic stream producer to the diagnostic stream consumer within the residual time for the time window assigned to the diagnostic stream producer. Other technical features may be readily apparent to one skilled in the art from the following figures, descriptions, and claims.

In one example, a non-transitory computer-readable storage medium, the computer-readable storage medium including instructions that when executed by a computer, cause the computer to prepare a diagnostic stream for transmission from a diagnostic stream producer to a diagnostic stream consumer within a time window assigned to the diagnostic stream producer in a time-synchronized network (TSN), determine a set of alignment-check packets (ACPs) associated with the diagnostic stream producer that can be sent within the time window, each ACP of the set of ACPs having a defined size, generate one or more ACPs for the set of ACPs, each ACP to include diagnostic information associated with the diagnostic stream producer, the diagnostic information to comprise a node identifier for the diagnostic stream producer, an ACP sequence number, and an authentication code for the diagnostic stream producer, send the set of ACPs from the diagnostic stream producer to the diagnostic stream consumer within the time window assigned to the diagnostic stream producer.

The computer-readable storage medium, of any previous example, may also include where the diagnostic stream producer and the diagnostic stream consumer are both TSN nodes within the TSN.

The computer-readable storage medium, of any previous example, may also include where the diagnostic stream producer is a talker node within the TSN, and the diagnostic stream consumer is a listener node within the TSN.

The computer-readable storage medium, of any previous example, may also include where the diagnostic stream producer is a TSN node within the TSN, and the diagnostic stream consumer is a central network controller within the TSN.

The computer-readable storage medium, of any previous example, may also include where the diagnostic stream producer is an intermediate node between another diagnostic stream producer and the diagnostic stream consumer, may include instructions that when executed by a computer, cause the computer to determine that a set of peer ACPs associated with a peer TSN node in the TSN have been received by the diagnostic stream producer, each peer ACP in the set of peer ACPs to have an ACP sequence number, retrieve a peer ACP from the set of peer ACPs having an ACP sequence number that is a lowest ACP sequence number of the other peer ACPs within the set of peer ACPs, discard any peer ACPs from the set of peer ACPs having an ACP sequence number that is higher than the highest ACP sequence number, and send the diagnostic message with the set of ACPs and the peer ACP with the lowest ACP sequence number from the diagnostic stream producer to the diagnostic stream consumer within the time window assigned to the diagnostic stream producer.

The computer-readable storage medium, of any previous example, may include instructions that when executed by a computer, cause the computer to generate a single ACP within the set of ACPs associated with the diagnostic stream producer.

The computer-readable storage medium, of any previous example, may include instructions that when executed by a computer, cause the computer to generate multiple ACPs within the set of ACPs associated with the diagnostic stream producer.

The computer-readable storage medium, of any previous example, may include instructions that when executed by a computer, cause the computer to arrange the set of ACPs within the diagnostic stream according to a sequence, the ACP sequence number to represent an ordered number for the ACP in an ordered number of ACPs within the sequence.

The computer-readable storage medium, of any previous example, may include instructions that when executed by a computer, cause the computer to receive the time window associated with the diagnostic stream producer from a central network controller prior to sending the diagnostic stream.

The computer-readable storage medium, of any previous example, may include instructions that when executed by a computer, cause the computer to send the diagnostic message over a dedicated diagnostic stream channel for the TSN.

The computer-readable storage medium, of any previous example, may include instructions that when executed by a computer, cause the computer to send the diagnostic message as part of a message stream channel transporting non-diagnostic messages for the TSN.

The computer-readable storage medium, of any previous example, may include instructions that when executed by a computer, cause the computer to generate the authentication code for the diagnostic message, the authentication code generated by a cryptographic key used by the diagnostic stream producer and the diagnostic stream consumer of the TSN.

The computer-readable storage medium, of any previous example, may also include where the node identifier is a unique identifier for the diagnostic stream producer, the node identifier having a defined minimum size.

The computer-readable storage medium, of any previous example, may also include where each ACP has a defined length of 368 bits, the node identifier to comprise a length of 8 bits, the ACP sequence number to comprise a length of 232 bits, and the authentication code to comprise a length of 128 bits.

The computer-readable storage medium, of any previous example, may include instructions that when executed by a computer, cause the computer to determine information from an intrusion detection system (IDS) associated with the diagnostic stream producer has been received by the diagnostic stream producer, retrieve the information from the IDS, and send the diagnostic message with the set of ACPs and the information from the IDS from the diagnostic stream producer to the diagnostic stream consumer within the residual time for the time window assigned to the diagnostic stream producer. Other technical features may be readily apparent to one skilled in the art from the following figures, descriptions, and claims.

In one example, a computing apparatus may include a processor circuitry. The computing apparatus may include a memory storing instructions that, when executed by the processor circuitry, cause the processor circuitry to prepare a data stream for transmission from a diagnostic stream producer to a diagnostic stream consumer within a time window assigned to the diagnostic stream producer in a time-synchronized network (TSN), determine an amount of transmit time needed to send the data stream from the diagnostic stream producer to the diagnostic stream consumer during the time window assigned to the diagnostic stream producer, determine an amount of residual time for the time window based on the transmit time, determine a set of alignment-check packets (ACPs) associated with the diagnostic stream producer that can be sent within the residual time for the time window, each ACP of the set of ACPs having a defined size, generate one or more ACPs for the set of ACPs, each ACP to include diagnostic information associated with the diagnostic stream producer, the diagnostic information to comprise a node identifier for the diagnostic stream producer, an ACP sequence number, and an authentication code for the diagnostic stream producer, send a diagnostic message with the set of ACPs from the diagnostic stream producer to the diagnostic stream consumer within the residual time for the time window assigned to the diagnostic stream producer.

The computing apparatus, of any previous example, may also include where the diagnostic stream producer and the diagnostic stream consumer are both TSN nodes within the TSN.

The computing apparatus, of any previous example, may also include where the diagnostic stream producer is a talker node within the TSN, and the diagnostic stream consumer is a listener node within the TSN.

The computing apparatus, of any previous example, may also include where the diagnostic stream producer is a TSN node within the TSN, and the diagnostic stream consumer is a central network controller within the TSN.

The computing apparatus, of any previous example, may also include where the diagnostic stream producer is an intermediate node between another diagnostic stream producer and the diagnostic stream consumer, the processor circuitry to determine that a set of peer ACPs associated with a peer TSN node in the TSN have been received by the diagnostic stream producer, each peer ACP in the set of peer ACPs to have an ACP sequence number, retrieve a peer ACP from the set of peer ACPs having an ACP sequence number that is a lowest ACP sequence number of the other peer ACPs within the set of peer ACPs, discard any peer ACPs from the set of peer ACPs having an ACP sequence number that is higher than the highest ACP sequence number, and send the diagnostic message with the set of ACPs and the peer ACP with the lowest ACP sequence number from the diagnostic stream producer to the diagnostic stream consumer within the residual time for the time window assigned to the diagnostic stream producer.

The computing apparatus, of any previous example, the processor circuitry to generate a single ACP within the set of ACPs associated with the diagnostic stream producer.

The computing apparatus, of any previous example, the processor circuitry to generate multiple ACPs within the set of ACPs associated with the diagnostic stream producer.

The computing apparatus, of any previous example, the processor circuitry to arrange the set of ACPs within the diagnostic message according to a sequence, the ACP sequence number to represent an ordered number for the ACP in an ordered number of ACPs within the sequence.

The computing apparatus, of any previous example, the processor circuitry to receive the time window associated with the diagnostic stream producer from a central network controller prior to sending the diagnostic message.

The computing apparatus, of any previous example, the processor circuitry to send the diagnostic message over a dedicated diagnostic stream channel for the TSN.

The computing apparatus, of any previous example, the processor circuitry to send the diagnostic message with an identifier to identify a priority level for the diagnostic message, the priority level to indicate a highest priority level for transport through the TSN.

The computing apparatus, of any previous example, the processor circuitry to send the diagnostic message as part of a message stream channel transporting non-diagnostic messages for the TSN.

The computing apparatus, of any previous example, the processor circuitry to generate the authentication code for the diagnostic message, the authentication code generated by a cryptographic key used by the diagnostic stream producer and the diagnostic stream consumer of the TSN.

The computing apparatus, of any previous example, may also include where the node identifier is a unique identifier for the diagnostic stream producer, the node identifier having a defined minimum size.

The computing apparatus, of any previous example, may also include where each ACP has a defined length of 368 bits, the node identifier to comprise a length of 8 bits, the ACP sequence number to comprise a length of 232 bits, and the authentication code to comprise a length of 128 bits.

The computing apparatus, of any previous example, the processor circuitry to determine information from an intrusion detection system (IDS) associated with the diagnostic stream producer has been received by the diagnostic stream producer, retrieve the information from the IDS, and send the diagnostic message with the set of ACPs and the information from the IDS from the diagnostic stream producer to the diagnostic stream consumer within the residual time for the time window assigned to the diagnostic stream producer. Other technical features may be readily apparent to one skilled in the art from the following figures, descriptions, and claims.

In one example, a non-transitory computer-readable storage medium, the computer-readable storage medium including instructions that when executed by a computer, cause the computer to prepare a data stream for transmission from a diagnostic stream producer to a diagnostic stream consumer within a time window assigned to the diagnostic stream producer in a time-synchronized network (TSN), determine an amount of transmit time needed to send the data stream from the diagnostic stream producer to the diagnostic stream consumer during the time window assigned to the diagnostic stream producer, determine an amount of residual time for the time window based on the transmit time, determine a set of alignment-check packets (ACPs) associated with the diagnostic stream producer that can be sent within the residual time for the time window, each ACP of the set of ACPs having a defined size, generate one or more ACPs for the set of ACPs, each ACP to include diagnostic information associated with the diagnostic stream producer, the diagnostic information to comprise a node identifier for the diagnostic stream producer, an ACP sequence number, and an authentication code for the diagnostic stream producer, send a diagnostic message with the set of ACPs from the diagnostic stream producer to the diagnostic stream consumer within the residual time for the time window assigned to the diagnostic stream producer.

The computer-readable storage medium, of any previous example, may also include where the diagnostic stream producer and the diagnostic stream consumer are both TSN nodes within the TSN.

The computer-readable storage medium, of any previous example, may also include where the diagnostic stream producer is a talker node within the TSN, and the diagnostic stream consumer is a listener node within the TSN.

The computer-readable storage medium, of any previous example, may also include where the diagnostic stream producer is a TSN node within the TSN, and the diagnostic stream consumer is a central network controller within the TSN.

The computer-readable storage medium, of any previous example, may also include where the diagnostic stream producer is an intermediate node between another diagnostic stream producer and the diagnostic stream consumer, may include instructions that when executed by a computer, cause the computer to determine that a set of peer ACPs associated with a peer TSN node in the TSN have been received by the diagnostic stream producer, each peer ACP in the set of peer ACPs to have an ACP sequence number, retrieve a peer ACP from the set of peer ACPs having an ACP sequence number that is a lowest ACP sequence number of the other peer ACPs within the set of peer ACPs, discard any peer ACPs from the set of peer ACPs having an ACP sequence number that is higher than the highest ACP sequence number, and send the diagnostic message with the set of ACPs and the peer ACP with the lowest ACP sequence number from the diagnostic stream producer to the diagnostic stream consumer within the residual time for the time window assigned to the diagnostic stream producer.

The computer-readable storage medium, of any previous example, may include instructions that when executed by a computer, cause the computer to generate a single ACP within the set of ACPs associated with the diagnostic stream producer.

The computer-readable storage medium, of any previous example, may include instructions that when executed by a computer, cause the computer to generate multiple ACPs within the set of ACPs associated with the diagnostic stream producer.

The computer-readable storage medium, of any previous example, may include instructions that when executed by a computer, cause the computer to arrange the set of ACPs within the diagnostic message according to a sequence, the ACP sequence number to represent an ordered number for the ACP in an ordered number of ACPs within the sequence.

The computer-readable storage medium, of any previous example, may include instructions that when executed by a computer, cause the computer to receive the time window associated with the diagnostic stream producer from a central network controller prior to sending the diagnostic message.

The computer-readable storage medium, of any previous example, may include instructions that when executed by a computer, cause the computer to send the diagnostic message over a dedicated diagnostic stream channel for the TSN.

The computer-readable storage medium, of any previous example, may include instructions that when executed by a computer, cause the computer to send the diagnostic message with an identifier to identify a priority level for the diagnostic message, the priority level to indicate a highest priority level for transport through the TSN.

The computer-readable storage medium, of any previous example, may include instructions that when executed by a computer, cause the computer to send the diagnostic message as part of a message stream channel transporting non-diagnostic messages for the TSN.

The computer-readable storage medium, of any previous example, may include instructions that when executed by a computer, cause the computer to generate the authentication code for the diagnostic message, the authentication code generated by a cryptographic key used by the diagnostic stream producer and the diagnostic stream consumer of the TSN.

The computer-readable storage medium, of any previous example, may also include where the node identifier is a unique identifier for the diagnostic stream producer, the node identifier having a defined minimum size.

The computer-readable storage medium, of any previous example, may also include where each ACP has a defined length of 368 bits, the node identifier to comprise a length of 8 bits, the ACP sequence number to comprise a length of 232 bits, and the authentication code to comprise a length of 128 bits.

The computer-readable storage medium, of any previous example, may include instructions that when executed by a computer, cause the computer to determine information from an intrusion detection system (IDS) associated with the diagnostic stream producer has been received by the diagnostic stream producer, retrieve the information from the IDS, and send the diagnostic message with the set of ACPs and the information from the IDS from the diagnostic stream producer to the diagnostic stream consumer within the residual time for the time window assigned to the diagnostic stream producer. Other technical features may be readily apparent to one skilled in the art from the following figures, descriptions, and claims.

It may be appreciated that any of the previous examples may be implemented as systems and/or means plus function embodiments. Embodiments are not limited to these examples.

What is claimed is:

1. A computing apparatus comprising:
a processor circuitry; and
a memory storing instructions that, when executed by the processor circuitry, cause the processor circuitry to:
receive a diagnostic message in a time-synchronized network (TSN), the diagnostic message to comprise a set of alignment-check packets (ACPs), the set of ACPs to include a first node ACP from a first set of ACPs associated with a first TSN node in the TSN, the first node ACP to carry diagnostic information associated with the first TSN node, the diagnostic information to comprise a node identifier for the first TSN node, an ACP sequence number for the first TSN node, and an authentication code for the first TSN node, wherein the first node ACP has a defined size;
authenticate the first node ACP based on the authentication code;
determine a number of dropped ACPs from the first set of ACPs associated with the first TSN node that were not received within a time window associated with the first TSN node based on the ACP sequence number of the first node ACP; and
determine a desynchronization time for the first TSN node based on the number of dropped ACPs from the first set of ACPs associated with the first TSN node and the defined size for the first node ACP.

2. The computing apparatus of claim 1, wherein the ACPs in the first set of ACPs have a sequence, and the ACP sequence number of the first node ACP represents an ordered number for the first node ACP in an ordered number of ACPs within the sequence.

3. The computing apparatus of claim 1, the processor circuitry to send the time window associated with the first TSN node to neighboring nodes of the first TSN node prior to receiving the diagnostic message.

4. The computing apparatus of claim 1, the processor circuitry to receive the diagnostic message from a diagnostic stream channel for the TSN.

5. The computing apparatus of claim 1, the processor circuitry to receive the diagnostic message with an identifier to identify a priority level for the diagnostic message.

6. The computing apparatus of claim 1, the processor circuitry to receive the diagnostic message with an identifier to identify a priority level for the diagnostic message, the priority level to indicate a highest priority level for transport through the TSN.

7. A non-transitory computer-readable storage medium, the computer-readable storage medium including instructions that when executed by a computer, cause the computer to:
receive a diagnostic message in a time-synchronized network (TSN), the diagnostic message to comprise a set of alignment-check packets (ACPs), the set of ACPs to include a first node ACP from a first set of ACPs associated with a first TSN node in the TSN, the first node ACP to carry diagnostic information associated with the first TSN node, the diagnostic information to comprise a node identifier for the first TSN node, an ACP sequence number for the first TSN node, and an authentication code for the first TSN node, wherein the first node ACP has a defined size;
authenticate the first node ACP based on the authentication code;
determine a number of dropped ACPs from the first set of ACPs associated with the first TSN node that were not received within a time window associated with the first TSN node based on the ACP sequence number of the first node ACP; and
determine a desynchronization time for the first TSN node based on the number of dropped ACPs from the first set of ACPs associated with the first TSN node and the defined size for the first node ACP.

8. The computer-readable storage medium of claim 7, wherein the ACPs in the first set of ACPs have a sequence, and the ACP sequence number of the first node ACP represents an ordered number for the first node ACP in an ordered number of ACPs within the sequence.

9. The computer-readable storage medium of claim 7, comprising instructions that when executed by a computer, cause the computer to send the time window associated with the first TSN node to neighboring nodes of the first TSN node prior to receiving the diagnostic message.

10. The computer-readable storage medium of claim 7, comprising instructions that when executed by a computer, cause the computer to receive the diagnostic message from a diagnostic stream channel for the TSN.

11. The computer-readable storage medium of claim 7, comprising instructions that when executed by a computer, cause the computer to receive the diagnostic message with an identifier to identify a priority level for the diagnostic message.

12. The computer-readable storage medium of claim 7, comprising instructions that when executed by a computer, cause the computer to receive the diagnostic message with an identifier to identify a priority level for the diagnostic message, the priority level to indicate a highest priority level for transport through the TSN.

13. A method, comprising:
receiving a diagnostic message in a time-synchronized network (TSN), the diagnostic message to comprise a set of alignment-check packets (ACPs), the set of ACPs to include a first node ACP from a first set of ACPs associated with a first TSN node in the TSN, the first node ACP to carry diagnostic information associated with the first TSN node, the diagnostic information to comprise a node identifier for the first TSN node, an ACP sequence number for the first TSN node, and an authentication code for the first TSN node, wherein the first node ACP has a defined size;
authenticating the first node ACP based on the authentication code;
determining a number of dropped ACPs from the first set of ACPs associated with the first TSN node that were not received within a time window associated with the first TSN node based on the ACP sequence number of the first node ACP; and
determining a desynchronization time for the first TSN node based on the number of dropped ACPs from the first set of ACPs associated with the first TSN node and the defined size for the first node ACP.

14. The method of claim 13, wherein the ACPs in the first set of ACPs have a sequence, and the ACP sequence number of the first node ACP represents an ordered number for the first node ACP in an ordered number of ACPs within the sequence.

15. The method of claim 13, comprising sending the time window associated with the first TSN node to neighboring nodes of the first TSN node prior to receiving the diagnostic message.

16. The method of claim 13, comprising receiving the diagnostic message with an identifier to identify a priority level for the diagnostic message.

17. The method of claim 13, comprising receiving the diagnostic message with an identifier to identify a priority level for the diagnostic message, the priority level to indicate a highest priority level for transport through the TSN.

18. The method of claim 13, comprising receiving the diagnostic message as part of a message stream channel transporting non-diagnostic messages for the TSN.

19. The method of claim 13, comprising authenticating the ACP based on the authentication code, the authentication code generated by a cryptographic key used by the first TSN node and the diagnostic consumer node of the TSN.

20. The method of claim 13, wherein the TSN node identifier is a unique identifier for the first TSN node, the TSN node identifier having a defined minimum size.

* * * * *